(12) United States Patent
Kweon

(10) Patent No.: US 7,830,617 B2
(45) Date of Patent: Nov. 9, 2010

(54) OPTICAL COMPONENTS INCLUDING LENS HAVING AT LEAST ONE ASPHERICAL REFRACTIVE SURFACE

(75) Inventor: Gyeong-Il Kweon, Gwangju (KR)

(73) Assignee: Nanophotonics Ltd. (KR)

( * ) Notice: Subject to any disclaimer, the term of this patent is extended or adjusted under 35 U.S.C. 154(b) by 487 days.

(21) Appl. No.: 11/993,371

(22) PCT Filed: Jun. 22, 2006

(86) PCT No.: PCT/KR2006/002428

§ 371 (c)(1),
(2), (4) Date: Dec. 20, 2007

(87) PCT Pub. No.: WO2006/137712

PCT Pub. Date: Dec. 28, 2006

(65) Prior Publication Data

US 2010/0157441 A1 Jun. 24, 2010

(30) Foreign Application Priority Data

Jun. 22, 2005 (KR) .................. 10-2005-0053894
May 10, 2006 (KR) .................. 10-2006-0042088

(51) Int. Cl.
*G02B 3/02* (2006.01)
(52) U.S. Cl. ..................................... 359/708; 359/642
(58) Field of Classification Search ........... 359/642, 359/708; 351/159; 623/6.23
See application file for complete search history.

(56) References Cited

U.S. PATENT DOCUMENTS 5,355,388 A * 10/1994 Lang ..................... 372/99
6,728,040 B1 * 4/2004 Mikhailov et al. .......... 359/622

FOREIGN PATENT DOCUMENTS

| JP | 01138528 A | 5/1989 |
| JP | 2005295480 A | 10/2005 |
| JP | 2007099598 A | 4/2007 |
| KR | 1020040068936 A | 8/2004 |
| KR | 1020050119831 A | 12/2005 |
| KR | 100624052 B1 | 9/2006 |

OTHER PUBLICATIONS

Kweon et al, Aspherical Lens Design by Using a Numerical Analysis, Jul. 2007, Journal of Korean Physical Society, vol. 51, No. 1, pp. 93-103.
Kweon et al, Aspherical Lens Design by Numerical Analysis, Feb. 9-10, 2006, Optical Society of Korea Annual Meeting, pp. 343-344.
Advance Program of the Optical Society of Korea Annual Meeting, Feb. 9-10, 2006, pp. 1-35.

* cited by examiner

*Primary Examiner*—Joseph Martinez
*Assistant Examiner*—James R Greece
(74) *Attorney, Agent, or Firm*—Brooks Kushman P.C.

(57) ABSTRACT

An optical component including lens having at least one aspherical refractive surface capable of satisfying desired performance and characteristics is disclosed.

57 Claims, 29 Drawing Sheets

[Fig. 1]
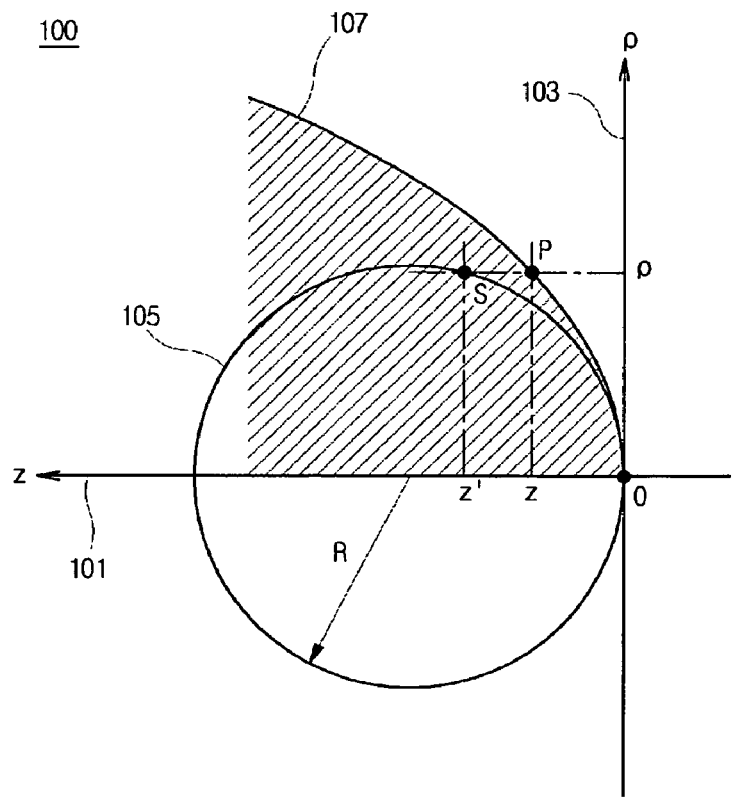
[Fig. 2]
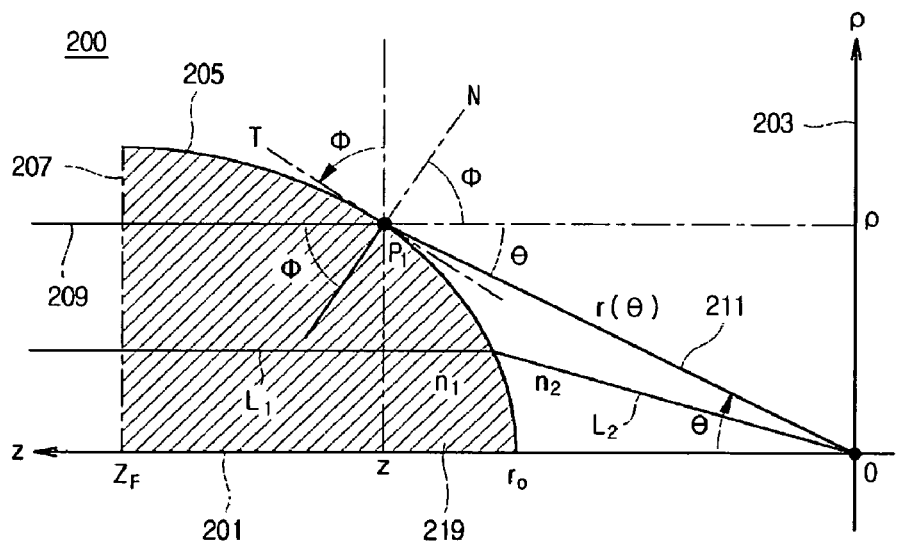

[Fig. 3]
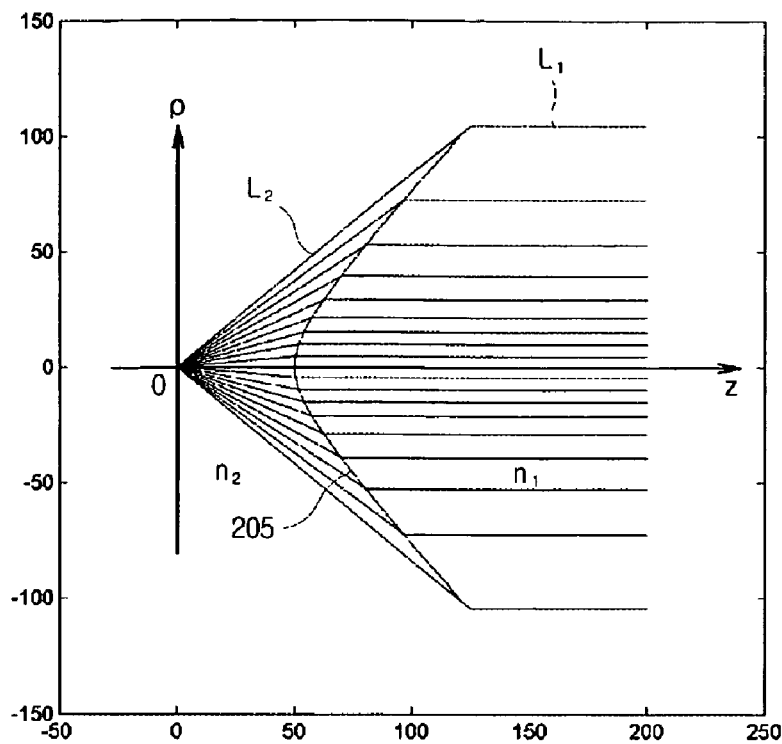
[Fig. 4]
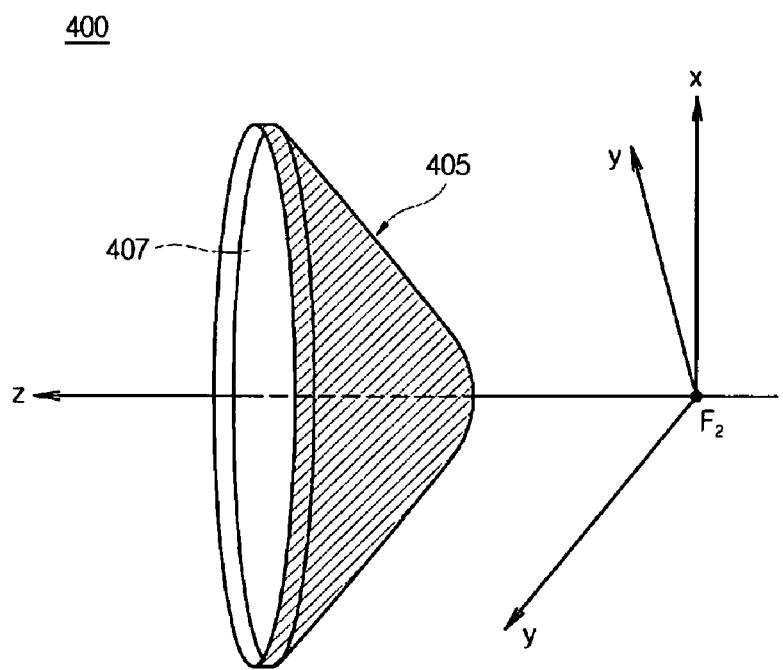

[Fig. 5]
500
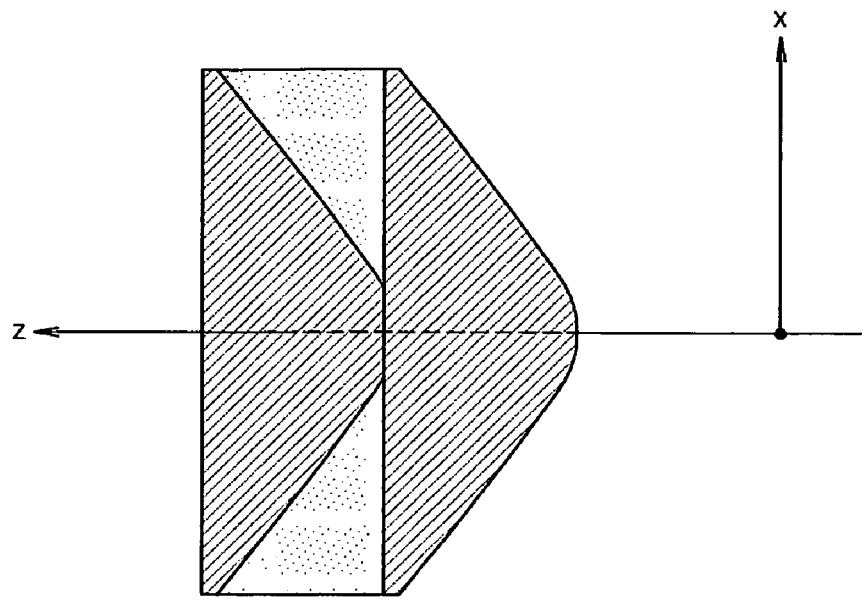
[Fig. 6]
600
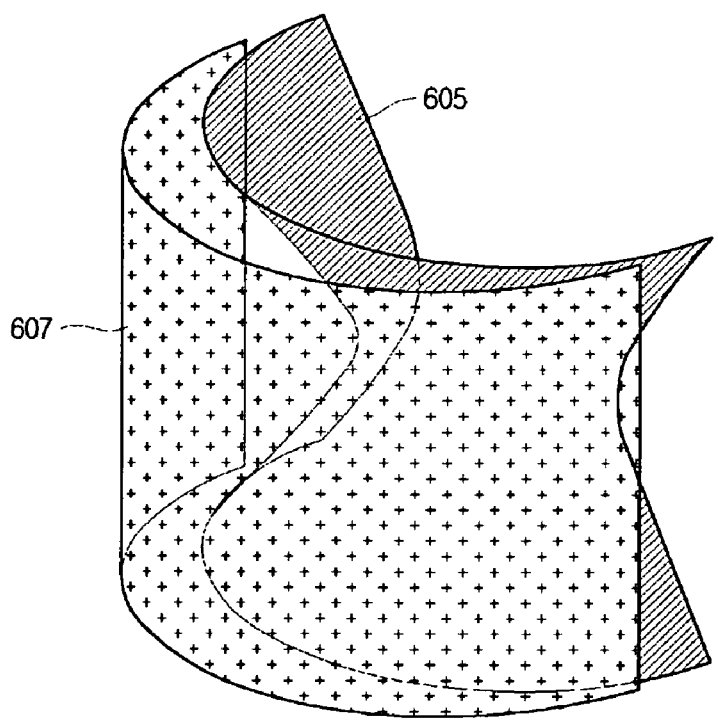

[Fig. 7]
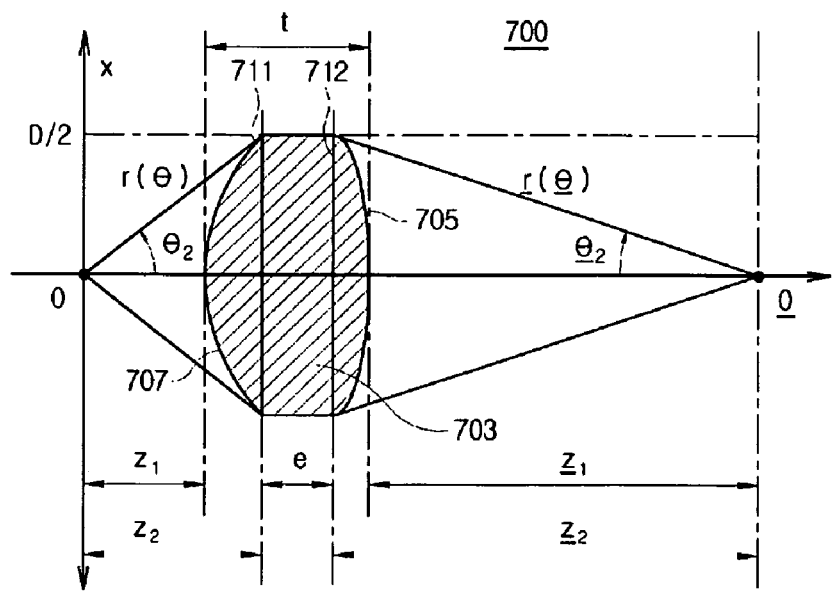
[Fig. 8]
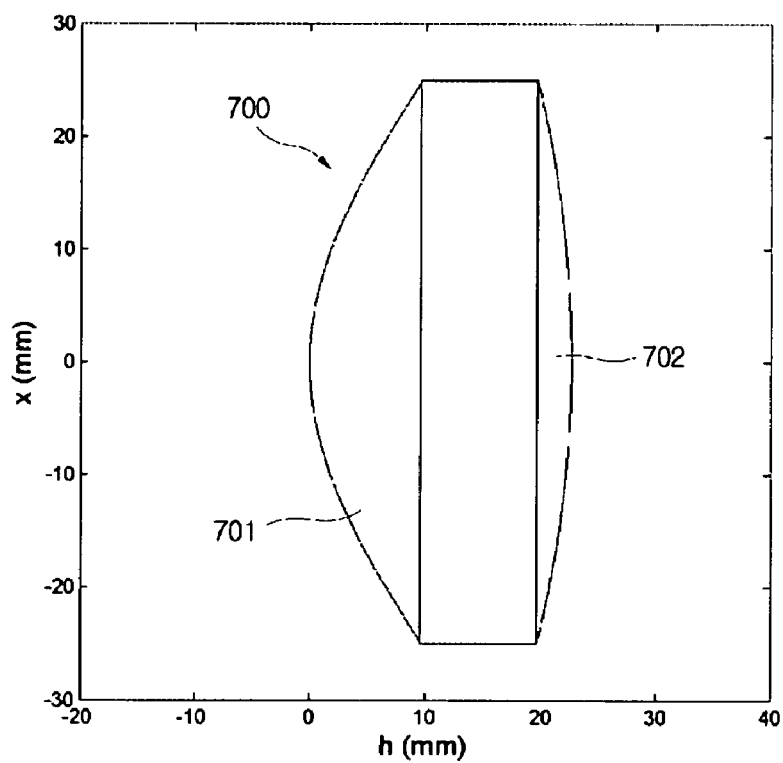

[Fig. 9]
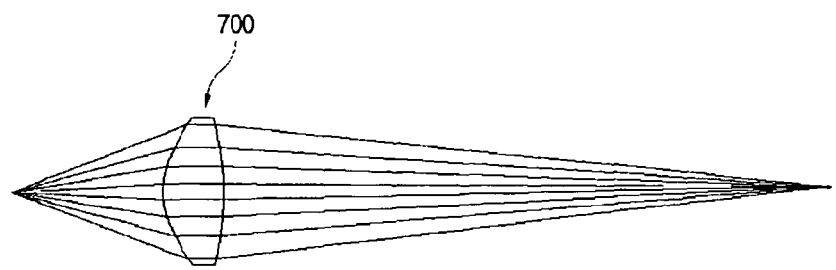
[Fig. 10]
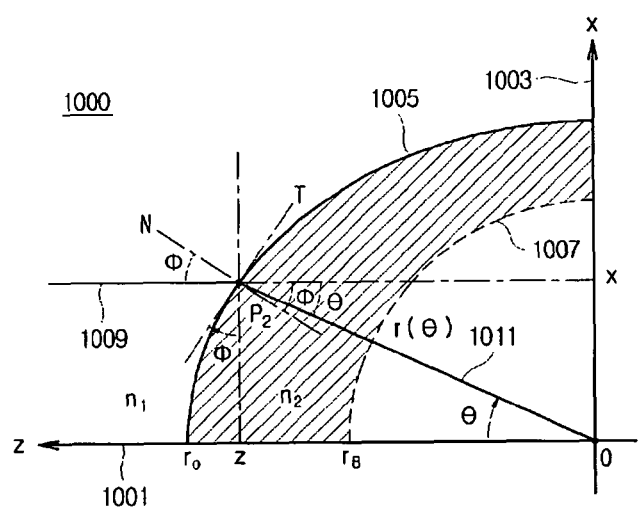
[Fig. 11]
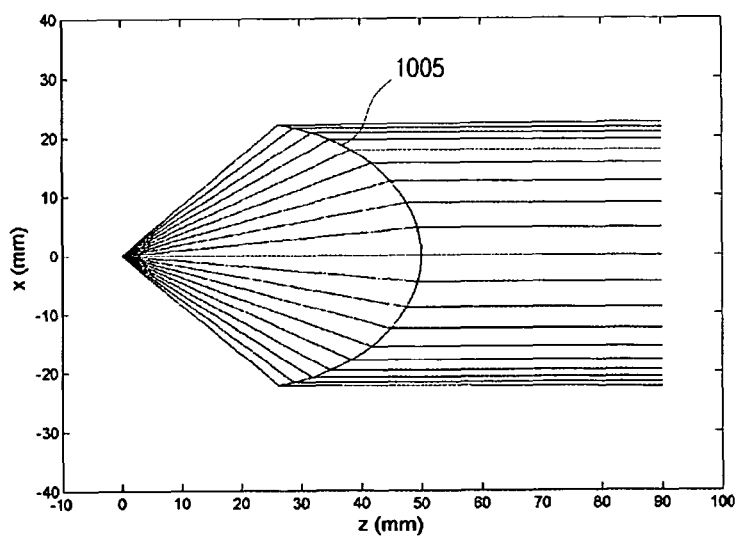

[Fig. 12]
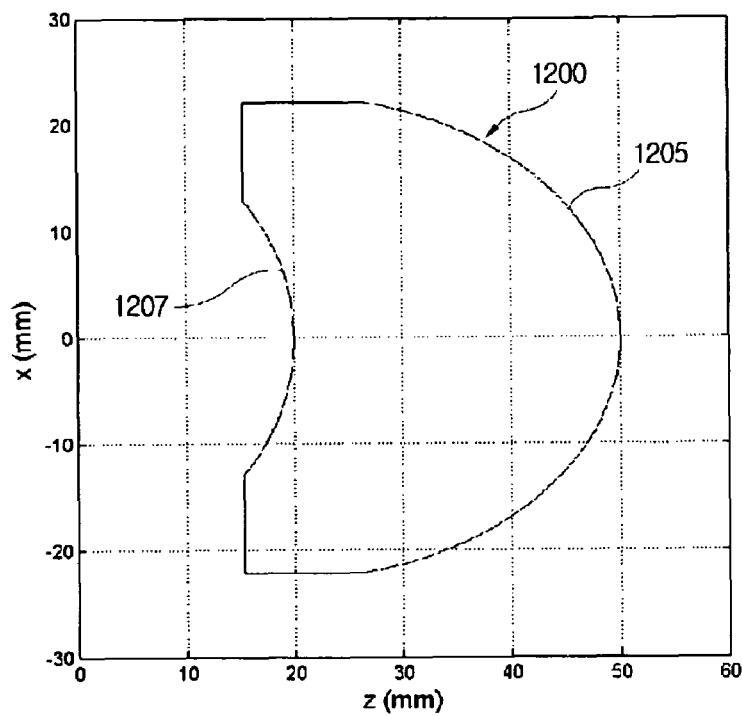
[Fig. 13]
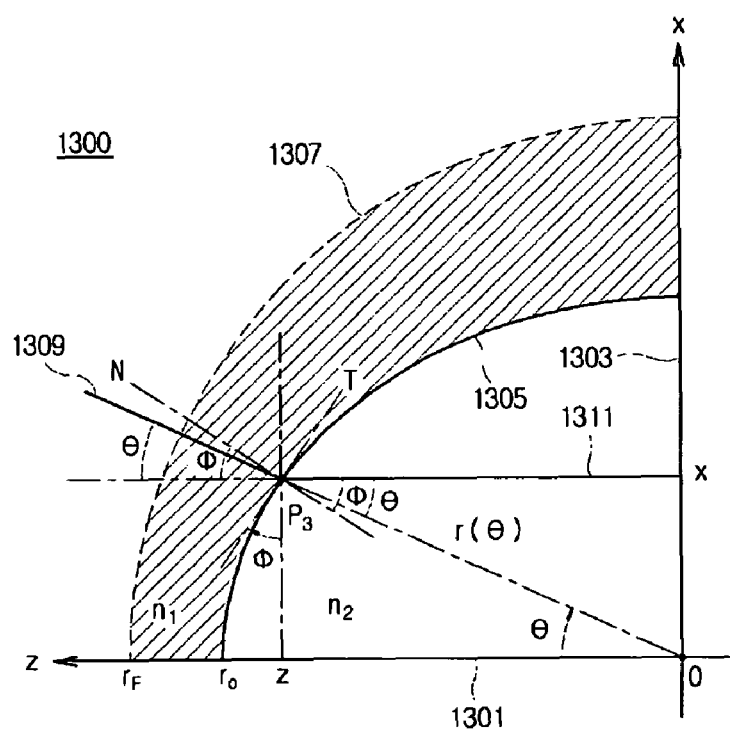

[Fig. 14]
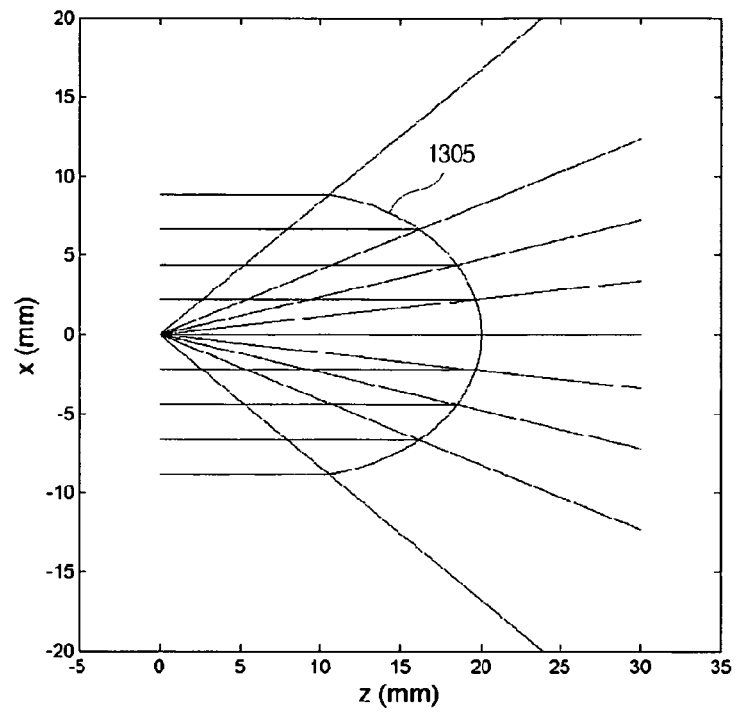
[Fig. 15]
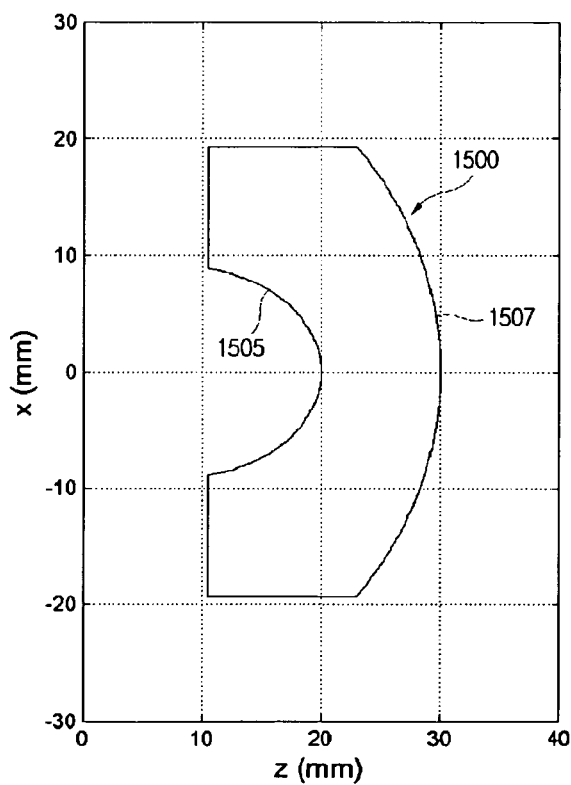

[Fig. 16]
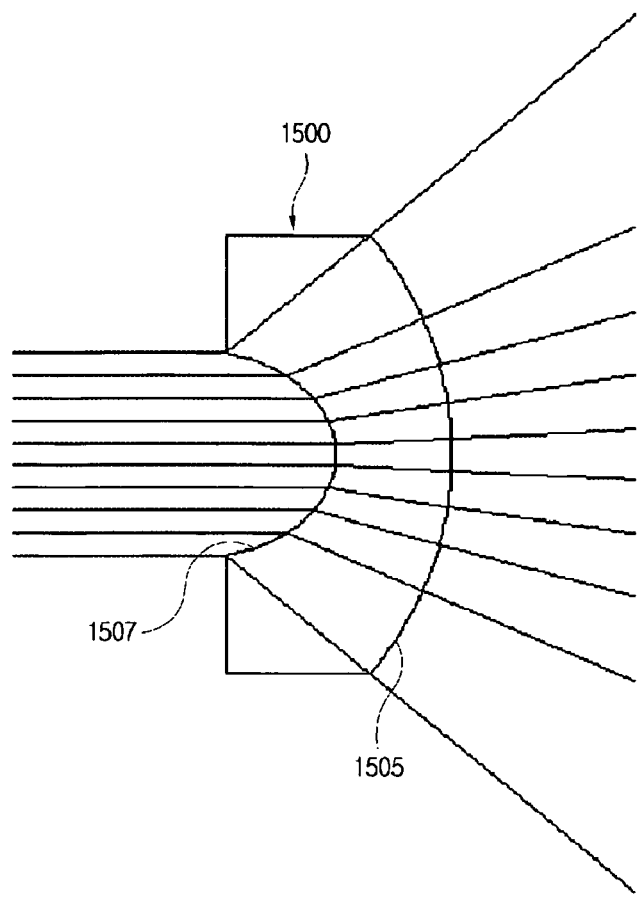
[Fig. 17]
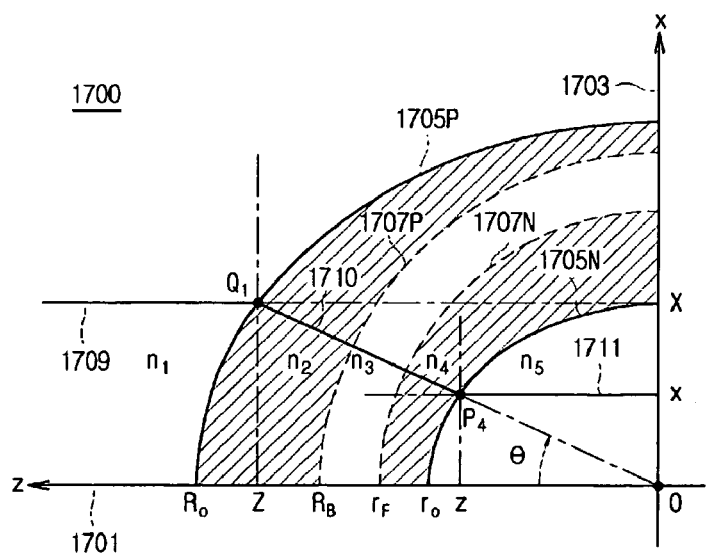

[Fig. 18]
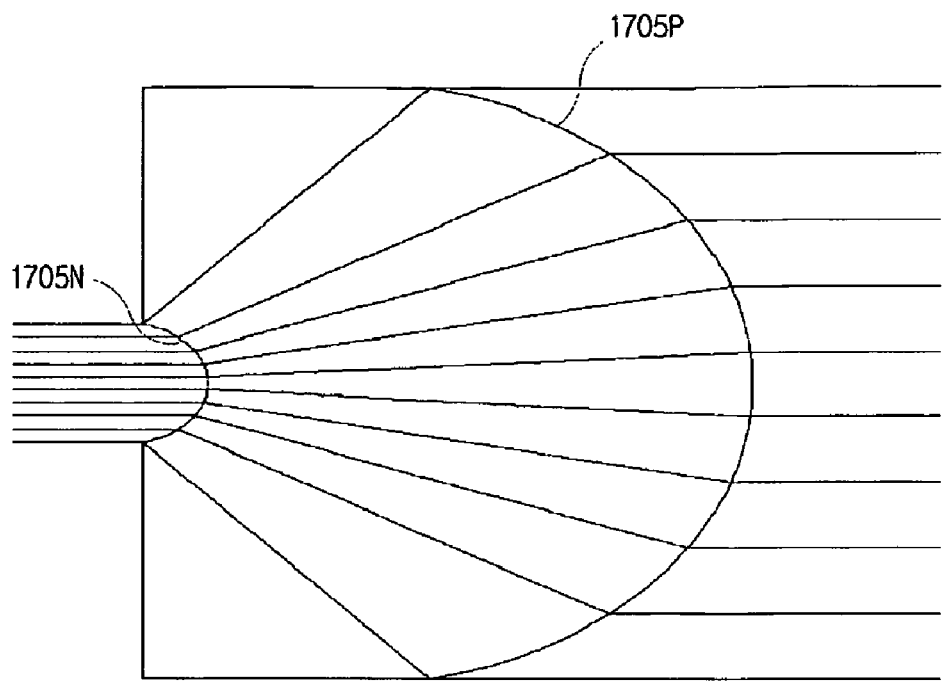
[Fig. 19]
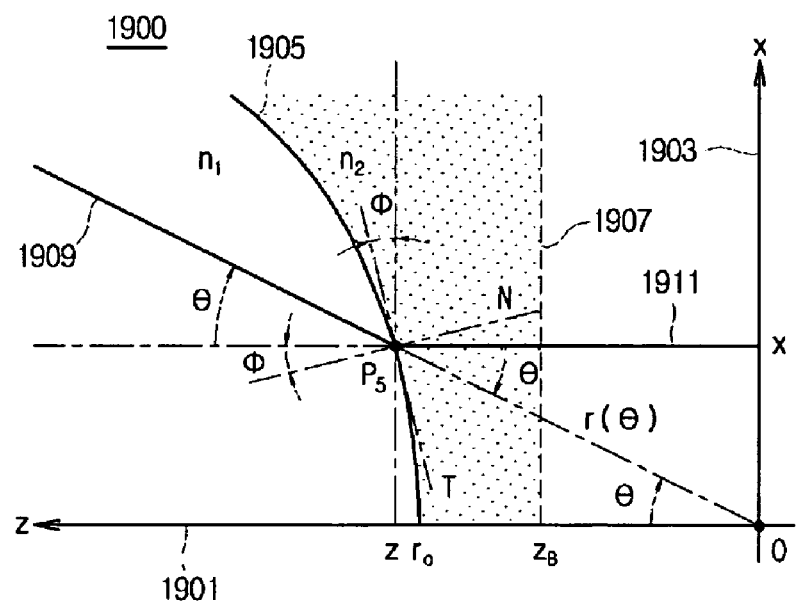

[Fig. 20]
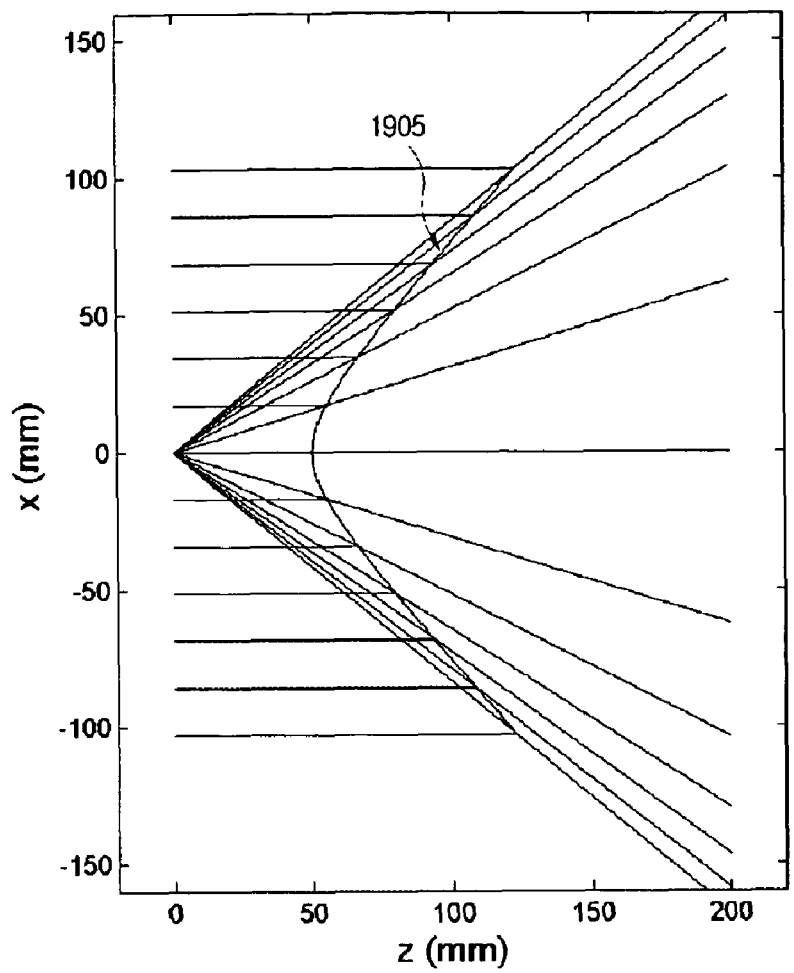
[Fig. 21]
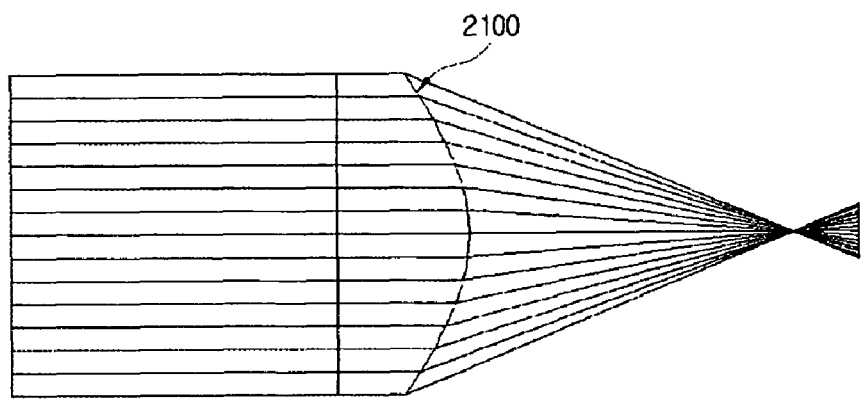

[Fig. 22]
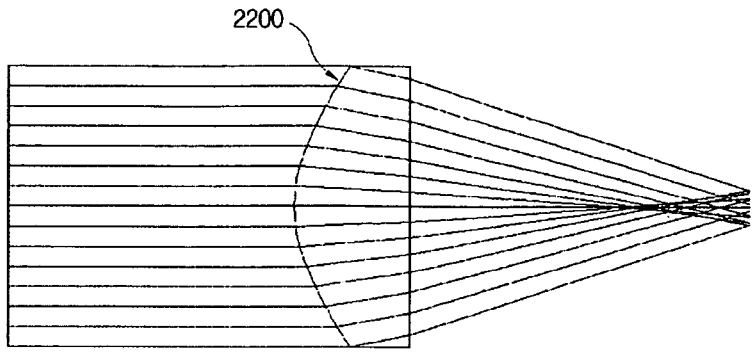
[Fig. 23]
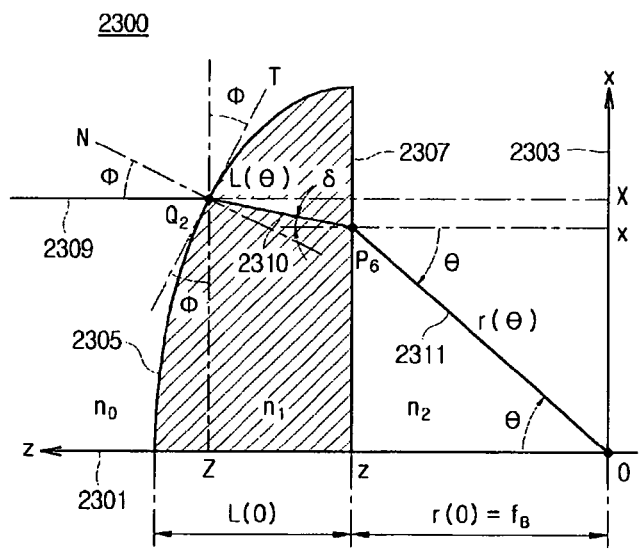
[Fig. 24]
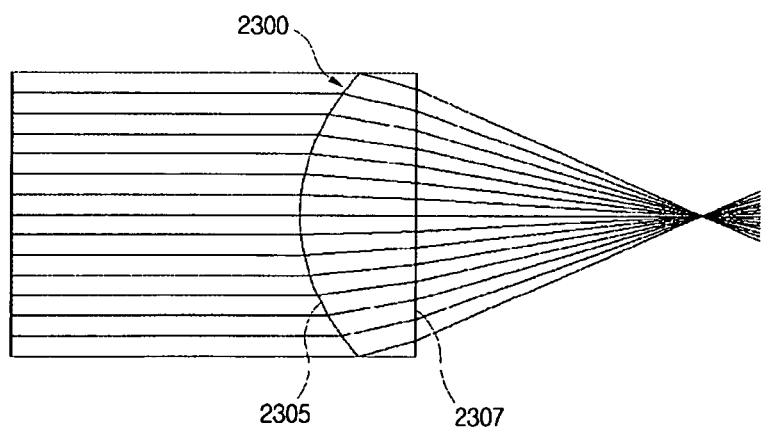

[Fig. 25]
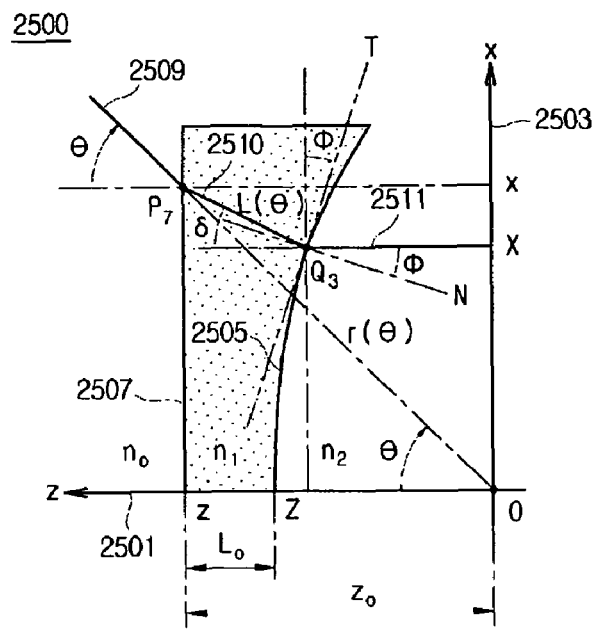
[Fig. 26]
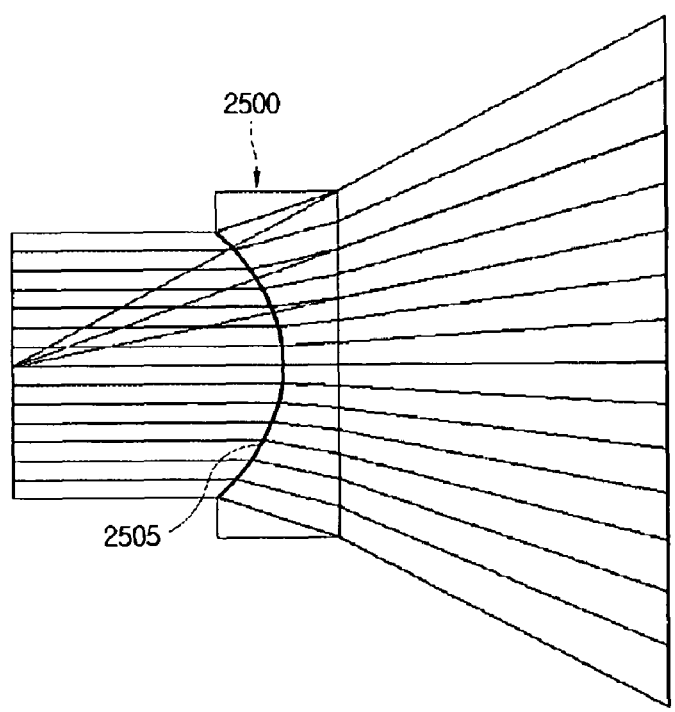

[Fig. 27]
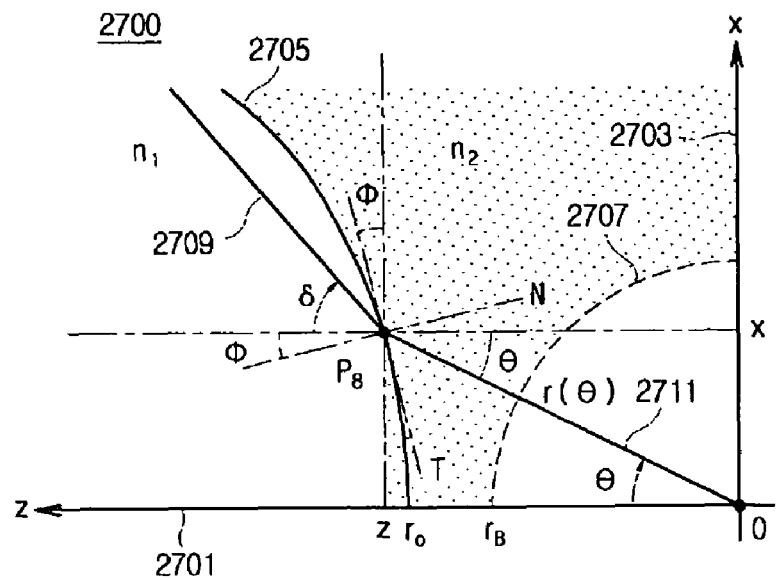
[Fig. 28]
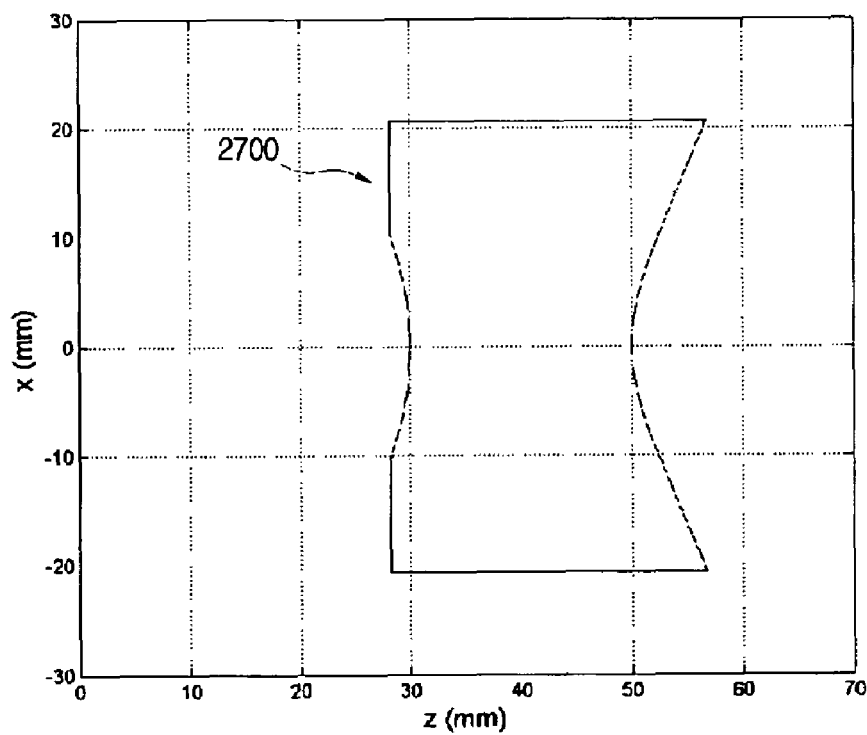

[Fig. 29]
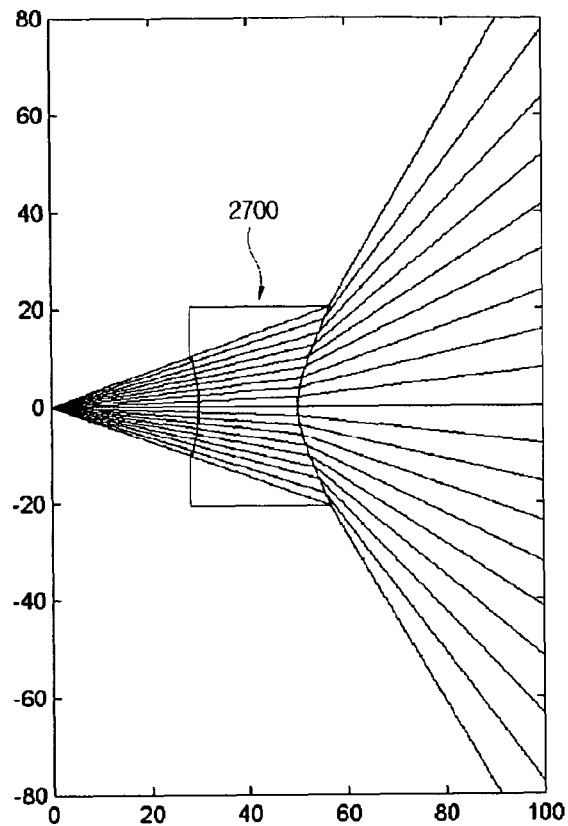
[Fig. 30]
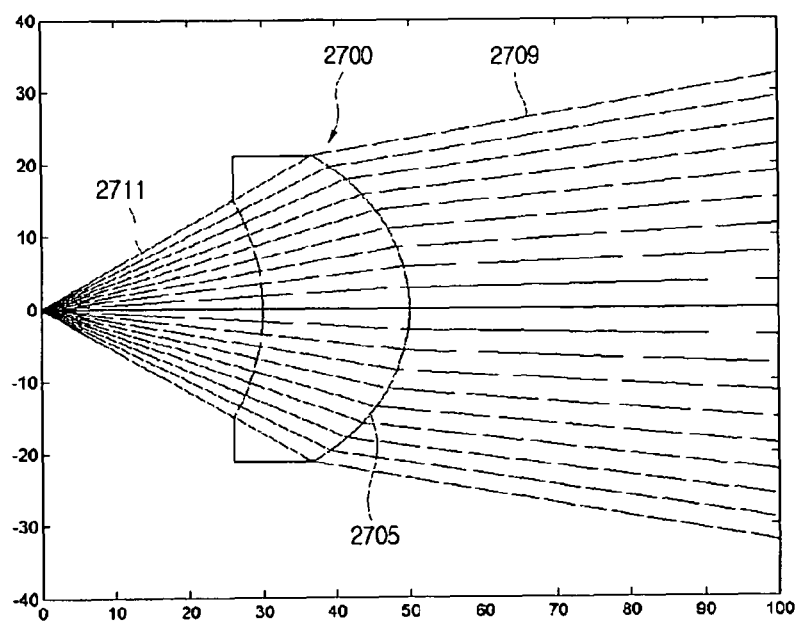

[Fig. 31]
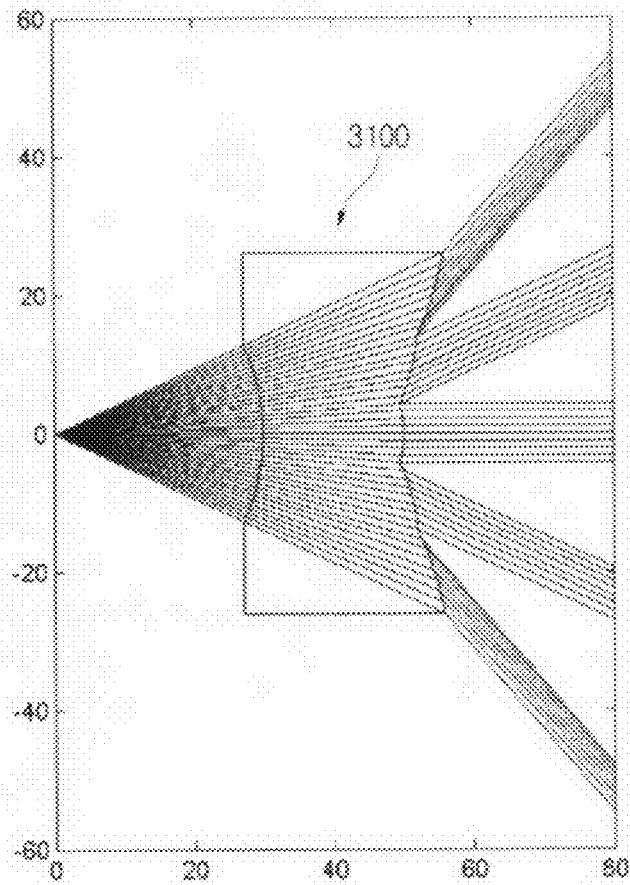
[Fig. 32]
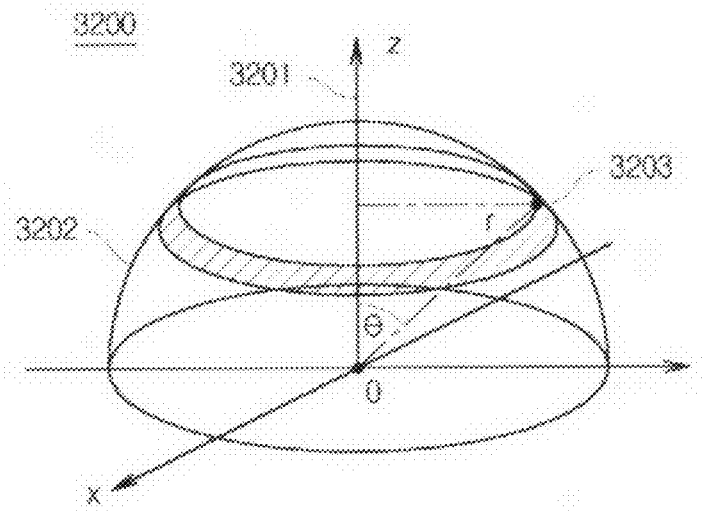

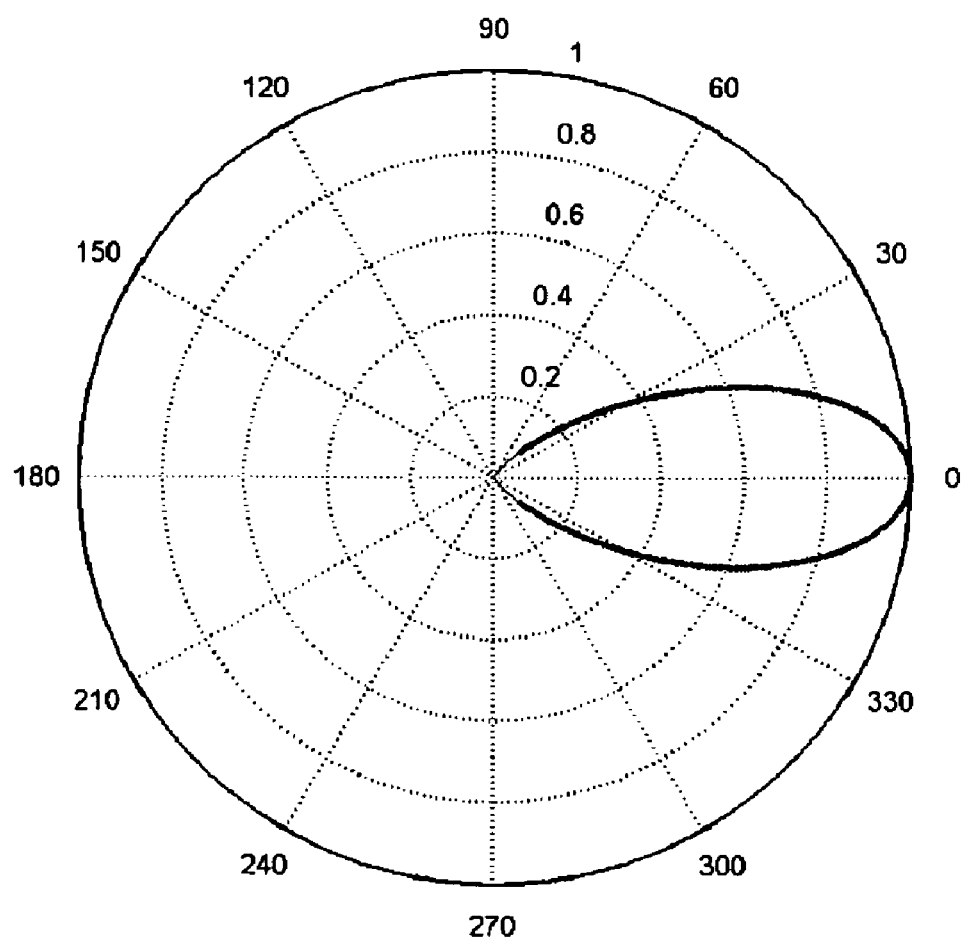
[Fig. 33]

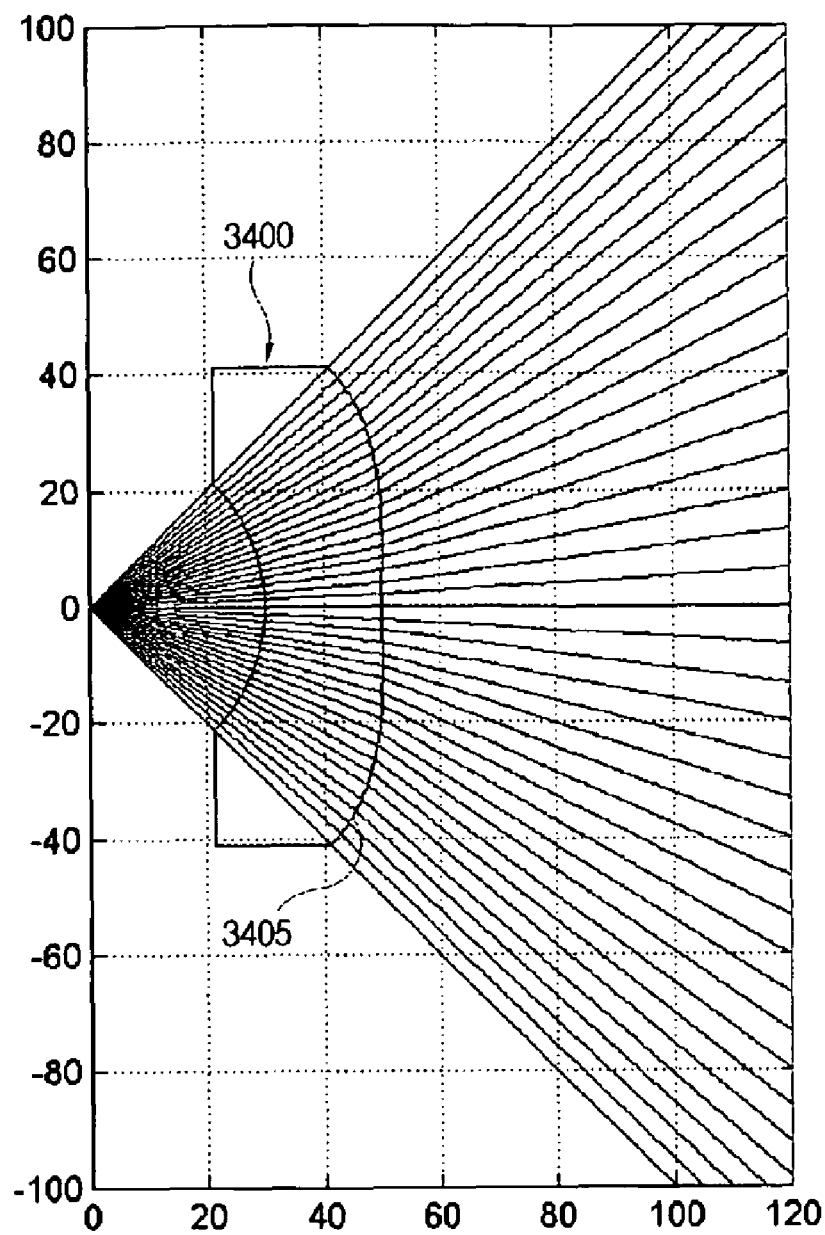
[Fig. 34]

[Fig. 35]
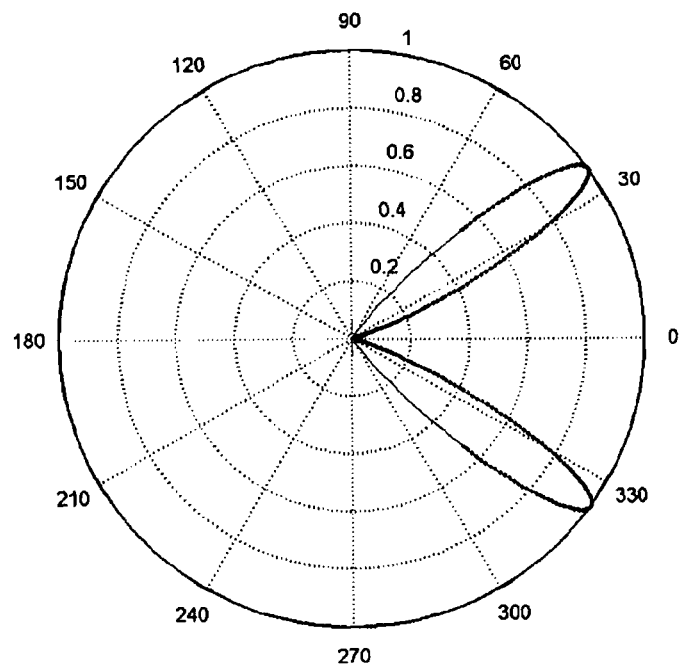
[Fig. 36]
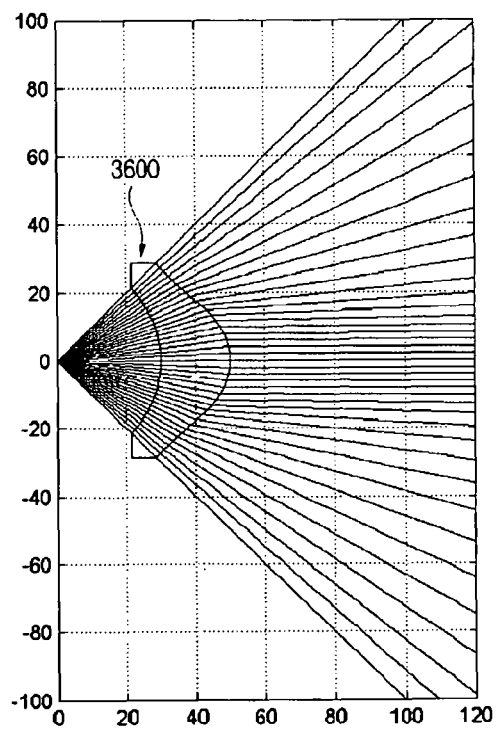

[Fig. 37]
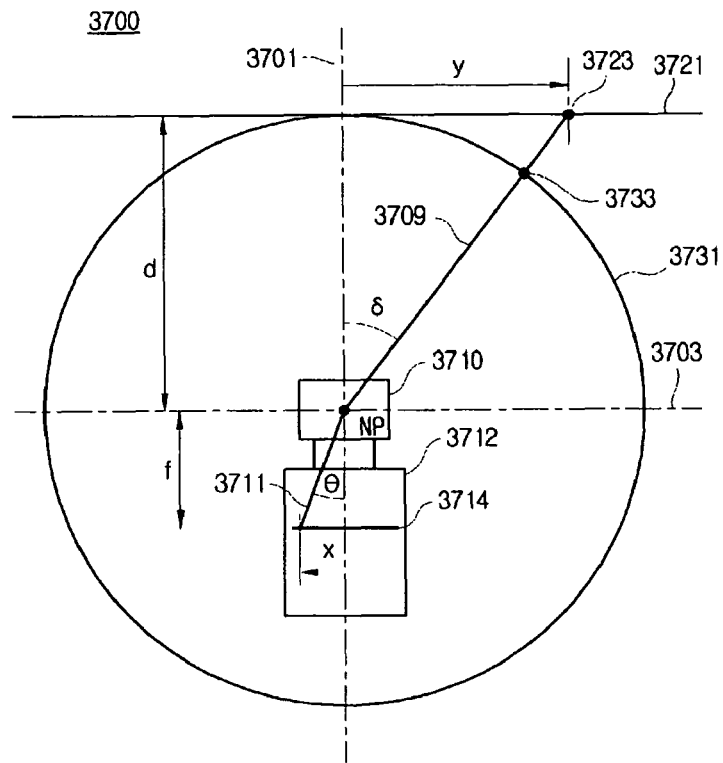
[Fig. 38]
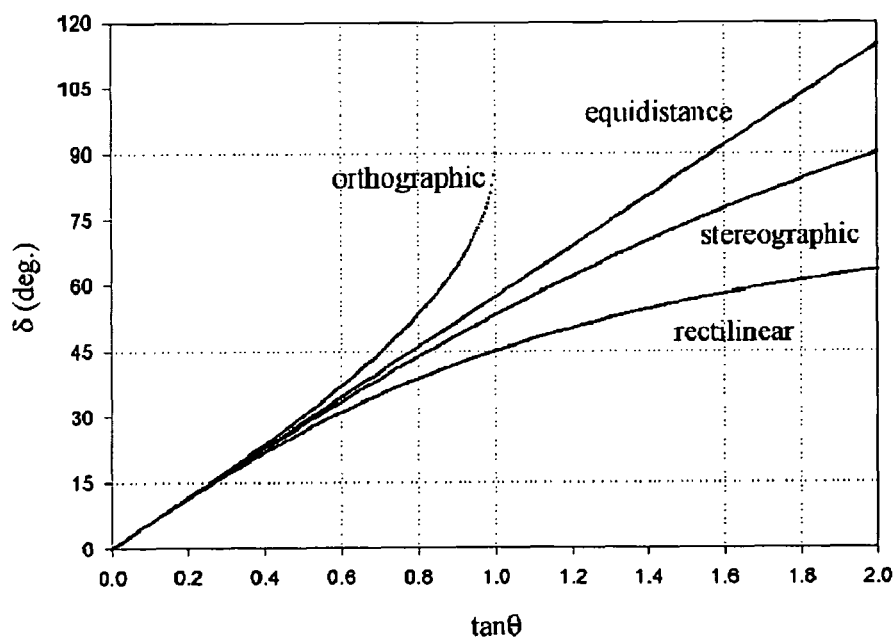

[Fig. 39]
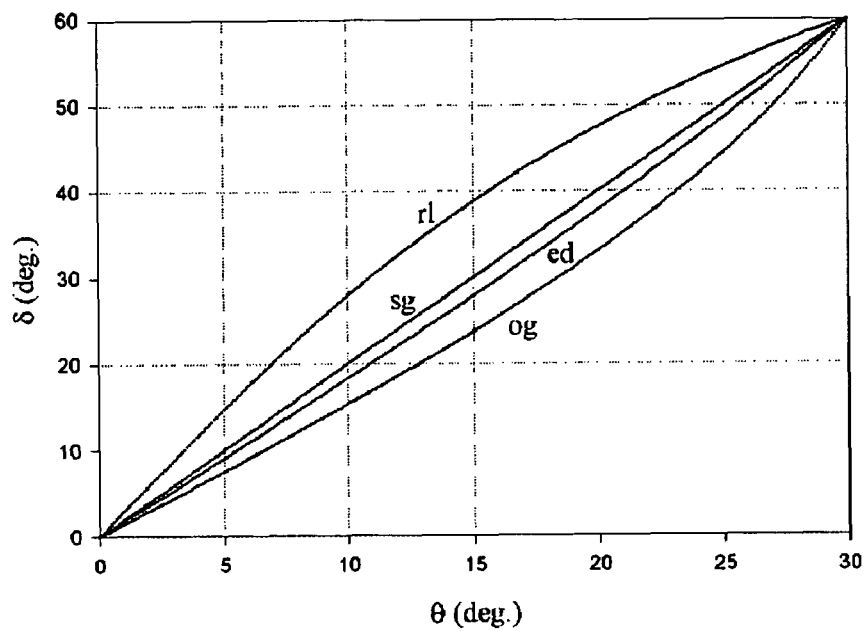
[Fig. 40]
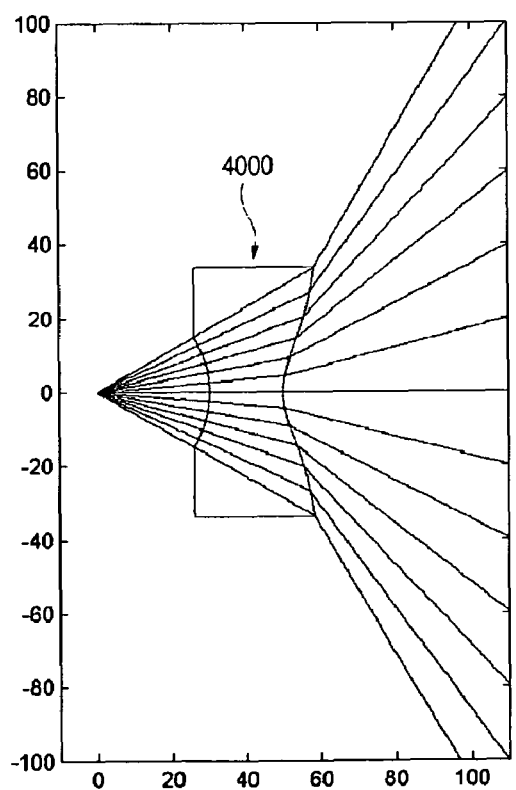

[Fig. 41]
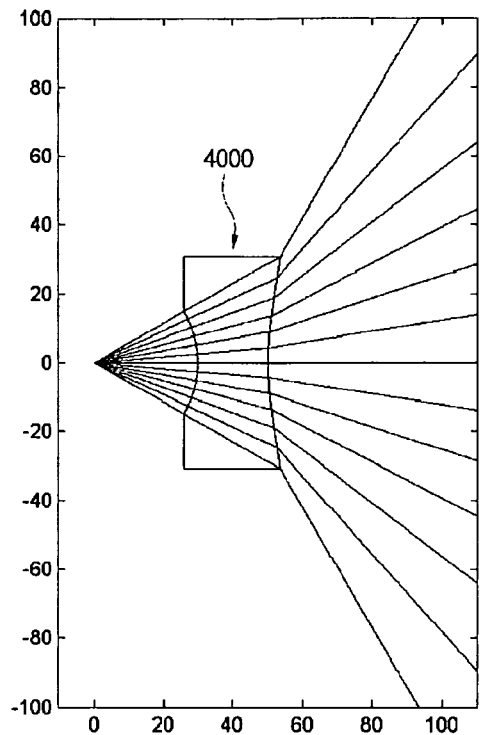
[Fig. 42]
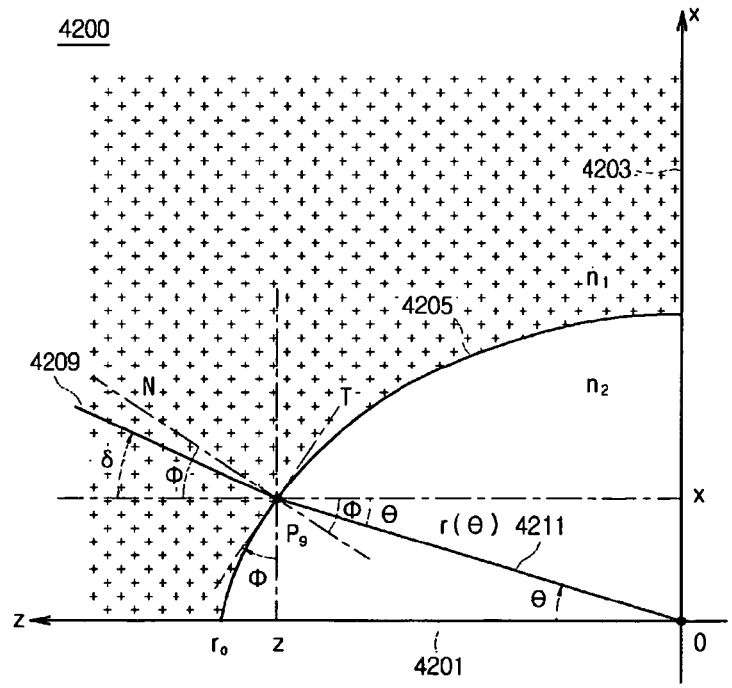

[Fig. 43]
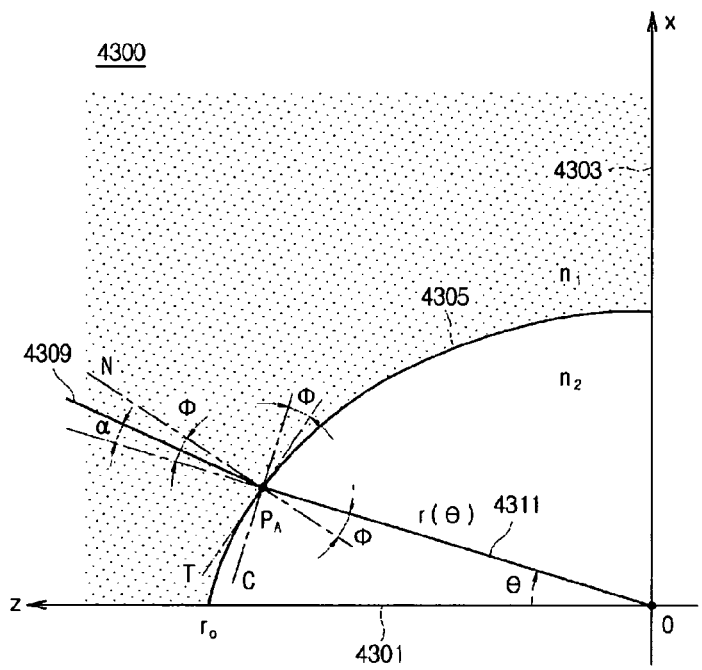
[Fig. 44]
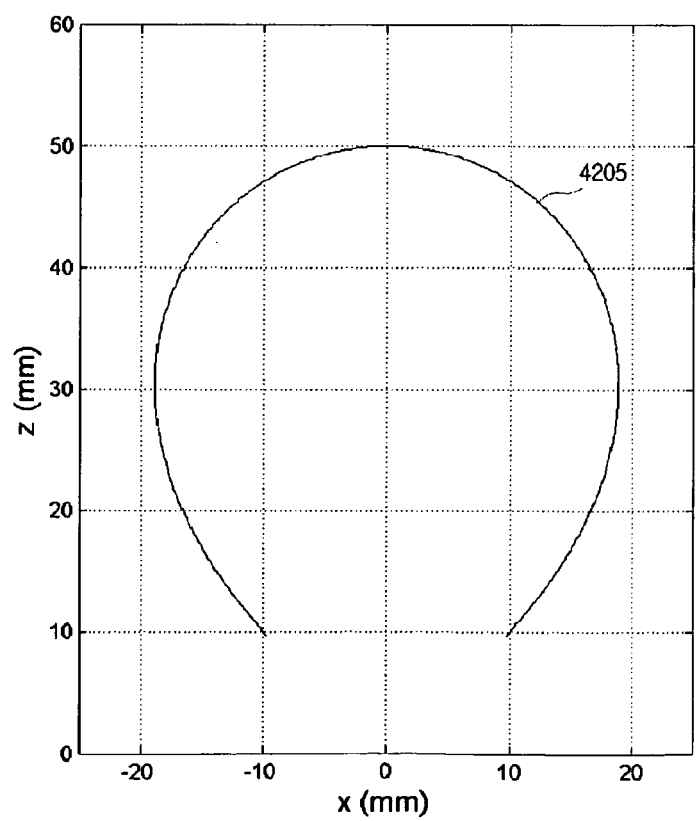

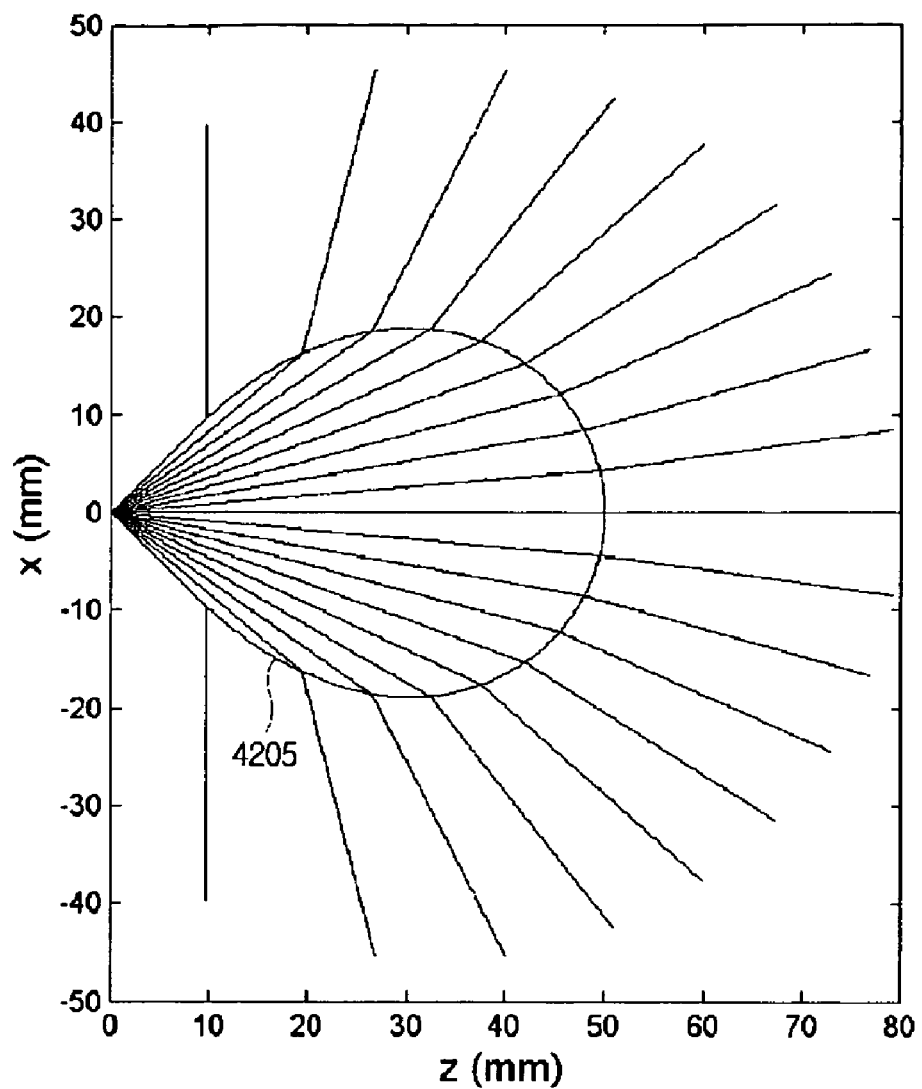
[Fig. 45]

[Fig. 46]
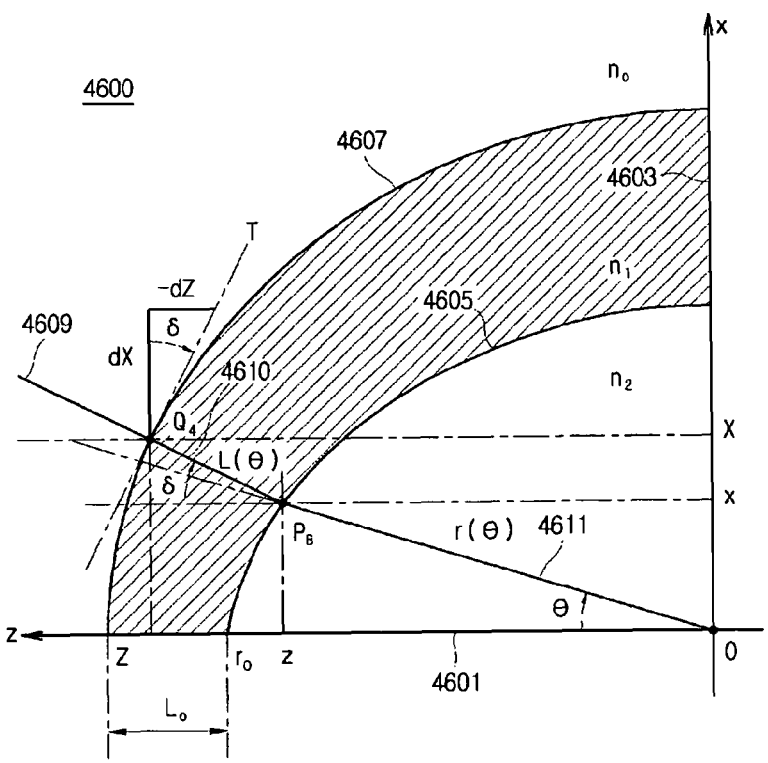
[Fig. 47]
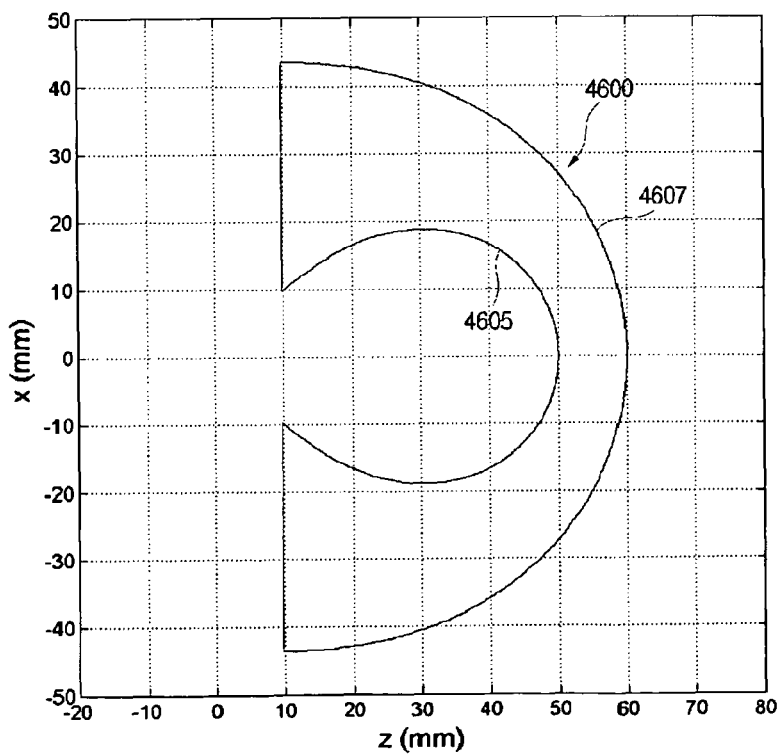

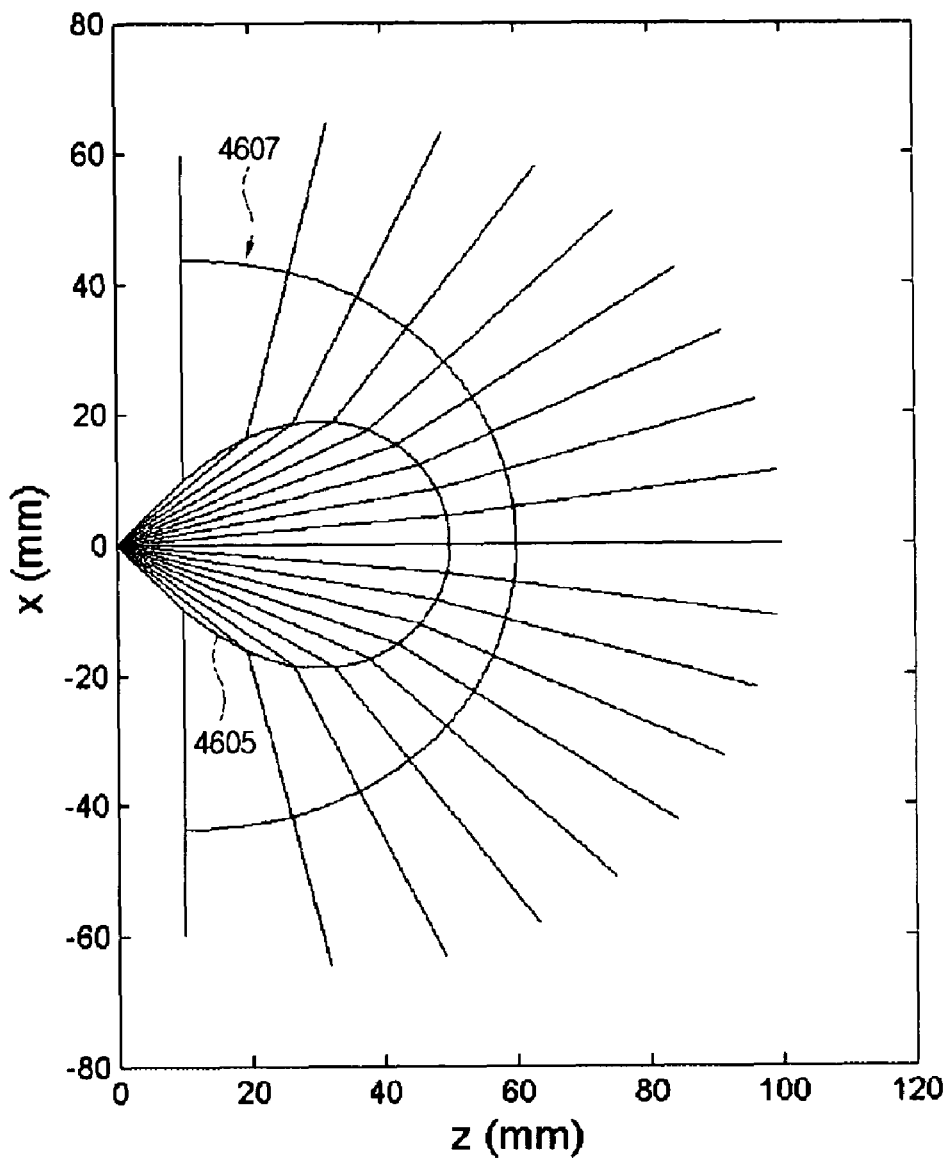
[Fig. 48]

[Fig. 49]
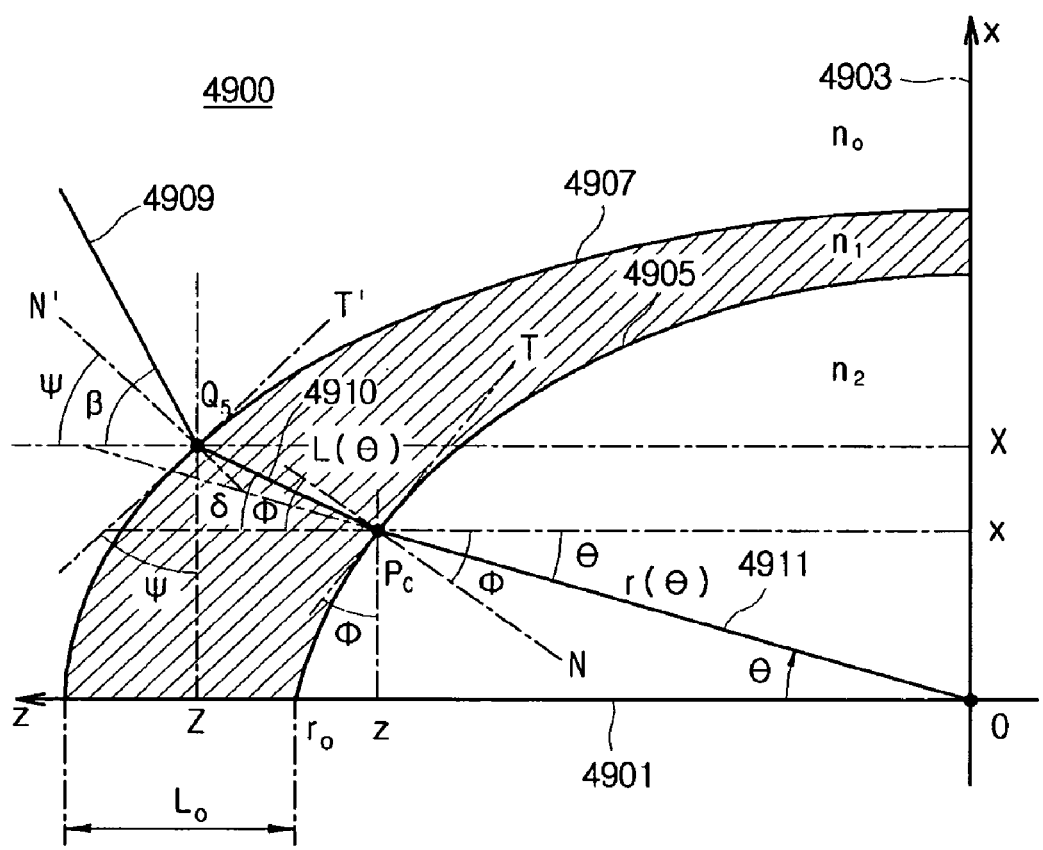

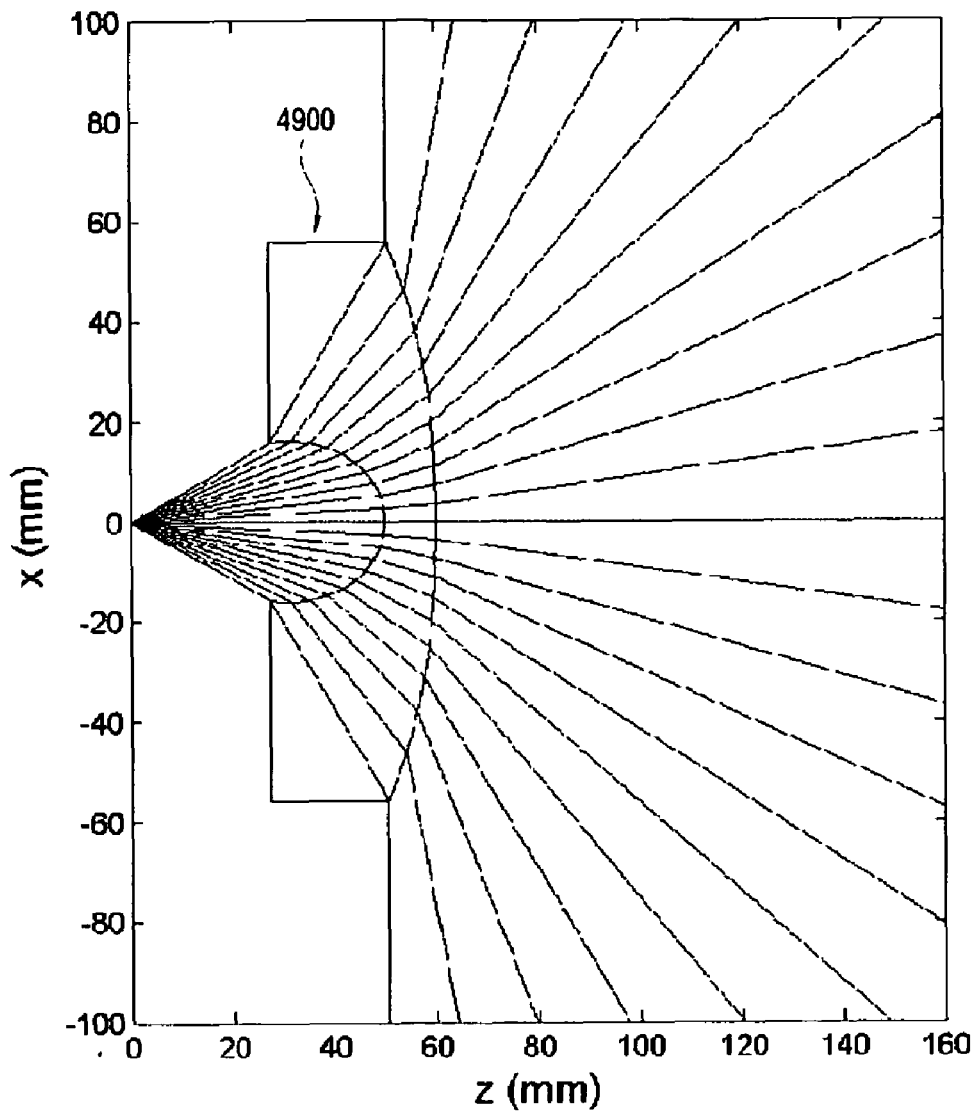
[Fig. 50]

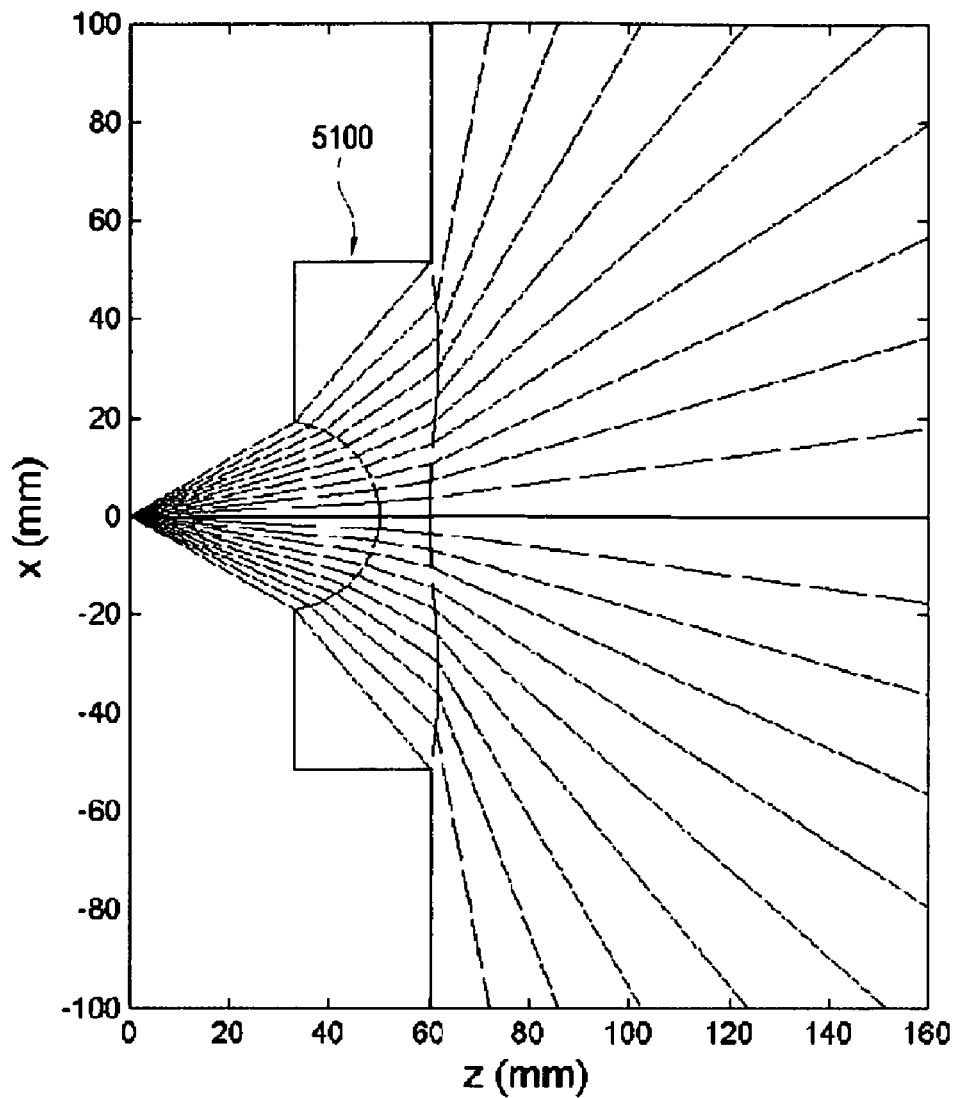
[Fig. 51]

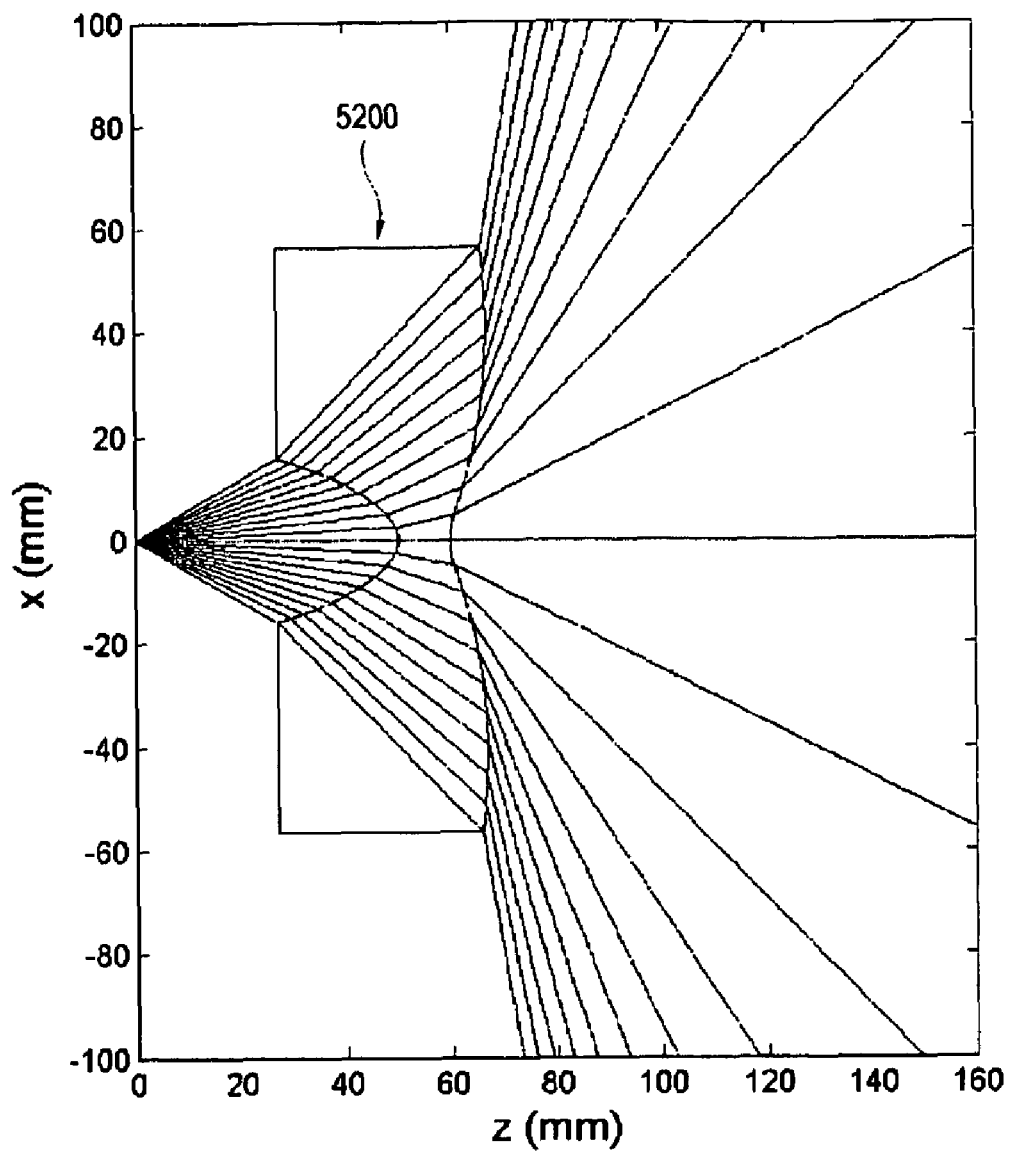
[Fig. 52]

OPTICAL COMPONENTS INCLUDING LENS HAVING AT LEAST ONE ASPHERICAL REFRACTIVE SURFACE

TECHNICAL FIELD

The present invention generally relates to a lens and an optical component, and more particularly to an optical component including a lens having at least one aspherical refractive surface.

BACKGROUND ART

Generally, imaging optical systems are composed of spherical lenses because of its distinctive advantages in terms of manufacturing and measurement. A spherical lens includes a refractive surface which coincides with a part of a spherical surface having a radius R. As shown in FIG. 1, the refractive surface 105 of a spherical lens having a rotationally symmetric profile can be conveniently described in a cylindrical coordinate system with the z-axis coinciding with the rotational symmetry axis and having the coordinate origin O at the lens vertex. The profile of the refractive surface 105 can be described as a collection of points S on the refractive surface 105. The rectangular coordinates of a point S are given as ($\rho$, $z'$), where $\rho$ is an axial radius measured perpendicular to the z-axis, and $z'$ is a height measured along the z-axis. More preferably, as shown in Eq. 1, the profile of the refractive surface 105 can be represented by a function $z'=z'(\rho)$ where the axial radius $\rho$ is an independent variable and the height $z'$ is a dependent variable.

$$z'(\rho) = \frac{c\rho^2}{1 + \sqrt{1 - c^2\rho^2}} \quad \text{MathFigure 1}$$

In Eq. 1, c is the vertex curvature and given as a reciprocal of the radius of curvature R (i.e., c=1/R). The spherical surface given in Eq. 1 is a special example of a conic surface given as Eq. 2.

$$z(\rho) = \frac{c\rho^2}{1 + \sqrt{1 - (1+k)c^2\rho^2}} \quad \text{MathFigure 2}$$

In Eq. 2, c is again the vertex curvature which is identical to that in Eq. 1 and k is a conic constant. Depending on the value of the conic constant, the aspherical surface profile in Eq. 2 varies greatly. For example, a spherical surface corresponds to k=0, a parabolic surface to k=−1, a hyperbolic surface to k<−1, a prolate elliptical surface to −1<k<0, and an oblate elliptical surface to k>0.

A conic curve is what the outline of a cross-section can have, when a cone is sliced at an arbitrary angle. For instance, if a cone has a vertex half-angle $\theta$, then the outline of the cross-section is a circle when the cone is sliced perpendicular to the rotational symmetry axis of the cone. Likewise, if the cone is sliced at an angle $\theta$ with respect to the rotational symmetry axis, then the outline of the cross-section is a parabola. Similarly, it is a hyperbola when the slice angle is smaller than $\theta$, and it is an ellipse when the slice angle is larger than $\theta$. Meanwhile, the trace obtained by rotating a conic curve around the symmetry axis forms a conic surface.

As also shown in FIG. 1, the profile of a rotationally symmetric aspherical refractive surface 107, which is generally used in imaging optical systems, is defined as a collection of points P on the aspherical refractive surface in the same manner as that of the spherical refractive surface 105. The cylindrical coordinates of the points P are given as ($\rho$, z), where $\rho$ is an axial radius measured perpendicular to the z-axis 101 and z is a height measured along the z-axis 101. More preferably, as shown in Eq. 3, the profile of the aspherical refractive surface 107 can be represented by a function $z=z(\rho)$, where the axial radius $\rho$ is an independent variable and the height z is a dependent variable.

$$z(\rho) = \frac{c\rho^2}{1 + \sqrt{1 - (1+k)c^2\rho^2}} + \quad \text{MathFigure 3}$$
$$A\rho^4 + B\rho^6 + C\rho^8 + D\rho^{10} + \ldots$$

In Eq. 3, A, B, C, and D are the 4th, the 6th, the 8th, and the 10th order aspherical deformation coefficients, respectively. The equation for the aspherical refractive surface given in Eq. 3 implicitly assumes that the aspherical refractive surface is substantially equal to a conic surface, or at the least the deviation from a conic surface is not significant. In order to design an optimal lens using the aspherical lens formula given in Eq. 3, it is first necessary to set-up a merit function and then find the best combination of coefficients c, k, A, B, C, D which renders the merit function value a minimum. In such a multidimensional optimization problem, the result considerably depends on the optimization algorithm. Furthermore, even if the same optimization algorithm is used, the result can be considerably different depending on the number of the aspherical deformation coefficients, such as A, B and C, or equivalently to the order of the equation. Still, even under the same conditions for all of the above mentioned factors, the result can still be greatly different depending on how close the initial values of the variables are to the optimal set of values. Accordingly, experience-based intuition plays an important role in designing a lens, and for this reason, lens design is considered as a discipline which lies between the science and the art. In addition to these, the aspherical lens equation given in Eq. 3 is not an orthogonal basis set which can be used to expand an arbitrary function. Thus, the same aspherical refractive surface can be expanded with different sets of coefficients. Besides, there are numerous lens shapes which cannot be represented by Eq. 3, and therefore the aspherical refractive surface given in Eq. 3 has limitations.

Sometimes, it is necessary to find the exact profile of an aspherical refractive surface having certain capabilities or characteristics. However, the previous method of lens design based on the multidimensional optimization method cannot mathematically describe the exact shape of an aspherical refractive surface having the desired capabilities or characteristics, and provides an approximate solution which strongly depends on the type of aspherical lens formula, the number of expansion terms, the structure of the merit function, and the initial values of the expansion coefficients. Further, when an inappropriate aspherical lens formula is employed, even an approximate solution may not be obtained, and even if an approximate solution is obtained, it may be difficult to calculate the error with the mathematically correct solution.

DISCLOSURE OF INVENTION

Technical Problem

The present invention is provided to solve the above mentioned drawbacks of the conventional technology. An optical component including lens having at least one aspherical refractive surface capable of satisfying desired performance and characteristics is disclosed.

Technical Solution

In accordance with a preferred embodiment of the present invention, there is provided an optical component including: at least a first aspherical refractive surface, wherein the first aspherical refractive surface constitute a part of a boundary between a first medium having a refractive index $n_1$ and a second medium having a refractive index $n_2$, a first curve is defined as a collection of intersections between the x-z plane of a rectangular coordinate system and the first aspherical refractive surface, wherein the origin of the rectangular coordinate system is located within the second medium, and the z-axis of the rectangular coordinate system passes through the origin and a point on the first aspherical refractive surface, the said first curve is symmetric about the z-axis, a distance from the origin to a first point on the first curve with a zenith angle $\theta$ is $r(\theta)$, rectangular coordinates (x, z) and polar coordinates ($\theta$, r) of the first point in the x-z plane satisfy relations given in the following Eqs., $$x(\theta) = r(\theta)\sin\theta$$

$$z(\theta) = r(\theta)\cos\theta$$

the distance $r(\theta)$ is given as the following Eq., $$r(\theta) = r(\theta_i)\exp\left[\int_{\theta_i}^{\theta} \frac{-n_1 \sin(\delta - \theta')}{n_1 \cos(\delta - \theta') - n_2} d\theta'\right]$$

said $\theta_i$ is a zenith angle of a second point on the first curve, said $r(\theta_i)$ is a corresponding distance from the origin to the second point, said $\delta$ is an arbitrary function of the zenith angle $\theta$ of the first point ($\delta = \delta(\theta)$), and the zenith angle $\theta$ ranges from a minimum $\theta_1$ not smaller than zero to a maximum $\theta_2$ smaller than $\pi/2$.

The present invention also provides an optical component including: at least a first aspherical refractive surface, wherein the first aspherical refractive surface constitute a part of a boundary between a first medium having a refractive index $n_1$ and a second medium having a refractive index $n_2$, a first curve is defined as a collection of intersections between the x-z plane of a rectangular coordinate system and the first aspherical refractive surface, wherein the origin of the rectangular coordinate system is located within the second medium, and the z-axis of the rectangular coordinate system passes through the origin and a point on the first aspherical refractive surface, the said first curve is symmetric about the z-axis, a distance from the origin to a first point on the first curve with a zenith angle $\theta$ is $r(\theta)$, rectangular coordinates (x, z) and polar coordinates ($\theta$, r) of the first point in the x-z plane satisfy relations given in the following Eqs., $$x(\theta) = r(\theta)\sin\theta$$

$$z(\theta) = r(\theta)\cos\theta$$

the distance $r(\theta)$ is given as the following Eq., $$r(\theta) = r(\theta_i)\exp\left[\int_{\theta_i}^{\theta} \frac{n_2 \sin\theta'}{n_2 \cos\theta' - n_1} d\theta'\right]$$

wherein $\theta_i$ is the zenith angle of a second point on the first curve, $r(\theta_i)$ is the corresponding distance from the origin to the second point, and the zenith angle $\theta$ ranges from a minimum $\theta_1$ not smaller than zero to a maximum $\theta_2$ smaller than $\pi/2$.

The present invention also provides an optical component including: a first lens surface; a second lens surface; a third lens surface; and a fourth lens surface, wherein the fourth lens surface constitute a part of a boundary between a fourth medium having a refractive index $n_4$ and a fifth medium having a refractive index $n_5$, the refractive index $n_4$ of the fourth medium is larger than the refractive index $n_5$ of the fifth medium ($n_4 > n_5$), a fourth curve is defined as a collection of intersections between the x-z plane of a rectangular coordinate system and the fourth lens surface, wherein an origin of the rectangular coordinate system is located within the fifth medium, and the z-axis of the rectangular coordinate system passes through the origin and a point on the fourth lens surface, the said fourth curve is symmetric about the z-axis, a distance from the origin to a first point on the fourth curve with a zenith angle $\theta$ is $r(\theta)$, rectangular coordinates (x, z) and polar coordinates ($\theta$, r) of the first point in the x-z plane satisfy relations given in the following Eqs., $$x(\theta) = r(\theta)\sin\theta$$

$$z(\theta) = r(\theta)\cos\theta$$

the distance $r(\theta)$ is given as the following Eq., $$r(\theta) = r(\theta_i)\exp\left[\int_{\theta_i}^{\theta} \frac{-n_5 \sin\theta'}{n_4 - n_5 \cos\theta'} d\theta'\right]$$

wherein $\theta_i$ is the zenith angle of a second point on the first curve, $r(\theta_i)$ is a corresponding distance from the origin to the second point, the zenith angle $\theta$ ranges from a minimum $\theta_1$ not smaller than zero to a maximum $\theta_2$ smaller than $\pi/2$, the first lens surface constitute a part of a boundary between a first medium having a refractive index $n_1$ and a second medium having a refractive index $n_2$, the refractive index $n_1$ of the first medium is smaller than the refractive index $n_2$ of the second medium ($n_1 < n_2$), a first curve defined as a collection of intersections between the x-z plane and the first lens surface is symmetric about the z-axis, a distance from the origin to a third point on the first curve having the zenith angle $\theta$ is $R(\theta)$, rectangular coordinates (X, Z) and polar coordinates ($\theta$, R) of the third point in the x-z plane satisfy the following relations given in the following Eqs., $$X(\theta) = R(\theta)\sin\theta$$

$$Z(\theta) = R(\theta)\cos\theta$$

the distance $R(\theta)$ is given as the following Eq., $$R(\theta) = R(\theta_i)\exp\left[\int_{\theta_i}^{\theta} \frac{-n_1 \sin\theta'}{n_2 - n_1 \cos\theta'} d\theta'\right]$$

said $R(\theta_i)$ is a distance from the origin to a fourth point on the first curve having the zenith angle $\theta_i$, a second curve defined as a collection of intersections between the x-z plane and the second lens surface is a circular arc around the origin with a radius $R_B$, a third curve defined as a collection of intersections between the x-z plane and the third lens surface is a circular arc around the origin with a radius $r_F$, the radius $R_B$ of the second curve is not larger than the shortest distance to the third points on the first curve ($R_B \leq \min(R(\theta))$), the radius $r_F$ of the third curve is not smaller than the longest distance to the first points on the fourth curve ($r_F \geq \max(r(\theta))$), the radius $R_B$ of the second curve is not smaller than the radius $r_F$ of the third curve ($R_B \geq r_F$), the space between the first lens surface and the second lens surface is filled with the second medium having the refractive index $n_2$, the space between the second lens surface and the third lens surface is filled with a third medium having a refractive index $n_3$, and the space between the third lens surface and the fourth lens surface is filled with a fourth medium having the refractive index $n_4$.

The present invention also provides an optical component including: a first lens surface; and a second lens surface, wherein the first lens surface constitutes a part of a boundary between a first medium having a refractive index $n_0$ and a second medium having a refractive index $n_1$, the second lens surface constitutes a part of a boundary between the second medium and a third medium having a refractive index $n_2$ a first curve is defined as a collection of intersections between the x-z plane of a rectangular coordinate system and the first lens surface, wherein an origin of the rectangular coordinate system is located within the third medium, and the z-axis of the rectangular coordinate system passes through the origin and a point on the first lens surface, the said first curve is symmetric about the z-axis, a second curve is defined as a collection of intersections between the x-z plane and the second lens surface, and the second curve is a straight line segment perpendicular to the z-axis, a distance from the origin to the second curve is $f_B$, rectangular coordinates (x, z) and polar coordinates ($\theta$, r) of a first point on the second curve in the x-z plane with a zenith angle $\theta$ is given as the following Eqs., $$x(\theta) = f_B \tan \theta$$

$$z(\theta) = f_B$$

the zenith angle $\theta$ ranges from a minimum $\theta_1$ not smaller than zero to a maximum $\theta_2$ smaller than $\pi/2$, rectangular coordinates (X, Z) of a second point on the first curve corresponding to the first point on the second curve satisfy relations given in the following Eqs., $$X(\theta) = f_B \tan \theta + L(\theta) \sin \delta(\theta)$$

$$Z(\theta) = f_B + L(\theta) \cos \delta(\theta)$$

said $L(\theta)$ is the distance from the first point to the second point, and said $L(\theta)$ is given as the following Eq., $$L(\theta) = \frac{1}{F(\theta)} \left\{ L(\theta_i) + \int_{\theta_i}^{\theta} F(\theta') B(\theta') d\theta' \right\}$$

said $L(\theta_i)$ is the distance from a third point on the second curve with $\theta = \theta_i$ to the corresponding fourth point on the first curve, said $F(\theta)$ is given as the following Eq., $$F(\theta) = \exp[\int_{\theta_i}^{\theta} H(\theta') d\theta']$$

said $A(\theta)$ is given as the following Eq., $$A(\theta) = \frac{n_o}{\sqrt{n_1^2 - n_2^2 \sin^2 \theta}} \frac{n_2^2 \sin\theta \cos\theta}{n_1^2 - n_o \sqrt{n_1^2 - n_2^2 \sin^2 \theta}}$$

said $B(\theta)$ is given as the following Eq., and $$B(\theta) = -\frac{f_B}{\cos^2 \theta} \frac{n_1 n_2 \sin\theta}{n_1^2 - n_o \sqrt{n_1^2 - n_2^2 \sin^2 \theta}}$$

and said $\delta(\theta)$ is given as the following Eq.

$$\delta(\theta) = \tan^{-1}\left[\frac{n_2 \sin\theta}{\sqrt{n_1^2 - n_2^2 \sin^2 \theta}}\right]$$

The present invention also provides an optical component including: a first lens surface; and a second lens surface, wherein the first lens surface constitutes a part of a boundary between a first medium having a refractive index $n_0$ and a second medium having a refractive index $n_1$, the second lens surface constitutes a part of a boundary between the second medium and a third medium having a refractive index $n_2$, a first curve is defined as a collection of intersections between the x-z plane of a rectangular coordinate system and the first lens surface, wherein the origin of the rectangular coordinate system is located within the third medium, and the z-axis of the rectangular coordinate system passes through the origin and a point on the first lens surface, the said first curve is a straight line segment perpendicular to the z-axis, a second curve is defined as a collection of intersections between the x-z plane and the second lens surface, and the second curve is symmetric about the z-axis, the distance from the origin to the first curve is $z_o$, rectangular coordinates (x, z) and polar coordinates ($\theta$, r) of a first point on the first curve in the x-z plane with a zenith angle $\theta$ satisfy relations given in the following Eqs., $$x(\theta) = z_o \tan \theta$$

$$z(\theta) = z(\theta) \equiv z_o$$

the zenith angle $\theta$ ranges from the minimum $\theta_1$ not smaller than zero to the maximum $\theta_2$ smaller than $\pi/2$, rectangular coordinates (X, Z) of a second point on the second curve corresponding to the first point on the first curve satisfy relations given in the following Eqs., $$X(\theta) = z_o \tan \theta - L(\theta) \sin \delta(\theta)$$

$$Z(\theta) = z_o - L(\theta) \cos \delta(\theta)$$

said $L(\theta)$ is the distance from the first point to the second point, and said $L(\theta)$ is given as the following Eq., $$L(\theta) = \frac{1}{F(\theta)} \left\{ L(\theta_i) + \int_{\theta_i}^{\theta} F(\theta') B(\theta') d\theta' \right\}$$

said $L(\theta_i)$ is the distance from a third point on the first curve with $\theta = \theta_i$ to the corresponding fourth point on the second curve, said $F(\theta)$ is given as the following Eq., $$F(\theta) = \exp[\int_{\theta_i}^{\theta} A(\theta') d\theta']$$

said $A(\theta)$ is given as the following Eq., $$A(\theta) = \frac{n_2}{\sqrt{n_1^2 - n_o^2\sin^2\theta}} \frac{n_o^2\sin\theta\cos\theta}{n_1^2 - n_2\sqrt{n_1^2 - n_o^2\sin^2\theta}}$$

said $B(\theta)$ is given as the following Eq., $$B(\theta) = \frac{z_0}{\cos^2\theta} \frac{n_1 n_0 \sin\theta}{n_1^2 - n_2\sqrt{n_1^2 - n_0^2\sin^2\theta}}$$

and said $\delta(\theta)$ is given as the following Eq.

$$\delta(\theta) = \tan^{-1}\left[\frac{n_0\sin\theta}{\sqrt{n_1^2 - n_0^2\sin^2\theta}}\right]$$

The present invention also provides an optical component including: a first aspherical refractive surface; and a second aspherical refractive surface, wherein the first aspherical refractive surface constitutes a part of a boundary between a first medium having a refractive index $n_0$ and a second medium having a refractive index $n_1$, the second aspherical refractive surface constitutes a part of a boundary between the second medium and a third medium having a refractive index $n_2$, a second curve is defined as a collection of intersections between the x-z plane of a rectangular coordinate system and the second aspherical refractive surface, wherein the origin of the rectangular coordinate system is located within the third medium, and the z-axis of the rectangular coordinate system passes through the origin and a point on the second aspherical refractive surface, the said first curve is symmetric about the z-axis, a distance from the origin to the first point on the second curve with a zenith angle $\theta$ is $r(\theta)$, rectangular coordinates (x, z) and polar coordinates ($\theta$, r) of the first point in the x-z plane satisfy relations shown in the following Eqs., $$x(\theta) = r(\theta)\sin\theta$$

$$z(\theta) = r(\theta)\cos\theta$$

the distance $r(\theta)$ is given as the following Eq., $$r(\theta) = r(\theta_i)\exp\left[\int_{\theta_i}^{\theta} \frac{-n_1\sin(\delta - \theta')}{n_1\cos(\delta - \theta') - n_2} d\theta'\right]$$

said $\theta_i$ is a zenith angle of a second point on the first curve, said $r(\theta_i)$ is a distance from the origin to the second point, said $\delta$ is an arbitrary function of the zenith angle $\theta$ of the first point ($\delta = \delta(\theta)$), the zenith angle $\theta$ ranges from a minimum $\theta_1$ not smaller than zero to a maximum $\theta_2$ smaller than $\pi/2$, a first curve is defined as collection of intersections between the x-z plane and the first aspherical refractive surface, and the first curve is symmetric about the z-axis, rectangular coordinates (X, Z) of a third point on the first curve corresponding to the first point on the second curve satisfy relations shown in the following Eqs., $$X(\theta) = r(\theta)\sin\theta + L(\theta)\sin\delta(\theta)$$

$$Z(\theta) = r(\theta)\cos\theta + L(\theta)\cos\delta(\theta)$$

$$L(\theta) = L(\theta_i) + \int_{\theta_i}^{\theta}\left[\frac{n_2 r(\theta')\sin(\delta - \theta')}{n_1\cos(\delta - \theta') - n_2}\right]d\theta'$$

said $L(\theta)$ is a distance from the first point to the third point, said $L(\theta_i)$ is a distance from the second point to a fourth point on the first curve corresponding to the second point.

The present invention also provides an optical component comprising: a first aspherical refractive surface; and a second aspherical refractive surface, wherein the first aspherical refractive surface constitutes a part of a boundary between a first medium having a refractive index $n_0$ and a second medium having a refractive index $n_1$, the second aspherical refractive surface constitutes a part of a boundary between the second medium and a third medium having a refractive index $n_2$, a second curve is defined as a collection of intersections between the x-z plane of a rectangular coordinate system and the second aspherical refractive surface, wherein the origin of the rectangular coordinate system is located within the third medium, and a z-axis of the rectangular coordinate system passes through the origin and a point on the second aspherical refractive surface, the said second curve is symmetric about the z-axis, a distance from the origin to a first point on the second curve with a zenith angle $\theta$ is $r(\theta)$, rectangular coordinates (x, z) and polar coordinates ($\theta$, r) of the first point in the x-z plane satisfy relations shown in the following Eqs., $$x(\theta) = r(\theta)\sin\theta$$

$$z(\theta) = r(\theta)\cos\theta$$

the distance $r(\theta)$ is given as the following Eq., $$r(\theta) = r(\theta_i)\exp\left[\int_{\theta_i}^{\theta} \frac{-n_1\sin(\delta - \theta')}{n_1\cos(\delta - \theta') - n_2} d\theta'\right]$$

said $\theta_i$ is a zenith angle of a second point on the first curve, said $r(\theta_i)$ is a distance from the origin to the second point, the zenith angle $\theta$ ranges from a minimum $\theta_1$ not smaller than zero to a maximum $\theta_2$ smaller than $\pi/2$, a first curve is defined as a collection of intersections between the x-z plane and the first aspherical refractive surface, and the first curve is symmetric about the z-axis, rectangular coordinates (X, Z) of a third point on the first curve corresponding to the first point on the second curve satisfy relations shown in the following Eqs., $$X(\theta) = r(\theta)\sin\theta + L(\theta)\sin\delta(\theta)$$

$$Z(\theta) = r(\theta)\cos\theta + L(\theta)\cos\delta(\theta)$$

$$L(\theta) = \frac{1}{F(\theta)}\left\{L(\theta_i) + \int_{\theta_i}^{\theta} F(\theta')B(\theta')d\theta'\right\}$$

said $L(\theta)$ is a distance from the first point to the third point, said $L(\theta_i)$ is a distance from the second point to a fourth point on the first curve corresponding to the second point, said $F(\theta)$ is given as the following Eq., $$F(\theta) = \exp[\int_{\theta_1}^{\theta} A(\theta')d\theta']$$

said A(θ) is given as the following Eq., $$A(\theta) = -\frac{n_0 \sin(\beta - \delta)}{n_1 - n_0 \cos(\beta - \delta)} \frac{d\delta}{d\theta}$$

said B(θ) is given as the following Eq., $$B(\theta) = -\frac{n_0 n_1 \sin(\beta - \delta) + n_1 n_2 \sin(\delta - \theta) + n_2 n_0 \sin(\theta - \beta)}{\{n_1 \cos(\delta - \theta) - n_2\}\{n_0 \cos(\beta - \delta) - n_1\}} r(\theta)$$

said β is an arbitrary function of the zenith angle θ(β=β(θ)), and said δ(θ) takes an arbitrary value between θ and β(θ).

ADVANTAGEOUS EFFECTS

The exact profile of an aspherical refractive surface can be obtained rapidly. Various optical components can be configured with the aspherical refractive surface having the exact shape.

BRIEF DESCRIPTION OF THE DRAWINGS

FIG. 1 is a schematic diagram illustrating the profiles of conventional spherical and aspherical refractive surfaces.

FIG. 2 is a schematic diagram illustrating the profile of a lens having an aspherical refractive surface in accordance with a preferred embodiment 1 of the present invention.

FIG. 3 shows the profile of an aspherical refractive surface and the ray trajectories in accordance with a preferred embodiment 1a of the present invention.

FIG. 4 shows a rotationally symmetric aspherical lens in accordance with a preferred embodiment 1b of the present invention.

FIG. 5 shows a cylindrical aspherical lens in accordance with a preferred embodiment 1c of the present invention.

FIG. 6 shows a toric aspherical lens in accordance with a preferred embodiment 1d of the present invention.

FIG. 7 is a schematic diagram of a lens having two aspherical refractive surfaces in accordance with a preferred embodiment 2 of the present invention.

FIG. 8 shows aspherical refractive surfaces in accordance with a preferred embodiment 2a of the present invention.

FIG. 9 shows the ray trajectories for the lens shown in FIG. 8.

FIG. 10 is a schematic diagram illustrating an aspherical refractive surface in accordance with a preferred embodiment 3 of the present invention.

FIG. 11 shows the profile of an aspherical refractive surface and the ray trajectories in accordance with a preferred embodiment 3a of the present invention.

FIG. 12 shows the profile of a lens in accordance with a preferred embodiment 3b of the present invention.

FIG. 13 is a schematic diagram illustrating an aspherical refractive surface in accordance with a preferred embodiment 4 of the present invention.

FIG. 14 shows the profile of an aspherical refractive surface and the ray trajectories in accordance with a preferred embodiment 4a of the present invention.

FIG. 15 shows the profile of a lens in accordance with a preferred embodiment 4b of the present invention.

FIG. 16 shows an example of converting a collimated beam into a diverging ray using the lens shown in FIG. 15.

FIG. 17 is a schematic diagram illustrating the shape of a compound lens in accordance with a preferred embodiment 5 of the present invention.

FIG. 18 shows an example of a converter for changing the beam sizes in accordance with a preferred embodiment 5a of the present invention.

FIG. 19 is a schematic diagram illustrating the profile of an aspherical refractive surface in accordance with a preferred embodiment 6 of the present invention.

FIG. 20 shows the profile of an aspherical refractive surface and the ray trajectories in accordance with a preferred embodiment 6a of the present invention.

FIG. 21 shows the shape of a plano-convex lens including the aspherical refractive surface of the preferred embodiments 1 and 1a to 1d and demonstrates that this lens can be used to focus a collimated beam into a single spot.

FIG. 22 demonstrates a variation of ray trajectories as the left and the right-sides of the lens shown in FIG. 21 are exchanged to each other.

FIG. 23 is a schematic diagram illustrating the profile of a lens having an aspherical refractive surface in accordance with a preferred embodiment 7 of the present invention.

FIG. 24 shows the profile of a lens and the ray trajectories in accordance with a preferred embodiment 7a of the present invention.

FIG. 25 is a schematic diagram illustrating a lens having an aspherical refractive surface in accordance with a preferred embodiment 8 of the present invention.

FIG. 26 shows the profile of a lens and the ray trajectories in accordance with a preferred embodiment 8a of the present invention.

FIG. 27 is a schematic diagram illustrating the profile of a refractive surface of a converter for changing the field of view (FOV) in accordance with a preferred embodiment 9 of the present invention.

FIG. 28 shows a converter for changing the FOV in accordance with a preferred embodiment 9a of the present invention.

FIG. 29 shows the shape of a converter for changing the FOV and the ray trajectories in accordance with a preferred embodiment 9a of the present invention.

FIG. 30 shows the profile of a converter for changing the FOV and the ray trajectories in accordance with a preferred embodiment 9b of the present invention.

FIG. 31 shows the profile of a lens and the ray trajectories in accordance with a preferred embodiment 9c of the present invention.

FIG. 32 is a schematic diagram illustrating the relation between irradiance and flux for a light source.

FIG. 33 shows an example of the irradiation pattern of a light source.

FIG. 34 shows the profile of a lens and the ray trajectories in accordance with a preferred embodiment 9d of the present invention.

FIG. 35 shows the irradiation pattern of another exemplary light source.

FIG. 36 shows the profile a lens and the ray trajectories in accordance with a preferred embodiment 9e of the present invention.

FIG. 37 is a schematic diagram illustrating the relation between the zenith angle δ of the incident ray and the zenith angle θ of the refracted ray depending on the projection scheme of an optical imaging system such as a camera.

FIG. 38 is a graph comparing various projection schemes suitable for optical imaging systems.

FIG. 39 is an exemplary graph showing the zenith angle of the incident ray as a function of the zenith angle of the refracted ray when the ranges of the zenith angles of the incident and the refracted rays are set the same for the four representative projection schemes.

FIG. 40 shows the profile of a lens and the ray trajectories implementing the rectilinear projection scheme in accordance with a preferred embodiment 9f of the present invention.

FIG. 41 shows the profile of a lens and the ray trajectories implementing the equidistance projection scheme in accordance with a preferred embodiment 9g of the present invention.

FIG. 42 is a schematic diagram illustrating an aspherical refractive surface in accordance with a preferred embodiment 10 of the present invention.

FIG. 43 is another schematic diagram illustrating the aspherical refractive surface in accordance with a preferred embodiment 10 of the present invention.

FIG. 44 shows the profile of an aspherical refractive surface in accordance with a preferred embodiment 10a of the present invention.

FIG. 45 shows the profile of an aspherical refractive surface and the ray trajectories in accordance with a preferred embodiment 10a of the present invention.

FIG. 46 is a schematic diagram illustrating the profile of a lens in accordance with a preferred embodiment 11 of the present invention.

FIG. 47 shows the profile of a lens in accordance with a preferred embodiment 11a of the present invention.

FIG. 48 shows the profile of a lens and the ray trajectories in accordance with a preferred embodiment 11a of the present invention.

FIG. 49 is a schematic diagram illustrating the profile of a lens in accordance with a preferred embodiment 12 of the present invention.

FIG. 50 shows the profile of a lens and the ray trajectories in accordance with a preferred embodiment 12a of the present invention.

FIG. 51 shows the profile of a lens and the ray trajectories in accordance with a preferred embodiment 12b of the present invention.

FIG. 52 shows the profile of a lens and the ray trajectories in accordance with a preferred embodiment 12c of the present invention.

BEST MODE FOR CARRYING OUT THE INVENTION

Optical components in accordance with the present invention include not only a lens having at least one aspherical refractive surface but also a housing of a photoelectric element such as an light emitting diode (LED), and various other devices such as a beam expander for expanding the beam size and so on. An aspherical lens surface at which rays are refracted according to the Snell's law of refraction has a non-spherical shape. In the strict sense of the words, the refractive surface of an aspherical lens can be an arbitrary surface, the so-called free-form surface. The surface profile of a free-form lens can be defined as a collection of points M on the refractive surface. The rectangular coordinates of the point M, are given as (x, y, z). If the optical axis coincides with the z-axis of the rectangular coordinate system, then in order to describe the profile of the aspherical refractive surface, it is convenient to express the dependent variable z as a function of the two independent variables x and y as given in Eq. 4.

$$z=z(x,y) \quad \text{MathFigure 4}$$

Further, in the case that the aspherical refractive surface is rotationally symmetric about the z-axis, it is more preferable to use a cylindrical coordinate system or a spherical coordinate system for describing the profile of the aspherical refractive surface. Hereinafter, there will be explained preferred embodiments of the present invention with reference to FIGS. 2 to 52.

Preferred Embodiment 1

FIG. 2 schematically shows a cross-section 219 of a spherical-aberration-free rotationally-symmetric aspherical lens 200 (hereinafter, rotationally symmetric aspherical lens is simply referred to as "aspherical lens") in accordance with a preferred embodiment 1 of the present invention. Herein, between the two surfaces of a lens, the surface on the object side is referred to as the first lens surface, and the surface on the image side is referred to as the second lens surface. For example, in the aspherical lens 200 shown in FIG. 2, the left and the right surfaces thereof are the first and the second lens surfaces, respectively.

As shown in FIG. 2, the aspherical refractive surface (second lens surface) 205 is rotationally symmetric about an optical axis 201, where the optical axis coincides with the z-axis. Preferably, coordinates of a point $P_1$ on the aspherical refractive surface 205 may be expressed in a cylindrical coordinate system as $(\rho, z)$, where $\rho$ is an axial radius measured along the $\rho$-axis 203 and perpendicular to the z-axis and z is a height measured along the z-axis 201. More preferably, the aspherical refractive surface 205 can be fully described by expressing the height z as a function of the axial radius $\rho$ ($z=z(\rho)$). Therefore, the axial radius $\rho$ becomes an independent variable and the height z becomes a dependent variable. Here, the axial radius $\rho$ is a function of two independent variables x and y in the rectangular coordinate system, as given in Eq. 5.

$$\rho=\sqrt{x^2+y^2} \quad \text{MathFigure 5}$$

The aspherical refractive surface 205 constitutes a part of a boundary between a first medium having a refractive index $n_1$ and a second medium having a refractive index $n_2$, where $n_2$ is smaller than $n_1$. The origin O is located within the second medium. The space between the aspherical refractive surface 205 and the infinity to the object-side (i.e., the positive z-axis), is filled with the first medium having the refractive index $n_1$. Here, the term "infinity" is a generally used physical expression to mean "far enough not to have any effect". In reality, the infinity can be as close as a few millimeters.

Further, as shown in FIG. 2, if the first lens surface 207 is a plane surface and the second lens surface is the aspherical refractive surface 205, a plano-convex lens is obtained by filling the space between the two surfaces with the first medium. Since the first lens surface 207 is a plane surface perpendicular to the optical axis 201, an incident ray 209 which is parallel to the optical axis enters the first lens surface 207 without changing the propagation direction. Accordingly, the design of the aspherical refractive surface 205 is not affected by the presence or absence of the first lens surface 207. Also, this argument applies not only to the piano-convex lens shown in FIG. 2, but also to the various embodiments of the present invention including a lens having at least one aspherical refractive surface and other optical components.

Electromagnetic wave is refracted at a boundary between two different dielectric materials according to the Snell's law of refraction. Accordingly, it is to be noted that the optical components of the present invention should not be interpreted as to mean a device usable only in the visible range of the electromagnetic spectrum. In other words, optical components of the present invention are devices that can be used over the all ranges of the electromagnetic spectrum including visible, infrared, microwave, and soft x-ray ranges. Following the conventions in the field of geometrical optics, optical ray proceeds from the left to the right. Further, a ray before passing through the aspherical refractive surface 205 is referred to as an incident ray, and a ray which is refracted according to the Snell's law of refraction while passing through the aspherical refractive surface 205 is referred to as a refracted ray. In the spherical aberration-free lens, an incident ray which is incident onto the aspherical refractive surface 205 with zero field angle (i.e., parallel to the optical axis 201) is refracted at a point $P_1$ on the aspherical refractive surface 205, and the refracted ray 211 passes through the origin O lying on the optical axis 201 with a zenith angle θ. Here, a zenith angle is defined as an angle measured clockwise with respect to the positive z-axis and a nadir angle is defined as an angle measured counterclockwise with respect to the negative z-axis, so that a sum of the zenith angle and a nadir angle equals π(i.e., 180 degrees).

In the FIG. 2, the coordinates of the point $P_1$ can be expressed in a spherical coordinate system with the zenith angle θ of the refracted ray 211 and the distance r from the origin O to the point $P_1$. Similar to the case of the cylindrical coordinate system, the shape of the aspherical refractive surface 205 may be described by specifying the distance r as a function of the zenith angle θ as given in Eq. 6, where r is a dependent variable and θ is an independent variable.

$$r = r(\theta) \quad \text{MathFigure 6}$$

On the other hand, the distance r from the origin O to the point $P_1$ is expressed as a function of the rectangular coordinates (x, y, z), as is given in Eq. 7.

$$r = \sqrt{\rho^2 + z^2} = \sqrt{x^2 + y^2 + z^2} \quad \text{MathFigure 7}$$

Further, the coordinates (ρ, z) in the cylindrical coordinate system can be expressed as functions of the independent variable θ in the spherical coordinate system as given in Eqs. 8 and 9.

$$z(\theta) = r(\theta)\cos\theta \quad \text{MathFigure 8}$$

$$\rho(\theta) = r(\theta)\sin\theta \quad \text{MathFigure 9}$$

The profile of the aspherical refractive surface 205 may be defined in terms of an elevation angle φ=φ(θ) of a tangent plane T at an arbitrary point $P_1$ (θ, r). An elevation angle is defined as an angle measured from a plane perpendicular to the z-axis (i.e., the x-y plane) toward the zenith. Therefore, a sum of the zenith angle and the elevation angle becomes π/2 (i.e., 90 degrees). In accordance with a preferred embodiment 1, the profile of the aspherical refractive surface 205 is designed such that an incident ray 209 which is parallel to the optical axis 201 is refracted at the aspherical refractive surface 205, and the resultant refracted ray 211 passes through the origin O with a zenith angle θ having a value between a minimum $\theta_1$ and a maximum $\theta_2$. The minimum zenith angle $\theta_1$ is greater than 0 and the maximum zenith angle $\theta_2$ is smaller than π/2. The elevation angle φ of the tangent plane T is given as Eq. 10.

$$\tan\phi = \frac{dz}{d\rho} \quad \text{MathFigure 10}$$

By using Eqs. 8 and 9, the coordinates z and p can be expressed as functions of the zenith angle θ, and thus Eq. 10 can be transformed into the following Eq. 11.

$$\tan\phi = \frac{\frac{dz}{d\theta}}{\frac{d\rho}{d\theta}} \quad \text{MathFigure 11}$$

In order to calculate the numerator in Eq. 11 (i.e., dz/dθ), Eq. 8 is differentiated with respect to θ.

$$\frac{dz}{d\theta} = \frac{dr}{d\theta}\cos\theta - r\sin\theta = r'\cos\theta - r\sin\theta \quad \text{MathFigure 12}$$

In Eq. 12, prime (') denotes a differentiation with respect to θ. Similarly, in order to calculate the denominator in Eq. 11 (i.e., dρ/dθ), Eq. 9 is differentiated with respect to θ.

$$\frac{d\rho}{d\theta} = r'\sin\theta + r\cos\theta \quad \text{MathFigure 13}$$

By using Eqs. 12 and 13, Eq. 11 can be expressed as Eq. 14.

$$\tan\phi = \frac{r'\cos\theta - r\sin\theta}{r'\sin\theta + r\cos\theta} \quad \text{MathFigure 14}$$

The following Eq. 15 is obtained using the techniques of separation of variables for the Eq. 14.

$$\frac{r'}{r} = \frac{\sin\theta + \tan\phi\cos\theta}{\cos\theta - \tan\phi\sin\theta} \quad \text{MathFigure 15}$$

The following equation is obtained by formally integrating the Eq. 15.

$$r(\theta) = r(\theta_i)\exp\left[\int_{\theta_i}^{\theta}\frac{\sin\theta' + \tan\phi(\theta')\cos\theta'}{\cos\theta' - \tan\phi(\theta')\sin\theta'}d\theta'\right] \quad \text{MathFigure 16}$$

In Eq. 16, θ' is a dummy variable. The lower bound of the indefinite integral is $\theta_i$ and $r(\theta_i)$ is the corresponding distance from the origin O to a point on the aspherical refractive surface 205 with the zenith angle $\theta=\theta_i$. Preferably, the lower bound $\theta_i$ is zero and r(θ) equals the distance $r_0$ from the origin O to the intersection between the aspherical refractive surface 205 and the optical axis 201. In the nomenclature of geometrical optics, the origin O on the optical axis 201 is the secondary focal point of the aspherical refractive surface 205, and % is the back focal length B. The above-mentioned $n_1$, $n_2$, $\theta_1$, $\theta_2$, $\theta_i$ and $r(\theta_i)$ are the design parameters which are used in designing the aspherical refractive surface 205 in accordance with the present invention.

The incident ray 209 is refracted at the aspherical refractive surface 205 according to the Snell's law of refraction. Since the angle between a normal N perpendicular to the tangent plane T and the incident ray 209 at the point $P_1$ on the aspherical refractive surface 205 is φ, the angle of incidence is φ. On the other hand, the angle between the refracted ray 211 and the optical axis 201 is θ and, thus, the angle between the normal N and the refracted ray 211 is θ+φ. Therefore, the angle of refraction is θ+φ. The angle of incidence and the angle of refraction satisfy the Snell's law of refraction as given in Eq. 17.

$$n_1 \sin \phi = n_2 \sin(\theta + \phi)$$ MathFigure 17

Using trigonometrical functional relations, the Eq. 17 can be transformed into the following Eq. 18.

$$(n_1 - n_2 \cos\theta)\sin\phi = n_2 \sin\theta \cos\phi$$ MathFigure 18

Therefore, the slope tan φ of the tangent plane T is obtained as Eq. 19.

$$\tan\phi = \frac{n_2 \sin\theta}{n_1 - n_2 \cos\theta}$$ MathFigure 19

Using Eq. 19, the numerator of the integrand in Eq. 16 is given as Eq. 20.

$$\sin\theta + \tan\phi \cos\theta = \frac{n_1 \sin\theta}{n_1 - n_2 \cos\theta}$$ MathFigure 20

Similarly, the denominator of the integrand in Eq. 16 is given as Eq. 21.

$$\cos\theta - \tan\phi \sin\theta = \frac{n_1 \cos\theta - n_2}{n_1 - n_2 \cos\theta}$$ MathFigure 21

Resultantly, by using Eqs. 20 and 21, Eq. 16 is reduced to a simpler form given as Eq. 22.

$$r(\theta) = r(\theta_i) \exp\left[\int_{\theta_i}^{\theta} \frac{n_1 \sin\theta'}{n_1 \cos\theta' - n_2} d\theta'\right]$$ MathFigure 22

In optics, the principle of reciprocity holds. Therefore, if a ray is refracted or reflected along a certain path, then by reversing the propagation direction of the ray, the ray will follow the exactly same path in the reverse direction. Accordingly, demonstrating that rays $L_1$ parallel to the optical axis 201 converge into the point O after being refracted at the aspherical refractive surface 205 is equivalent as demonstrating that rays $L_2$ diverging from the point O become the rays $L_1$ parallel to the optical axis 201 after being refracted at the aspherical refractive surface 205. Therefore, if the ray $L_1$ is an incident ray, then the ray $L_2$ is a refracted ray, and vice versa. Thus, the aspherical refractive surface 205 can be used to convert a parallel beam (i.e., a collimated beam) into a convergent beam or a divergent beam into a parallel beam. Since both rays $L_1$ and $L_2$ can be refracted rays, the parallel ray $L_1$ in the first medium will be referred to as the first ray, and the refracted ray $L_2$ in the second medium will be referred to as the second ray.

FIG. 3 shows the profile of an aspherical refractive surface 205 and the ray trajectories in accordance with a preferred embodiment 1a of the present invention. The aspherical refractive surface 205 is a part of a boundary between the first medium with a refractive index $n_1$ and the second medium with a refractive index $n_2$. It is assumed that the first medium is the BK7 glass, which is one of the most widely known optical glass. Since the refractive index of the BK7 glass is approximately 1.51508920 at the He—Ne laser wavelength of λ=0.6328□, it is assumed that the refractive index $n_1$ of the first medium is 1.51508920 and the refractive index $n_2$ of the second medium is 1.0. It is further assumed that the shortest distance (i.e., the back focal length) from the origin O (i.e., the secondary focal point) to the aspherical refractive surface 205 is 50.0 mm, and the field angle of the ray ranges from a minimum $\theta_i = \theta_1 = 0°$ to a maximum $\theta_2 = 40°$. Under these conditions, all the rays $L_2$ diverging from the point O become parallel rays $L_1$ after being refracted at the aspherical refractive surface 205 according to the Snell's law of refraction. Therefore, in the reverse direction, the parallel rays $L_1$ become the rays $L_2$ converging toward the point O after being refracted at the aspherical refractive surface 205. Thus, it is concluded that the aspherical refractive surface 205 shown in FIG. 3 is truly spherical-aberration-free.

FIG. 4 shows an aspherical lens 400 in accordance with a preferred embodiment 1b of the present invention. Letting the rotational symmetry axis of the aspherical lens 400 be the z-axis, all the cross-sections of the aspherical refractive surface 405 in planes containing the z-axis, for example, the x-z plane and the y-z plane, are the same as that of the aspherical refractive surface 205 shown in FIG. 3. In other words, the aspherical refractive surface 405 corresponds to the trace obtained by rotating the first curve of the aspherical refractive surface 205 shown in FIG. 3 around the z-axis.

The first curve of the aspherical refractive surface 205 is defined as a collection of intersections between the x-z plane of a rectangular coordinate system and the aspherical refractive surface 205. A second curve is defined as a collection of intersections between the x-z plane and the first lens surface 207, and the second curve is a straight line segment perpendicular to the z-axis. The z-coordinate $Z_F$ of the second curve is not smaller than the maximum z-coordinate of the first points on the first curve ($Z_F \geq \max(z(\theta))$).

On the other hand, the first lens surface 407 perpendicular to the z-axis serving as an optical axis is a plane surface in the same way as the first lens surface 207 of the rotationally symmetric aspherical lens 200 shown in FIG. 2. Specifically, if the first lens surface 207 is rotated around the z-axis, the trace of the first lens surface 207 becomes the first lens surface 407 in a form of a circular disk.

The aspherical lens 400 can be used in various fields. For instance, beam directivity can be enhanced by locating a light emitting diode (LED) or a high-efficiency light source at the secondary focal point $F_2$ of the aspherical lens 400. Such an aspherical lens 400 can be used in a light house or car headlights. Further, a superior lensed fiber can be realized by arranging the core of a lensed fiber to have the shape of the aspherical refractive surface 405 shown in FIG. 4. By aligning such a lensed fiber and a semiconductor laser, the optical coupling efficiency can be greatly enhanced.

On the other hand, the aspherical refractive surface 205 shown in FIG. 2 can be considered as a cross-section of a cylindrical aspherical lens. A cylindrical aspherical lens has a refractive power in a first plane (e.g., x-z plane) containing the z-axis serving as the optical axis but does not have a refractive power in a second plane (e.g., y-z plane) perpendicular to the first plane. A cylindrical aspherical lens can be used to independently control light refraction in the x-direction and the y-direction. For example, it is rather general that the light emission from a semiconductor laser is highly asymmetrical and divergence angles in the x-direction and the y-direction are vastly different. In such a case, cylindrical aspherical lens can be used to match the divergence angles in the two orthogonal directions.

Hereinafter, for a simplicity of explanation, a cylindrical aspherical lens is assumed to have a refractive power in the x-z plane. Thus, the profile (i.e., the cross-section) of a cylindrical aspherical lens in the x-z plane is the same as the profile of the aspherical refractive surface 205, and the profile thereof in the y-z plane is a plane window (i.e., a flat) which cannot make a collimated beam to converge or diverge. The profile of a cylindrical aspherical lens can be described in a rectangular coordinate system as given in Eq. 23.

$$z = z(x,y) = z(x) \qquad \text{MathFigure 23}$$

As shown in Eq. 23, the profile of a cylindrical aspherical lens does not depend on the y-coordinate. Further, if it is assumed that the cross-section 219 of an aspherical lens shown in FIG. 2 is a cross-section of a cylindrical aspherical lens in the x-z plane, that is the distance r defined in Eq. 6 is a distance measured in the x-z plane and the axial radius $\rho$ is replaced by x, then Eqs. 7, 8, 9 and 22 can be transformed into the following Eqs. 24 to 27.

$$r = \sqrt{x^2 + z^2} \qquad \text{MathFigure 24}$$

$$z(\theta) = r(\theta)\cos\theta \qquad \text{MathFigure 25}$$

$$x(\theta) = r(\theta)\sin\theta \qquad \text{MathFigure 26}$$

$$r(\theta) = r(\theta_i) \exp\left[\int_{\theta_i}^{\theta} \frac{n_1 \sin\theta'}{n_1 \cos\theta' - n_2} d\theta'\right] \qquad \text{MathFigure 27}$$

FIG. 5 shows a cylindrical aspherical lens 500 having a translational symmetry along the y-axis in accordance with a preferred embodiment 1c of the present invention. The cross-section of the aspherical refractive surface shown in FIG. 5 in a plane parallel to the x-z plane is the same as that of the aspherical refractive surface 205 shown in FIG. 3. When the first lens surface 207 in FIG. 2, which is perpendicular to the z-axis serving as the optical axis, is translated along the y-axis, then the trace thereof becomes a rectangle. As a result, the first lens surface of the cylindrical aspherical lens 500 in a preferred embodiment of 1c is a rectangular plane.

FIG. 6 shows a toric aspherical lens 600 in accordance with a preferred embodiment 1d of the present invention. A toric aspherical lens 600 includes a toric aspherical surface 605 and a cylindrical surface 607. The toric aspherical surface 605 corresponds to a trace obtained by rotating the first curve, which is a collection of intersections between the x-z plane and the aspherical refractive surface 205, around the x-axis. The toric aspherical surface 605 is a refractive surface in a cylindrical coordinate system that corresponds to a cylindrical aspherical refractive surface denied in a rectangular coordinate system. The cylindrical surface 607 corresponds to a trace obtained by rotating the outline of the first lens surface 207 in FIG. 2 (i.e., the second curve) around the x-axis.

It is not necessary to rotate by 360° the outline of the aspherical refractive surface (the second lens surface) 205 and the first lens surface 207 around the x-axis in order to obtain the toric aspherical lens having the toric aspherical surface 605 and the cylindrical surface 607. In other words, even if the first and the second curves are rotated by 10°, for example, the traces of the curves still constitute a toric lens surfaces. Thus, if it is assumed that the x-axis of the toric aspherical lens coincides with a vertical line connecting the south pole with the north pole, a cross-section of the toric aspherical lens parallel to a latitudinal line always becomes a circle or an arc, and the profile of a cross-section thereof containing a longitudinal line is always given as shown in FIG. 3.

Comparing the aspherical refractive surface shown in FIG. 2 and the toric aspherical lens 600, it can be noticed that the role of $\rho$ and z is exchanged. Therefore, if the $\rho$-axis is replaced by the z-axis, the z-axis by the $\rho$-axis, and letting the azimuth angle the axial radius $\rho$ make with the x-axis be $\omega$, then the profile of the toric surface shown in FIG. 6 is given by Eqs. 28 to 31.

$$z = r(\theta)\sin\theta \qquad \text{MathFigure 28}$$

$$x = r(\theta)\cos\theta\cos\omega \qquad \text{MathFigure 29}$$

$$y = r(\theta)\cos\theta\sin\omega \qquad \text{MathFigure 30}$$

$$r(\theta) = r(\theta_i) \exp\left[\int_{\theta_i}^{\theta} \frac{n_1 \sin\theta'}{n_1 \cos\theta' - n_2} d\theta'\right] \qquad \text{MathFigure 31}$$

Therefore, depending on the method of interpreting the equations, the same mathematical equation can represent a cylindrical aspherical lens and a toric aspherical lens as well as a more common rotationally symmetric aspherical lens. Hereinafter, for simplicity of explanations, a general aspherical lens will be representatively described, but it should be reminded that the aspherical refractive surface can also be regarded as a cylindrical aspherical refractive surface and a toric aspherical refractive surface.

The above-mentioned aspherical lenses, in accordance with the preferred embodiments 1a to 1d, are infinite conjugate lenses with infinite object distances. However, depending on the applications, there is a need to have a finite conjugate lens with a finite object distance and a finite image distance.

Preferred Embodiment 2

In accordance with a preferred embodiment 2 of the present invention shown in FIG. 7, a compound lens 700 includes two aspherical lenses. The back focal length of one aspherical lens corresponds to a finite object distance and that of the other aspherical lens corresponds to a finite image distance. Each aspherical lens includes an aspherical refractive surface 707, 705 and a plane lens surface 711, 712. The aspherical refractive surfaces 707 and 705 are the first and the second lens surfaces of the compound lens, respectively. The two plane lens surfaces 711 and 712 are parallel to each other and set apart at an arbitrary distance e. Such a compound lens 700 can prevent the generation of spherical-aberration in a case where both the object and the image distances are finite.

In FIG. 7, in order to distinguish between the object-side variables and the corresponding image-side variables, the variables on the image side are marked with an underline. The object distance and the image distance are $z_1$ and $\underline{z}_1$ with respect to their respective vertex; the diameter of the aspherical refractive lens is D; and the maximum zenith angle $\theta_2$ of a ray incident from the object-side is smaller than the angle $\theta'_2$ approximately given as the following Eq. 32.

$$\theta'_2 = \tan^{-1}\left(\frac{D}{2z_1}\right) \qquad \text{MathFigure 32}$$

The profile of the aspherical refractive surface 707 on the object-side can be obtained from Eq. 22 under the assumption that the minimum incident angle $\theta_i$ is zero ($\theta_i=\theta_1=0$), the maximum incident angle is $\theta'_2$, and the shortest distance $r(\theta_i)$ from the first focal point O to the aspherical refractive surface (the first lens surface) 707 is $z_1$ ($r(\theta_i)=z_1$). The axial radius $\rho(\theta'_2)$ is larger than D/2, because the upper limit of the indefinite integral in Eq. 22 is $0'_2$. The region beyond $\rho(\theta_2)=D/2$ is discarded in order to get an aspherical refractive surface 707 having a diameter D and a front vertex focal length $z_1$. The maximum incidence angle $\theta_2$ of the aspherical refractive surface 707 satisfies Eq. 33.

$$r(\theta_2)\sin\theta_2 = \frac{D}{2} \qquad \text{MathFigure 33}$$

The profile of the aspherical refractive surface 705 on the image side can be similarly obtained. For the purpose of securing manufacturability or for other reasons, an optical flat having a predetermined thickness can be inserted between the two plane lens surfaces 711 and 712. FIG. 7 shows an inserted optical flat 703 of thickness e. The thickness t between the vertexes of the two aspherical refractive surfaces measured along the optical axis is given as $(z_2-z_1)+e+(\underline{z_2-z_1})$ ($t=(z_2-z_1)+e+(\underline{z_2-z_1})$).

FIG. 8 shows the shape of an aspherical lens 700 having two surfaces 701 and 702 in accordance with a preferred embodiment 2a of the present invention. Similar to the case of FIG. 4, ordinary BK7 glass is assumed as the lens material and the He—Ne laser wavelength is used for the design wavelength. The diameter of the lens is set at 50 mm, and $z_1$, $\underline{z_1}$ and e are set as 50 mm, 200 mm, and 10 mm, respectively ($\overline{z_1}=50$ mm, $\underline{z_1}=200$ mm, e=10 mm).

FIG. 9 shows the ray trajectories for the lens 700 having the two aspherical surfaces.

The profile of the aspherical refractive surfaces shown in FIG. 9 is equal to those of the aspherical refractive surfaces shown in FIG. 8 except for the fact that the distance t between the vertexes of the two aspherical refractive surfaces is set as 20 mm. As can be seen, if the distance from the object to the front vertex of the lens is exactly equal to $z_1$, then all the rays after being refracted at the lens surfaces converge toward the point O.

Furthermore, as can be noticed from FIG. 7 and FIG. 9, the divergence angle of the beam is reduced after passing through the lens. Here, the divergence angle is the maximum angle a ray makes with the optical axis.

The compound lens in accordance with the second embodiment of the present invention can also be used to change the divergence angle of beams diverging from a small light source such as a laser or an LED, or to change the beam spot sizes. For example, if a semiconductor laser is placed at the origin O, laser beams diverging from the semiconductor laser are refracted at the two aspherical refractive surfaces 707 and 705 and converge toward the point O, and then again diverge after passing through the point O.

However, as can be seen from FIGS. 7 and 9, the divergence angle of the beam is reduced ($\theta_2 > \underline{\theta_2}$)

after the beam passes through the two aspherical refractive surfaces.

The compound lens 700 of the preferred embodiment 2 can be also used to improve optical coupling efficiency between a semiconductor laser and an optical fiber. Every optical fiber has a characteristic numerical aperture (NA), and the beam is not confined within the optical fiber but leaks away when the incidence angle of a ray is larger than a critical angle. If a highly diverging beam from a semiconductor laser is passed through the compound lens of the second embodiment of the present invention, then the divergence angle of the beam can be reduced below the critical angle, and the beam can be efficiently coupled into the optical fiber.

In the mean time, coherent light such as a laser beam follows the rule of Gaussian optics, and thus the divergence angle and the spot size of the beam are mutually related to each other. Therefore, changing the divergence angle of a beam results in a change of the beam spot size, and vice versa. Therefore, the compound lens 700 in FIG. 7 can be adopted to change the divergence angle or the spot size of a light source.

Preferred Embodiment 3

FIG. 10 schematically shows a cross-section of a spherical aberration-free aspherical lens 1000 in the x-z plane in accordance with a preferred embodiment 3. An aspherical refractive surface (the first lens surface) 1005 is symmetric about the optical axis 1001 which coincides with the z-axis of the coordinate system. The left and the right sides of the aspherical refractive surface 1005 are filled with media with refractive indices $n_1$ and $n_2$, respectively. The refractive index $n_1$ is smaller than the refractive index $n_2$ ($n_1 < n_2$). With the spherical aberration-free lens 1000, a first ray 1009 incident from the left-side of the aspherical refractive surface 1005 in parallel to the optical axis 1001 is refracted at a point $P_2$ on the aspherical refractive surface 1005, and passes through the origin O (i.e., the second focal point of the lens) on the optical axis 1001 with a zenith angle $\theta$.

The space between the aspherical refractive surface 1005 and the infinity to the right side of the aspherical refractive surface is filled with the medium with a refractive index $n_2$. Also, as shown in FIG. 10, the medium with a refractive index $n_2$ may fill only the space between the aspherical refractive surface (the first lens surface) 1005 and the second lens surface 1007, so that the spherical aberration-free aspherical lens 1000 takes the form of a positive meniscus lens.

In a case where the aspherical refractive surface 1005 is a general aspherical refractive surface rotationally symmetric about the optical axis 1001, then the second lens surface 1007 is a spherical surface having a radius $r_B$ with respect to the point O. On the other hand, in a case where the aspherical refractive surface 1005 is a cylindrical aspherical refractive surface, then the second lens surface 1007 is also a cylindrical surface. The curve representing the second lens surface 1007 is a circle having a center at the origin O, and thus a spherical surface can be obtained when the second lens surface 1007 is rotated around the x-axis much like the same as it were rotated around the z-axis. Therefore, in a case where the aspherical refractive surface 1005 is a toric aspherical surface, the second lens surface 1007 is a spherical surface.

Since the second lens surface 1007 is always perpendicular to the second ray 1011 converging toward the origin O, the propagation direction of the second ray 1011 is not changed when the second ray 1011 passes through the second lens surface 1007. Accordingly, the design of the aspherical refractive surface 1005 is not affected by the presence or absence of the second lens surface 1007. The lens shown in FIG. 10 can be applied not only to the aspherical lens having the first and the second lens surfaces but also to lenses and other optical components having single aspherical surface 1005.

The profile of such an aspherical refractive surface 1005 can be described in a rectangular and a polar coordinate systems having the optical axis as the z-axis of the coordinate systems. The z-axis is directed from the right to the left. Since the cross-section of the aspherical lens shown in FIG. 10 is confined within the two-dimensional x-z plane, the cylindrical and the spherical coordinate systems are reduced into a rectangular and a polar coordinate systems, respectively. The coordinates of the point $P_2$ can be described with the zenith angle θ of the point $P_2$ and the distance r from the origin O to the point $P_2$. The distance r is a function of the zenith angle θ, namely r=r(θ). The coordinates (x, z) in the rectangular coordinate are given as a function of the independent variable θ in the polar coordinate, that is, $$x(\theta) = r(\theta)\sin\theta$$

and $$z(\theta) = r(\theta)\cos\theta$$

The profile of the aspherical refractive surface 1005 may be defined in terms of an elevation angle φ=φ(θ) of the tangent plane T at an arbitrary point $P_2$ (θ, r) on the aspherical refractive surface 1005. The profile of the aspherical refractive surface 1005 according to the present invention is designed such that the first ray 1009 which is parallel to the optical axis is refracted at the aspherical refractive surface 1005, and becomes a second ray 1011 having a zenith angle θ between $\theta_1$ and $\theta_2$ and converges toward the point O on the optical axis 1001. The elevation angle φ of the tangent plane T satisfies Eq. 34.

$$\tan\phi = -\frac{dz}{dx} \qquad \text{MathFigure 34}$$

Following similar derivational procedures for obtaining the profile of the aspherical refractive surface shown in the preferred embodiments 1a to 1d, the profile of the spherical aberration-free aspherical refractive surface 1005 can be given as Eq. 35.

$$r(\theta) = r(\theta_i)\exp\left[\int_{\theta_i}^{\theta} \frac{\sin\theta' - \tan\phi(\theta')\cos\theta'}{\cos\theta' + \tan\phi(\theta')\sin\theta'} d\theta'\right] \qquad \text{MathFigure 35}$$

In Eq. 35, θ' is a dummy variable, the lower bound of the indefinite integral is θ=$\theta_i$, and r($\theta_i$) is the distance to a point on the aspherical refractive surface 1005 having a zenith angle θ=$\theta_i$. Preferably, the lower bound $\theta_i$ is zero ($\theta_i$, 0) and then r(0)=$r_0$ equals the distance from the origin O to an intersection between the aspherical refractive surface 1005 and the optical axis 1001. Assuming the lens takes the form of a positive meniscus lens, the point O on the optical axis is the secondary focal point of the lens, the radius $r_B$ is the back focal length, and the center thickness t of the lens is $r_o - r_B$ (t=$r_o - r_B$). The above-mentioned $n_1$, $n_2$, $\theta_1$, $\theta_2$, $\theta_i$ and r($\theta_i$) are the design parameters for designing the aspherical refractive surface 1005.

A first curve is defined as a collection of intersections between the x-z plane of a rectangular coordinate system and the aspherical refractive surface 1005. By definition, the radius $r_B$ of the second lens surface 1007 is the radius of a second curve defined as a collection of intersections between the x-z plane and the second lens surface 1007. The second curve is a circular arc around the origin. The radius $r_B$ of the circular arc is not larger than the shortest distance to the aspherical refractive surface (i.e., $r_B \leq \min(r(\theta))$).

The first ray 1009 is refracted at the aspherical refractive surface 1005 according to the Snell's law of refraction. The angle between a normal N perpendicular to the tangent plane T at the point $P_2$ on the aspherical refractive surface 1005 and the first ray is φ, and therefore the angle of incidence is φ. On the other hand, the angle between the normal N and the second ray 1011 is φ−θ, and therefore the angle of refraction is φ−θ. The angle of incidence and the angle of refraction satisfy the Eq. 36 according to the Snell's law of refraction.

$$x_1 \sin\phi = n_2 \sin(\phi - \theta) \qquad \text{MathFigure 36}$$

Using trigonometric functional relations, the slope tamp of the tangent plane T is given as Eq. 37.

$$\tan\phi = \frac{n_2 \sin\theta}{n_2 \cos\theta - n_1} \qquad \text{MathFigure 37}$$

Using Eq. 37, the numerator of the integrand in Eq. 35 is given as Eq. 38.

$$\sin\theta - \tan\phi\cos\theta = \frac{n_1 \sin\theta}{n_1 - n_2 \cos\theta} \qquad \text{MathFigure 38}$$

On the other hand, the denominator of the integrand is given as Eq. 39.

$$\cos\theta + \tan\phi\sin\theta = \frac{n_1 \cos\theta - n_2}{n_1 - n_2 \cos\theta} \qquad \text{MathFigure 39}$$

Accordingly, with Eqs. 38 and 39, Eq. 35 can be reduced to a simpler form given in Eq. 40.

$$r(\theta) = r(\theta_i)\exp\left[\int_{\theta_i}^{\theta} \frac{n_1 \sin\theta'}{n_1 \cos\theta' - n_2} d\theta'\right] \qquad \text{MathFigure 40}$$

It can be noticed that Eq. 40 is identical to Eq. 22. Therefore, the same formula can be adopted to design a spherical-aberration-free piano-convex lens or a positive meniscus lens. The shape of the lens is determined by which of the two refractive indices $n_1$ and $n_2$ is larger.

FIG. 11 shows the profile of a refractive surface and the ray trajectories in accordance with a preferred embodiment 3a of the present invention. The right and the left sides of the refractive surface shown in FIG. 11 are exchanged to each other compared to those shown in FIG. 10. Namely, in FIG. 11, the second medium with a refractive index $n_1$ exists at the left-side and the first medium with a refractive index $n_1$ exists at the right-side. It is assumed that the first medium is the air having the refractive index 1 ($n_1$=1.0) and the second medium is the BK7 glass. Therefore, the refractive index $n_2$ of the second medium is approximately 1.51508920 at the He—Ne laser wavelength of λ=0.6328□. Further, it is assumed that the shortest distance r from the origin O (i.e., the second focal point) to the refractive surface is 50.0 mm, and the zenith angle θ of the refractive ray 1011 ranges from a minimum θ=0° to a maximum $\theta_2$=40°. Under these conditions, all the rays diverging from the origin O become parallel rays after being refracted at the aspherical refractive surface 1005 according to the Snell's law of refraction. In the reverse direction, a collimate beam (i.e., parallel rays) converge toward the origin O after being refracted at the aspherical refractive surface 1005. Thus, it is concluded that the lens configured with aspherical refractive surface 1005 of the preferred embodiment 3 is a spherical aberration-free lens.

An LED housing can be formed to have the aspherical refractive surface 1005 shown in FIG. 11. A conventional LED has a light-emitting filament within a transparent dome-shaped housing. If the transparent LED housing has a form shown in FIG. 11 and the filament is aligned at the second focal point of the aspherical transparent housing, all the rays having a divergence angle less than $\theta_2$ are converted into parallel rays, so that the beam directivity can be improved. In these ways, the aspherical refractive surface of FIG. 11 can constitute a part of a lens or a part of an optical component, such as the housing of light emitting diode (LED).

FIG. 12 shows the shape of a positive meniscus lens 1200 having an aspherical refractive surface 1205 as the first lens surface and a spherical second lens surface 1207 in accordance with a preferred embodiment 3b of the present invention. The aspherical refractive surface 1205 is identical to the aspherical refractive surface 1005 shown in FIG. 11, and the radius $r_B$ of the spherical second lens surface 1207 is 20 mm. The lens 1200 can be used to improve the beam directivity in a wireless optical communication system. Namely, if a light source is aligned at the second focal point of the lens 1200, refracted lights proceeds parallel to the optical axis and has a high directivity much like the lights from a light house, even if the light source is an incoherent source such as an incandescent lamp. Furthermore, if a photodetector is aligned at the second focal point of the lens on the other side of the wireless optical communication system, only the incident lights parallel to the optical axis are detected. A transmitter or a receiver adopting such lens can be a useful device in point-to-point communications. Although it is not explicitly mentioned, it should be clear from the preceding arguments that the shape of the aspherical refractive surface in the preferred embodiments in 3, 3a and 3b can be implemented into the cylindrical aspherical lens and the toric aspherical lens, as well as the common rotationally symmetric aspherical lens.

Preferred Embodiment 4

FIG. 13 schematically shows a cross-section of an aspherical lens 1300 in the x-z plane in accordance with a preferred embodiment 4 of the present invention. The aspherical lens of the fourth preferred embodiment is a converter which converts a converging beam into a parallel beam and a parallel beam into a diverging beam. As shown in FIG. 13, the aspherical refractive surface 1305 is symmetric about an optical axis 1301 which coincides with the z-axis of the coordinate. The first lens surface 1307 is a part of a spherical surface having a radius $r_F$ around the origin O.

A medium with a refractive index $n_1$ and another medium with a refractive index $n_2$ exist at the left-side and the right-side of the aspherical refractive surface 1305, respectively. The refractive index $n_1$ is larger than the refractive index $n_2$ ($n_1 > n_2$). A converging ray 1309, propagating from the left-side of the aspherical refractive surface 1305 toward the origin O on the optical axis 1301, is refracted at a point $P_3$ on the aspherical refractive surface 1305 and propagates parallel to the optical axes 1301. Reversely, a parallel ray 1311, propagating from the right-side of the aspherical refractive surface 1305 to the left-side parallel to the optical axis 1301 is refracted at the aspherical refractive surface 1305 and diverges with the center of divergence coinciding with the origin O.

The space between the aspherical refractive surface 1305 and the infinity to the left-side of the aspherical refractive surface is filled with the medium with a refractive index $n_1$. Alternatively, as shown in FIG. 13, the medium with a refractive index $n_1$ may fill only the space between the aspherical refractive surface (the second lens surface) 1305 and the first lens surface 1307, so that the aspherical lens 1300 takes the form of a negative meniscus lens. Since the first lens surface 1307 is a spherical surface with the center at the point O, the propagation direction of the first ray converging toward the origin O is not changed after passing through the first lens surface 1307. Accordingly, the design of the aspherical refractive surface 1305 is not affected by the presence or absence of the first lens surface 1307. Therefore, the lens shown in FIG. 13 can be a negative meniscus lens, or this preferred embodiment can be applied to various lenses and other optical components having single aspherical refractive surface 1305.

The profile of the aspherical refractive surface 1305 can be described in a rectangular and a polar coordinate systems having the z-axis coinciding with the optical axis. The direction of the z-axis goes from the right to the left. The position of a point $P_3$ can be described with the zenith angle $\theta$ of the point $P_3$ and the distance r from the origin O to the point $P_3$ as $(\theta, r)$, where the distance $r=r(\theta)$ is a function of the zenith angle $\theta$. The rectangular coordinates (x, z) are given as functions of the independent variable $\theta$ in the polar coordinate as $$x(\theta) = r(\theta) \sin \theta$$

and $$z(\theta) = r(\theta) \cos \theta$$

Also, the profile of the aspherical refractive surface 1305 can be defined with an elevation angle $\phi$ of a tangent plane T at the point $P_3$ ($\theta$, r) on the aspherical refractive surface 1305. The elevation angle $\phi = \phi(\theta)$ is a function of the zenith angle $\theta$. The elevation angle $\phi$ of the tangent plane T satisfies Eq. 41.

$$\tan\phi = -\frac{dz}{dx}$$

MathFigure 41

Following similar derivational procedures for obtaining the profile of the aspherical refractive surface shown in the preferred embodiments 1 to 1d, the profile of the aspherical refractive surface 1305 can be given as Eq. 42.

$$r(\theta) = r(\theta_i) \exp\left[\int_{\theta_i}^{\theta} \frac{\sin\theta' - \tan\phi(\theta')\cos\theta'}{\cos\theta' + \tan\phi(\theta')\sin\theta'} d\theta'\right]$$

Math Figure 42

In Eq. 42, $\theta'$ is a dummy variable. The lower bound of the indefinite integral is $\theta = \theta_i$ and $r(\theta_i)$ is the corresponding distance from the origin O to a point on the aspherical refractive surface 1305 having a zenith angle $\theta = \theta_i$. Preferably, the lower bound $\theta_i$ is zero ($\theta_i = 0$) and $r(0) = r_0$ is the distance from the origin O to the intersection between the aspherical refractive surface 1305 and the optical axis. For the negative meniscus lens, the center thickness t of the lens is $r_F - r_0 (t = r_F - r_0)$. The above-mentioned $n_1$, $n_2$, $\theta_1$, $\theta_2$, $\theta_i$ and $r(\theta_i)$ are the design parameters which are used in designing the aspherical refractive surface 1305.

The first ray 1309 is refracted at the aspherical refractive surface 1305 according to the Snell's law of refraction. The angle between the first ray 1309 and a normal N perpendicular to the tangent plane T at the point $P_3$ on the refractive surface 1305 is $\phi-\theta$, therefore the angle of incidence is $\phi-\theta$. On the other hand, the second ray is parallel to the optical axis, and the angle between the normal N and the second ray 1311 is $\phi$. Therefore, the angle of refraction is $\phi$. The relation between the angle of incidence and the angle of refraction is given by Eq. 43 according to the Snell's law of refraction.

$$n_1 \sin(\phi-\theta) = n_2 \sin\phi \qquad \text{MathFigure 43}$$

Using trigonometric functional relations, the slope of the tangent plane T is given by Eq. 44.

$$\tan\phi = \frac{n_1 \sin\theta}{n_1 \cos\theta - n_2} \qquad \text{Math Figure 44}$$

Using Eq. 44, the numerator of the integrand in Eq. 42 is given by Eq. 45.

$$\sin\theta - \tan\phi\cos\theta = \frac{-n_2 \sin\theta}{n_1 \cos\theta - n_2} \qquad \text{Math Figure 45}$$

On the other hand, the denominator of the integrand is given as Eq. 46.

$$\cos\theta + \tan\phi\sin\theta = \frac{n_1 - n_2 \cos\theta}{n_1 \cos\theta - n_2} \qquad \text{Math Figure 46}$$

Using Eqs. 45 and 46, Eq. 42 is reduced to a simpler form given in Eq. 47.

$$r(\theta) = r(\theta_i) \exp\left[\int_{\theta_i}^{\theta} \frac{n_2 \sin\theta'}{n_2 \cos\theta' - n_1} d\theta'\right] \qquad \text{Math Figure 47}$$

In Eq. 47, $n_1$ and $n_2$ are the refractive indices of the media located on the left and the right sides of the aspherical refractive surface 1305, respectively. Both of the two refractive indices $n_1$ and $n_2$ can take any real number larger than 1. In this regard, the two Eqs. 40 and 47 describe the same curve, if the refractive indices $n_1$ and $n_2$ in the preferred embodiment 4 are 1.51508920 and 1.0, respectively, while the refractive indices $n_1$ and $n_2$ in the preferred embodiments 3 and 3a are 1.0 and 1.51508920, respectively. Therefore, Eqs. 40 and 47 are substantially identical to each other. From another point of view, while leaving the profile of the aspherical refractive surface in FIG. 10 converting a divergent beam into a parallel beam the same, if the air and the BK7 glass are changed into the BK glass and the air, respectively, then the aspherical refractive surface 1005 become another aspherical refractive surface 1305 converting a converging beam into a parallel beam.

FIG. 14 shows the profile of an aspherical refractive surface 1305 in accordance with a preferred embodiment 4a of the present invention and the ray trajectories. The right and the left sides of the aspherical refractive surface 1305 shown in FIG. 14 are exchanged to each other compared with those in FIG. 13. Namely, in FIG. 14, the second medium having a refractive index $n_2$ exists at the left-side and the first medium having a refractive index $n_1$ exists at the right-side. It is assumed that the first medium is BK7 glass ($n_1$=1.51508920) and the second medium is the air having the refractive index 1 ($n_2$=1.0). Therefore, the refractive index $n_1$ of the first medium is approximately 1.51508920 at a wavelength ($\lambda$=0.6328☐) of the He—Ne laser. Further, it is assumed that the shortest distance $r_o$ from the origin O to the aspherical refractive surface 1305 is 20.0 mm, and the zenith angle $\theta$ of the first ray ranges from a minimum $\theta_1$=0° to a maximum $\theta_2$=40°. Under these conditions, the second rays incident parallel to the optical axis refract at the aspherical refractive surface 1305 according to the Snell's law of refraction, and diverge with one point on the optical axis as the center of divergence. In the reverse direction, rays converging toward the point on the optical axis are converted into the rays parallel to the optical axis after passing through the aspherical refractive surface 1305.

FIG. 15 shows the shape of a negative meniscus lens 1500 having the aspherical refractive surface 1505 which is substantially the same as the aspherical refractive surface 1305 in FIG. 14 in accordance with a preferred embodiment 4b of the present invention. The radius $r_F$ of the first lens surface 1507 is 30 mm ($r_F$=30 mm), and the center of the first lens surface 1507 lies at the origin of the coordinate system used to describe the second lens surface. With the lens 1500 having the aspherical refractive surface 1505 shown in FIG. 15, a plane wave can be converted into a spherical wave. In other words, as shown in FIG. 16, by letting a plane wave (a parallel beam), such as a ray emitted from a laser, be incident on the aspherical refractive surface 1505 in parallel to the optical axis, it is possible to generate a spherical wave. Spherical wave can be used to measure the profile of a lens and a mirrored surface.

Preferred Embodiment 5

FIG. 17 shows the shape of a compound lens 1700 in accordance with a preferred embodiment 5 of the present invention. In many cases, it is needed to enlarge or reduce the beam sizes of parallel beams, such as the one emitted from a laser. A simple beam expander takes the form of a Galilean telescope which is composed of one concave lens and one convex lens. The focal length of the convex lens is longer than that of the concave lens, and the second focal points of the two lenses coincide. Besides this, there exist many kind of complex beam expanders which might include a pair of prisms, or a plurality of lenses.

As shown in FIG. 17, an excellent beam expander can be configured with two aspherical lenses, specifically, as a compound lens 1700 including the two lenses from the preferred embodiments 3b and 4b as a first and a second lens, respectively. The first lens is composed of an aspherical refractive surface 1705P functioning as the first lens surface and a spherical surface 1707P having a radius $R_B$ functioning as the second lens surface. The second lens is composed of a spherical surface having a radius $r_F$ functioning as a third lens surface 1707N and an aspherical refractive surface 1705N functioning as a fourth lens surface. The radius $r_F$ of the third lens surface 1707N is not larger than the radius $R_B$ of the second lens surface 1707P. The second lens surface and the third lens surface have a common center.

A medium with a refractive index $n_1$ exists at the object-side, namely at the left-side of the aspherical refractive surface 1705P. The first lens has a refractive index $n_2$. A medium with a refractive index $n_3$ fill the space between the first and the second lenses. The second lens has a refractive index $n_4$. A medium with a refractive index $n_5$ exists at the image-side, namely at the right-side of the aspherical refractive surface 1705N. The shape of the first lens is identical to that of the preferred embodiment 3 shown in FIG. 10, and the shape of the second lens is identical to that of the preferred embodiment 4 shown in FIG. 13. The first and the second lenses share a common optical axis 1701. The second focal points of the first and the second lenses, as well as the centers of the second and the third lens surfaces all coincide. In order to use such a compound lens as a beam expander, the refractive index $n_2$ of the first lens should be larger than the refractive index $n_1$ of the medium at the object-side, and the refractive index $n_4$ of the second lens should be larger than the refractive index $n_5$ of the medium at the image-side, that is $n_2>n_1$ and $n_4>n_5$.

The operation principle of the beam expander configured with the compound lens 1700 is as follows. A parallel beam 1709 incident from the object-side is refracted at a point $Q_1$ on the aspherical refractive surface 1705P and propagates toward the common focal point O of the compound lens 1700. Since the second lens surface 1707P and the third lens surface 1707N are spherical surfaces having the centers at the common focal point O, the propagation direction of the refracted ray 1710 is not changed after passing through the second and the third lens surfaces 1707P and 1707N. The refracted ray is refracted again at the point $P_4$ on the aspherical refractive surface 1705N and becomes parallel to the optical axis 1701. Therefore, the rays are parallel to the optical axis 1701 both before and after the ray passes through the compound lens 1700, but the distance from the optical axis is changed. If the rectangular coordinates of the point $Q_1$ on the aspherical refractive surface 1705P of the first lens are (X, Z) and the rectangular coordinates of the point $P_4$ on the aspherical refractive surface 1705N of the second lens are (x, z), the beam size is reduced with a ratio x/X. Thus, the beam size of a parallel ray incident from the object-side, namely from the left-side of the compound lens 1700, is reduced with a ratio x/X, and, reversely, the beam size of a parallel ray incident from the image-side, namely from the right-side of the compound lens is enlarged with a ratio X/x. Therefore, a parallel ray such as the ray emitted from a laser, should be incident from the right-side of the compound lens 1700 and parallel to the optical axis in order to use the compound lens 1700 as a beam expander.

The coordinates of an arbitrary point $Q_1$ on the aspherical refractive surface 1705P are given as Eqs. 48 to 50.

$$R(\theta) = R(\theta_i)\exp\left[\int_{\theta_i}^{\theta} \frac{-n_1\sin\theta'}{n_2 - n_1\cos\theta'} d\theta'\right]$$ Math Figure 48

$$Z(\theta) = R(\theta)\cos\theta$$ Math Figure 49

$$X(\theta) = R(\theta)\sin\theta$$ Math Figure 50

From FIG. 17, it is obvious that the radius $R_B$ of the second lens surface 1707P should be smaller than a distance $R(\theta)$ from the origin to an arbitrary point on the aspherical refractive surface 1705P. The coordinates (x, z) of an arbitrary point $P_4$ on the aspherical refractive surface 1705N are given as Eqs. 51 to 53.

$$r(\theta) = r(\theta_i)\exp\left[\int_{\theta_i}^{\theta} \frac{-n_5\sin\theta'}{n_4 - n_5\cos\theta'} d\theta'\right]$$ Math Figure 51

$$z(\theta) = r(\theta)\cos\theta$$ Math Figure 52

$$x(\theta) = r(\theta)\sin\theta$$ Math Figure 53

Similarly, the radius $r_F$ of the third lens surface 1707N should be larger than a distance $r(\theta)$ from the origin to an arbitrary point on the aspherical refractive surface 1705N. Therefore, a relation given in Eq. 54 holds.

$$R(\theta) > R_B \geq r_F > r(\theta)' > 0$$ MathFigure 54

If the two lenses are made out of the same material, the refractive index $n_2$ is equal to the refractive index $n_4$. Also, if the compound beam expander, i.e., the two lenses of the compound lens 1700 lie in the same medium, for example in the air, the refractive indices $n_1$, $n_3$ and $n_5$ are all identical.

The second lens surface 1707P and the third lens surface 1707N are not necessarily needed in the beam expander of the preferred embodiment 5. In other words, without the second and the third lens surfaces 1707P and 1707N, a beam expander can be configured with the first and the second aspherical refractive surfaces 1705P and 1705N which are functioning as the first and the fourth lens surfaces, respectively. If the lens so configured with the first and the second aspherical refractive surfaces 1705P and 1705N has a refractive index $n_2$, and the surrounding medium has a refractive index $n_1$, then the shape of the first aspherical refractive surface 1705P of the beam expander is given as Eq. 55.

$$R(\theta) = R(\theta_i)\exp\left[\int_{\theta_i}^{\theta} \frac{-n_1\sin\theta'}{n_2 - n_1\cos\theta'} d\theta'\right]$$ Math Figure 55

The rectangular coordinates (X, Z) of a point $Q_1$ on the aspherical refractive surface 1705P of the beam expander are given as Eqs. 56 and 57.

$$Z(\theta) = R(\theta)\cos\theta$$ MathFigure 56

$$X(\theta) = R(\theta)\sin\theta$$ MathFigure 57

Similarly, the profile of the second aspherical refractive surface 1705N is given as Eq. 58.

$$r(\theta) = r(\theta_i)\exp\left[\int_{\theta_i}^{\theta} \frac{-n_1\sin\theta'}{n_2 - n_1\cos\theta'} d\theta'\right]$$ Math Figure 58

The rectangular coordinates (x, z) of a point $P_4$ on the second aspherical refractive surface 1705N are given as Eqs. 59 and 60.

$$z(\theta) = r(\theta)\cos\theta$$ MathFigure 59

$$x(\theta) = r(\theta)\sin\theta$$ MathFigure 60

Further, radii R and r have a relation shown in Eq. 61.

$$R(\theta) > r(\theta) > 0$$ MathFigure 61

From Eqs. 55 and 58, it can be noticed that the two aspherical refractive surfaces 1705P and 1705N have a close similarity. They have the same profile but the scale is different.

As mentioned previously, a beam expander can enlarge or reduce the beam size of a collimated beam. For example, in order to enlarge the size of a beam emitted from a He—Ne laser by five times, a lens shown in FIG. 18 can be used in accordance with a preferred embodiment 5a of the present invention. In performing an interference experiment in which the experimental result is more clearly visible if the beam size is larger, the size of the laser beam can be enlarged by placing the lens shown in FIG. 18 having the two aspherical refractive surfaces 1705N and 1705P in front of the laser, or more preferably by integrating the beam expander and the laser. Using techniques such as injection-compression molding for plastic or glass lens making, the lens shown in FIG. 18 having the two aspherical refractive surfaces 1705N and 1705P can be obtained in a single piece. Thus unlike the other beam expanders employing a plurality of lenses, lens assembling is not needed to make a beam expander. Since the possibility of lens misalignment by mechanical vibration is avoided, such a beam expander can be used in a more harsh environment. Further, since the number of lens surfaces are reduced, necessary antireflection coating process can be reduced, and still generation of harmful reflections can be diminished.

Preferred Embodiment 6

FIG. 19 schematically shows a cross-section of an aspherical lens 1900 in the x-z plane in accordance with a preferred embodiment 6 of the present invention. The aspherical lens 1900 plays the role of a converter for converting converging rays into parallel rays and parallel rays into diverging rays. As shown in FIG. 19, the aspherical refractive surface (the first lens surface) 1905 is symmetric about the optical axis 1901 which coincides with the z-axis of the coordinate. A medium with a refractive index $n_1$ and a medium with a refractive index $n_2$ exist at the left-side and the right-side of the aspherical refractive surface 1905, respectively. The refractive index $n_1$ is smaller than $n_2$. A converging ray 1909 propagating from the left-side toward a point O on the optical axis 1901 is refracted at a point $P_5$ on the aspherical refractive surface 1905 and becomes a collimated beam parallel to the optical axis 1901. In the reverse direction, parallel rays 1911 propagating from the right-side and parallel to the optical axis 1901 is refracted at the aspherical refractive surface 1905 and diverges with the center of divergence at the point O.

A medium with a refractive index $n_2$ may fill the space between the aspherical refractive surface 1905 and the infinity to the right-side of the aspherical surface. Alternatively as shown in FIG. 19, a medium with a refractive index $n_2$ may fill only the space between the aspherical refractive surface (the first lens surface) 1905 and the second lens surface 1907 which is a plane surface perpendicular to the optical axis. The second lens surface 1907 is located at a distance $z_B$ from the origin ($z_B < r(\theta)$). The latter case corresponds to a piano-concave aspherical lens.

Since the second lens surface 1907 is a plane surface perpendicular to the optical axis 1901, the propagation direction of the second ray 1911 parallel to the optical axis does not change after the second ray 1911 passes through the second lens surface 1907. Accordingly, the design of the aspherical refractive surface 1905 is not affected by the presence or absence of the second lens surface 1907. Therefore, the lens 1900 shown in FIG. 19 can take the form of a piano-concave aspherical lens, or this preferred embodiment can be implemented in lenses and other optical components having the single aspherical refractive surface 1905.

The profile of the aspherical refractive surface 1905 can be described in a rectangular and a polar coordinate systems having the z-axis coinciding with the optical axis. The direction of the z-axis goes from the right to the left. The coordinates of the point $P_5$ on the aspherical refractive surface 1905 can be described with the zenith angle $\theta$ of the point $P_5$ and the distance r from the origin O to the point $P_5$ as $(\theta, r=r(\theta))$. The coordinates (x, z) in the rectangular coordinate system are given as functions of the independent variable $\theta$ in the polar coordinate system as $x(\theta) = r(\theta) \sin \theta$ and $z(\theta) = r(\theta) \cos \theta$ The profile of the aspherical refractive surface 1905 can be defined with an elevation angle $\phi = \phi(\theta)$ of a tangent plane T at the point $P_5(\theta, r)$ on the aspherical refractive surface 1905. The elevation angle $\phi$ of the tangent plane T satisfies Eq. 62.

$$\tan\phi = \frac{dz}{dx} \quad \text{Math Figure 62}$$

Following similar derivational procedures for obtaining the profile of the aspherical refractive surface shown in the preferred embodiments 1 to 1d, the profile of the aspherical refractive surface 1905 can be given as Eq. 63.

$$r(\theta) = r(\theta_i) \exp\left[\int_{\theta_i}^{\theta} \frac{\sin\theta' + \tan\phi(\theta')\cos\theta'}{\cos\theta' - \tan\phi(\theta')\sin\theta'} d\theta'\right] \quad \text{Math Figure 63}$$

In Eq. 63, $\theta'$ is a dummy variable. The lower bound of the indefinite integral is $\theta = \theta_i$, and $r(\theta_i)$ is the corresponding distance from the origin to a point on the aspherical refractive surface 1905 having a zenith angle $\theta = \theta_i$. Preferably, the lower bound $\theta_i$ is zero ($\theta_i = 0$) and then $r(\theta) = r_o$ is the distance from the origin O to an intersection between the aspherical refractive surface 1905 and the optical axis. Assuming the lens takes the form of a plano-concave aspherical lens, the center thickness t of the lens is $r_o - z_B (t = r_o - z_B)$. The above-mentioned $n_1$, $n_2$, $\theta_1$, $\theta_2$, $\theta_i$ and $r(\theta)$ are the design parameters which are used in designing the aspherical refractive surface 1905 in accordance with the present invention.

The first ray 1909 is refracted at the aspherical refractive surface 1905 according to the Snell's law of refraction. The angle between a normal N perpendicular to the tangent plane T at the point $P_5$ on the aspherical refractive surface 1905 and the first ray 1909 is $\phi + \theta$, therefore the angle of incidence is $\phi + \theta$. On the other hand, the angle between the normal N and the second ray 1911 is $\phi$, therefore the angle of refraction is $\phi$. The angle of incidence and the angle of refraction satisfy the following relation given in Eq. 64 according to the Snell's law of refraction.

$$n_1 \sin(\phi + \theta) = n_2 \sin \phi \quad \text{MathFigure 64}$$

Using trigonometrical functional relations, the slope tamp of the tangent plane T is given as Eq. 65.

$$\tan\phi = \frac{n_1 \sin\theta}{n_2 - n_1 \cos\theta} \quad \text{Math Figure 65}$$

Using Eq. 65, the numerator of the integrand in Eq. 63 is given as Eq. 66.

$$\sin\theta + \tan\phi\cos\theta = \frac{n_2 \sin\theta}{n_2 - n_1 \cos\theta} \quad \text{Math Figure 66}$$

On the other hand, the denominator of the integrand is given as Eq. 67.

$$\cos\theta - \tan\phi\sin\theta = \frac{n_2 \cos\theta - n_1}{n_2 - n_1 \cos\theta} \quad \text{Math Figure 67}$$

Using Eqs. 66 and 67, Eq. 63 is reduced to a simpler form as shown in Eq. 68.

$$r(\theta) = r(\theta_i) \exp\left[\int_{\theta_i}^{\theta} \frac{n_2 \sin\theta'}{n_2 \cos\theta' - n_1} d\theta'\right]$$ Math Figure 68

Eq. 68 is identical to Eq. 47 which describes the profile of the aspherical refractive surface of the preferred embodiments 4 and 4b, except for the difference that the refractive index $n_2$ is larger than $n_1$ in the preferred embodiment 6, while the refractive index $n_1$ is larger than $n_2$ in the preferred embodiments 4 and 4b. Both the refractive indices $n_1$ and $n_2$ can take any real number larger than 1. Therefore, from the same equation, either the profile of the aspherical refractive surface in the preferred embodiments 4 and 4b or the profile of the aspherical refractive surface in the preferred embodiment 6 can be obtained depending on which of the two refractive indices $n_1$ and $n_2$ is larger.

FIG. 20 shows the aspherical refractive surface in accordance with a preferred embodiment 6a of the present invention and the ray trajectories. The right and the left sides of the aspherical refractive surfaces in FIGS. 19 and 20 are exchanged to each other. Namely, in FIG. 20, the second medium with a refractive index $n_2$ exists at the left-side and the first medium with a refractive index $n_1$ exists at the right-side. It is assumed that the first medium is the air having a refractive index 1 ($n_1$=1.0) and the second medium is the BK7 glass. Therefore, the refractive index $n_2$ of the second medium is approximately 1.51508920 at a He—Ne laser wavelength of $\lambda$=0.6328□. Further, it is assumed that the shortest distance $r_o$ from the origin O to the refractive surface is 50.0 mm, and the zenith angle $\theta$ of the refractive ray ranges from a minimum $\theta_1$=0° to a maximum $\theta_2$=40°. Under these conditions, the second ray incident parallel to the optical axis diverges with the center of divergence at the point O after being refracted at the aspherical refractive surface following the Snell's law of refraction. Therefore, in the reverse direction, rays converging toward the point O are converted into the rays parallel to the optical axis after passing through the refractive surface.

FIG. 21 shows the profile of a spherical aberration-free aspherical lens 2100 and the ray trajectories in accordance with a preferred embodiments 1, 1a to 1d. It is also assumed here that the lens is made of BK glass, the back focal length is 50 mm, and the diameter of the lens is 50 mm.

With such an aspherical lens, rays incident from the object-side parallel to the optical axis are refracted at the lens, and converge toward a point. Therefore, this lens is indeed a spherical-aberration-free lens as has been intended. On the other hand, as shown in FIG. 22, collimated beam does not converge toward one point when the right and the left sides of the lens are exchanged to each other. However, as shown in FIG. 22, it can be advantageous to have the aspherical refractive surface of the lens to face the left (i.e., the object-side). For an instance, aberration characteristics other than the spherical aberration such as the distortion aberration can be improved. Therefore, there is a need to find the profile of a lens which is spherical-aberration-free when the aspherical refractive surface faces the object-side on the left as schematically shown in FIG. 22.

Preferred Embodiment 7

FIG. 23 shows the profile of an aspherical lens 2300 in accordance with a preferred embodiment 7 of the present invention, which is spherical-aberration-free when the aspherical refractive surface faces the object-side on the left. The aspherical lens 2300 in accordance with the preferred embodiment 7 is comprised of an aspherical refractive surface 2305 as the first lens surface, and a plane surface as the second lens surface 2307. A ray 2309 incident on the aspherical lens parallel to the optical axis 2301 is refracted at a point $Q_2$ on the aspherical refractive surface 2305 and the resultant refracted ray 2310 propagates toward a point $P_6$ on the second lens surface 2307. The refracted ray 2310 is refracted again at a point $P_6$ on the second lens surface 2307 and propagates toward the second focal point O of the lens 2300. Hereinafter, the refracted ray 2310 before being refracted at the point $P_6$ on the second lens surface 2307 is referred to as a first refracted ray, and the ray 2311 refracted at the point $P_6$ is referred to as a second refracted ray.

It is assumed that the refractive indices of the media on the object and the image sides are $n_0$ and $n_2$, respectively, and the refractive index of the lens is $n_1$. It is assumed that $n_o$ is different from $n_2$, in general. This can be compared to the case of an aquarium with one wall having the shape of the aspherical refractive surface and the inner and the outer sides of the aquarium are filled with different media such as the water and the air, respectively.

The angle between the incident ray 2309 and a normal N perpendicular to the tangent plane T at the point $Q_2$ on the aspherical refractive surface 2305 is $\phi$. On the other hand, the angle between the first refracted ray 2310 and the optical axis is $\delta$, and the angle between the second refracted ray 2311 and the optical axis is $\theta$. Applying the Snell's law for the refraction at the point $P_6$ results in Eq. 69.

$n_1 \sin\delta = n_2 \sin\theta$  MathFigure 69

At the point $Q_2$ on the aspherical refractive surface 2305, the angle between the incident ray 2309 and the normal N is $\phi$, therefore the angle of incidence is $\phi$. On the other hand, the angle between the first refracted ray 2310 and the normal N is $\phi-\delta$, therefore the angle of refraction is $\phi-\delta$. Applying the Snell's law for the refraction at the point $Q_2$ results in Eq. 70.

$n_o \sin\phi = n_1 \sin(\phi-\delta)$  MathFigure 70

The rectangular coordinates of a point $Q_2$ on the aspherical refractive surface 2305 are (X, Z), and the rectangular coordinates of a point $P_6$ on the second lens surface 2307 are (x, z). The profile of the second lens surface 2307 can be conveniently described in a polar coordinate system having the origin coinciding with the second focal point O of the lens and the z-axis coinciding with the optical axis 2301 by designating the distance r to the point $P_6$ as a function of the zenith angle $\theta$. The rectangular coordinates (x, z) and the polar coordinates ($\theta$, r) of the point $P_6$ have the relations given as $x(\theta) = r(\theta) \sin\theta$ and $z(\theta) = r(\theta) \cos\theta$ . The back focal length of this lens is $f_B$. Since the second lens surface 2307 is a plane, the rectangular coordinates (x, z) of the point $P_6$ are given as Eqs. 71 and 72.

$z(\theta) = f_B$  MathFigure 71

$x(\theta) = f_B \tan\theta$  MathFigure 72

On the other hand, the distance from the point $P_6$ on the second lens surface 2307 to the point $Q_2$ on the aspherical refractive surface (the first lens surface) 2305 is given as L($\theta$). If the distance L between the two points $Q_2$ and $P_6$ is expressed as a function of the zenith angle θ of the second refracted ray, then the rectangular coordinates (X, Z) of the point $Q_2$ on the aspherical refractive surface 2305 are given as Eqs. 73 and 74.

$$X(\theta) = f_B \tan\theta + L(\theta)\sin\delta(\theta) \qquad \text{MathFigure 73}$$

$$Z(\theta) = f_B + L(\theta)\cos\delta(\theta) \qquad \text{MathFigure 74}$$

The following Eq. 75 can be obtained by differentiating Eq. 73 with respect to θ.

$$\frac{dX}{d\theta} = \frac{f_B}{\cos^2\theta} + \frac{dL}{d\theta}\sin\delta + L\cos\delta\frac{d\delta}{d\theta} \qquad \text{MathFigure 75}$$

The following Eq. 76 can be obtained by differentiating Eq. 74 with respect to θ.

$$\frac{dZ}{d\theta} = \frac{dL}{d\theta}\cos\delta - L\sin\delta\frac{d\delta}{d\theta} \qquad \text{MathFigure 76}$$

Using trigonometrical functional relations, the slope tam φ of the tangent plane T at the point $Q_2$ on the aspherical refractive surface 2305 is given as Eq. 77.

$$\tan\phi = -\frac{dZ}{dX} \qquad \text{MathFigure 77}$$

Since, both the coordinates X and Z are functions of the zenith angle θ, Eq. 77 can be expressed as Eq. 78.

$$\frac{dZ}{d\theta} = -\tan\phi\frac{dX}{d\theta} \qquad \text{MathFigure 78}$$

With Eqs. 75 and 76, Eq. 78 can be expressed as Eq. 79.

$$\frac{dL}{d\theta} - L\left(\frac{\sin\delta - \tan\phi\cos\delta}{\cos\delta + \tan\phi\sin\delta}\right)\frac{d\delta}{d\theta} = -\frac{f_B}{\cos^2\theta}\left(\frac{\tan\phi}{\cos\delta + \tan\phi\sin\delta}\right) \qquad \text{MathFigure 79}$$

Before going further to obtain a solution, functions defined in Eqs. 80 and 81 can be used to make the expression in Eq. 79 simpler.

$$A(\theta) \equiv -\left(\frac{\sin\delta - \tan\phi\cos\delta}{\cos\delta + \tan\phi\sin\delta}\right)\frac{d\delta}{d\theta} \qquad \text{MathFigure 80}$$

$$B(\theta) \equiv -\frac{f_B}{\cos^2\theta}\left(\frac{\tan\phi}{\cos\delta + \tan\phi\sin\delta}\right) \qquad \text{MathFigure 81}$$

$$\frac{dL}{d\theta} + A(\theta)L(\theta) = B(\theta) \qquad \text{MathFigure 82}$$

Multiplying both sides of Eq. 82 with an unknown function F(θ), a relation shown in Eq. 83 can be obtained.

$$F(\theta)dL + F(\theta)A(\theta)L(\theta)d\theta = F(\theta)B(\theta)d\theta \qquad \text{MathFigure 83}$$

The condition for the left-side of Eq. 83 to be an exact differential is given as Eq. 84.

$$\frac{dF}{d\theta} = A(\theta)F(\theta) \qquad \text{MathFigure 84}$$

Therefore, the unknown function F(θ) must be given as a function of A(θ) as given in Eq. 85.

$$F(\theta) = \exp\left[\int_{\theta_1}^{\theta} A(\theta')d\theta'\right] \qquad \text{MathFigure 85}$$

Using Eq. 85, Eq. 83 is given as Eq. 86.

$$L(\theta)\exp\left[\int_{\theta_i}^{\theta} A(\theta')d\theta'\right] - L(\theta_i) = \int_{\theta_i}^{\theta} F(\theta')B(\theta')d\theta' \qquad \text{MathFigure 86}$$

Therefore, the function L(θ) is given as Eq. 87.

$$L(\theta) = \frac{1}{F(\theta)}\left\{L(\theta_i) + \int_{\theta_i}^{\theta} F(\theta')B(\theta')d\theta'\right\} \qquad \text{MathFigure 87}$$

The following Eq. 88 can be obtained by differentiating Eq. 69 with respect to θ.

$$\frac{d\delta}{d\theta} = \frac{n_2\cos\theta}{n_1\cos\delta} \qquad \text{MathFigure 88}$$

On the other hand, the following Eq. 89 can be obtained by rearranging Eq. 70.

$$\tan\phi = \frac{n_1\sin\delta}{n_1\cos\delta - n_o} \qquad \text{MathFigure 89}$$

With Eq 89, the numerator of the A(θ) given in Eq. 80 is given as Eq. 90.

$$\sin\delta - \tan\phi\cos\delta = \frac{-n_o\sin\delta}{n_1\cos\delta - n_o} \qquad \text{MathFigure 90}$$

On the other hand, the denominator of A(θ) given in Eq. 80 is given as Eq. 91.

$$\cos\delta + \tan\phi\sin\delta = \frac{n_1 - n_o\cos\delta}{n_1\cos\delta - n_o} \qquad \text{MathFigure 91}$$

With Eqs. 88 to 91, the function A(θ) is given as Eq. 92.

$$A(\theta) = \frac{n_o\sin\delta}{n_1 - n_o\cos\delta}\frac{n_2\cos\theta}{n_1\cos\delta} \qquad \text{MathFigure 92}$$

Using Eq. 69, the angle δ can be given as a function of the zenith angle θ as given in Eq. 93.

$$\delta(\theta) = \tan^{-1}\left[\frac{n_2 \sin\theta}{\sqrt{n_1^2 - n_2^2 \sin^2\theta}}\right] \qquad \text{MathFigure 93}$$

Therefore, the function $A(\theta)$ can be expressed as a sole function of the zenith angle $\theta$.

$$A(\theta) = \frac{n_o}{\sqrt{n_1^2 - n_2^2 \sin^2\theta}} \frac{n_2^2 \sin^2\theta \cos\theta}{n_1^2 - n_o \sqrt{n_1^2 - n_2^2 \sin^2\theta}} \qquad \text{MathFigure 94}$$

On the other hand, the function $B(\theta)$ is given as Eq. 95.

$$B(\theta) = -\frac{f_B}{\cos^2\theta} \frac{n_1 \sin\delta}{n_1 - n_o \cos\delta} \qquad \text{MathFigure 95}$$

The function $B(\theta)$ given in Eq. 95 can be expressed also as a sole function of the zenith angle $\theta$ as given in Eq. 96.

$$B(\theta) = \frac{f_B}{\cos^2\theta} \frac{n_1 n_2 \sin\theta}{n_1^2 - n_o \sqrt{n_1^2 - n_2^2 \sin^2\theta}} \qquad \text{MathFigure 96}$$

Accordingly, with Eqs. 85, 94 and 96, $L(\theta)$ given in Eq. 87 can be obtained. By using the function $L(\theta)$ and Eqs. 71 to 74, the profile of the aspherical refractive surface 2305 in accordance with the preferred embodiment 7 or 7a can be obtained.

FIG. 24 shows the profile of a lens 2300 and the ray trajectories in accordance with a preferred embodiment 7a. It is assumed that the lens 2300 is made of BK7 glass, and the refractive indices $n_o$ and $n_2$ of the media on the object and the image-sides of the lens 2300 are both that of the air, that is, $n_o = n_2 = 1.0$. Therefore the refractive index $n_1$ of the lens 2300 is approximately 1.51508920 at a He—Ne laser wavelength of $\lambda = 0.6328$□. It is further assumed that both the back focal length and the diameter of the lens are 50.0 mm. Under these conditions, an incident ray parallel to the optical axis is refracted once at the front surface of the lens 2300, namely at the aspherical refractive surface (first lens surface) 2305, and once at the back surface, namely at the second lens surface (plane surface) 2307, and then the twice refracted ray converges toward one point, i.e., the second focal point of the lens. Therefore, in the reverse direction, a ray diverging from the second focal point of the lens 2300 is refracted twice at the lens and then converted into a ray parallel to the optical axis.

Again, referring to FIG. 19, the aspherical lens 1900 of the preferred embodiment 6 or 6a converts the ray 1909 converging toward the second focal point O of the lens 1900 into a collimated beam 1911 which is parallel to the optical axis, and converts a collimated beam 1911 which is parallel to the optical axis into a diverging ray with the center of divergence at the second focal point O of the lens 1900. In order to convert a converging ray into a collimated beam, the converging ray should be incident on the lens from the side of the aspherical refractive surface 1905 (i.e., the first lens surface). Reversely, in order to convert a collimated beam into a diverging ray, the collimated beam should be incident on the lens from the side of the plane lens surface 1907 (i.e., the second lens surface). However, similar to the preferred embodiment 6 or 6a, it may be necessary to have a lens which could convert a ray converging toward the second focal point of the lens into a collimated beam and a collimated beam into a diverging ray with the center of divergence at the second focal point of the lens, while having the object and the image sides of the two lens surfaces exchanged.

Preferred Embodiment 8

FIG. 25 shows a schematic diagram of an aspherical lens 2500 with improved aberration characteristics. In accordance with the preferred embodiment 8 of the present invention, the aspherical lens 2500 is comprised of a plane first lens surface 2507 and an aspherical second lens surface 2505. An incident ray 2509 converging toward the second focal point O of the aspherical lens 2500 is refracted at the point $P_7$ on the first lens surface 2507 and as a refracted ray 2510, propagates to the point $Q_3$ on the aspherical refractive surface 2505. This refracted ray 2510 is refracted again at the point $Q_3$ on the aspherical refractive surface 2505 and becomes a ray 2511 parallel to the optical axis 2501. In the preferred embodiment 8, the refracted ray 2510 before being refracted at the point $Q_3$ is referred to as a first refracted ray, and the ray 2511 being refracted at the point $Q_3$ is referred to as a second refracted ray. Similar to the preferred embodiments 7 and 7a, it is assumed that the media on the object and the image-sides can have different refractive indices in general. The refractive indices of the media on the object and the image sides are $n_o$ and $n_2$, respectively, and the refractive index of the lens is $n_1$. The angle between the incident ray 2509 at the point $P_7$ on the first lens surface 2507 and the optical axis is $\theta$, and the angle between the first refracted ray 2510 and the optical axis is $\delta$. Applying the Snell's law for the refraction at the point $P_7$ results in the following Eq. 97.

$$n_o \sin\theta = n_1 \sin\delta \qquad \text{MathFigure 97}$$

The angle between the first refracted ray 2510 and the normal N at the point $Q_3$ on the aspherical refractive surface 2505 is $\phi - \delta$, and the angle between the second refracted ray 2511 and the normal N is $\phi$. Therefore, applying Snell's law of refraction at the point $Q_3$ results in Eq. 98.

$$n_1 \sin(\phi - \delta) = n_2 \sin\theta \qquad \text{MathFigure 98}$$

The rectangular coordinates of a point $P_7$ on the first lens surface 2507 are (x, z), and the rectangular coordinates of a point $Q_3$ on the aspherical refractive surface (i.e., the second lens surface) 2505 are (X, Z). The profile of the first lens surface 2507 can be described in a polar coordinate system having the origin located at the second focal point O of the lens 2500 and the z-axis coinciding with the optical axis 2501 by designating the distance r to the point $P_7$ as a function of the zenith angle $\theta$ of the same point. Therefore, the rectangular coordinates (x, z) and the polar coordinates $(\theta, r)$ of the point $P_7$ have relations given as $$x(\theta) = r(\theta) \sin\theta$$

and $$z(\theta) = r(\theta) \cos\theta$$

. Since the first lens surface is a plane surface, the height z measured along the optical axis is given as a constant.

$$z(\theta) = z(0) = z_0 \qquad \text{MathFigure 99}$$

On the other hand, the coordinate x is a function of the zenith angle $\theta$ and given as Eq. 100.

$$x(\theta) = z_0 \tan\theta \qquad \text{MathFigure 100}$$

The distance from a point $P_7$ on the first lens surface 2507 to the point $Q_3$ on the aspherical refractive surface 2505 is given as L(θ). If the distance L between the two points is expressed as a function of the zenith angle θ of the incident ray 2509, then the rectangular coordinates (X, Z) of the point $Q_3$ on the aspherical refractive surface 2505 are given as Eqs. 100 and 101.

$$X(\theta) = z_o \tan\theta - L(\theta)\sin\delta(\theta) \qquad \text{MathFigure 101}$$

$$Z(\theta) = z_o - L(\theta)\cos\delta(\theta) \qquad \text{MathFigure 102}$$

The following Eq. 103 can be obtained by differentiating Eq. 101 with respect to θ.

$$\frac{dX}{d\theta} = \frac{z_o}{\cos^2\theta} - \frac{dL}{d\theta}\sin\delta - L\cos\delta\frac{d\delta}{d\theta} \qquad \text{MathFigure 103}$$

Again, the following Eq. 104 can be obtained by differentiating Eq. 102 with respect to θ.

$$\frac{dZ}{d\theta} = -\frac{dL}{d\theta}\cos\delta + L\sin\delta\frac{d\delta}{d\theta} \qquad \text{MathFigure 104}$$

The slope of the tangent plane T at the point $Q_3$ on the second lens surface 2505 is given as Eq. 105.

$$\tan\phi = -\frac{dX}{dX} \qquad \text{MathFigure 105}$$

Since, both the coordinates X and Z are functions of the zenith angle θ, Eq. 105 can be expressed as Eq. 106.

$$\frac{dZ}{d\theta} = -\tan\phi\frac{dX}{d\theta} \qquad \text{MathFigure 106}$$

Using Eqs. 103 and 104, Eq. 106 can be expressed as Eq. 107.

$$\frac{dL(\theta)}{d\theta} + A(\theta)L(\theta) = B(\theta) \qquad \text{MathFigure 107}$$

Eq. 107 can be expressed in a simpler form using the functions defined in Eqs. 108 and 109.

$$A(\theta) \equiv -\left(\frac{\sin\delta - \tan\phi\cos\delta}{\cos\delta + \tan\phi\sin\delta}\right)\frac{d\delta}{d\theta} \qquad \text{MathFigure 108}$$

$$B(\theta) \equiv \frac{z_o}{\cos^2\theta}\left(\frac{\tan\phi}{\cos\delta + \tan\phi\sin\delta}\right) \qquad \text{MathFigure 109}$$

Following the similar derivational procedures shown in the preferred embodiment 7 or 7a, the function L(θ) can be given as Eq. 110.

$$L(\theta) = \frac{1}{F(\theta)}\left\{L(\theta_i) + \int_{\theta_i}^{\theta} F(\theta')B(\theta')d\theta'\right\} \qquad \text{MathFigure 110}$$

Here, the function F(θ) is a function of A(θ) and given as Eq. 111.

$$F(\theta) = \exp\left[\int_{\theta_i}^{\theta} A(\theta')d\theta'\right] \qquad \text{MathFigure 111}$$

The following Eq. 112 is obtained by differentiating Eq. 97 with respect to θ.

$$\frac{d\delta}{d\theta} = \frac{n_o\cos\theta}{n_1\cos\delta} \qquad \text{MathFigure 112}$$

The following Eq. 113 can be obtained by rearranging Eq. 98.

$$\tan\phi = \frac{n_1\sin\delta}{n_1\cos\delta - n_2} \qquad \text{MathFigure 113}$$

Using Eq. 113, the numerator of the function A(θ) defined in Eq. 108 can be given as Eq. 114.

$$\sin\delta - \tan\phi\cos\delta = \frac{-n_2\sin\delta}{n_1\cos\delta - n_2} \qquad \text{MathFigure 114}$$

Similarly, the denominator of the function A(θ) can be given as Eq. 115.

$$\cos\delta + \tan\phi\sin\delta = \frac{n_1 - n_2\cos\delta}{n_1\cos\delta - n_2} \qquad \text{MathFigure 115}$$

Using Eqs. 112 to 115, the function A(θ) is given as Eq. 116.

$$A(\theta) = \frac{n_2\sin\delta}{n_1 - n_2\cos\delta}\frac{n_o\cos\theta}{n_1\cos\delta} \qquad \text{MathFigure 116}$$

Using Eq. 97, the angle δ can be given as a sole function of the zenith angle θ as shown in Eq. 117.

$$\delta(\theta) = \tan^{-1}\left[\frac{n_o\sin\theta}{\sqrt{n_1^2 - n_o^2\sin^2\theta}}\right] \qquad \text{MathFigure 117}$$

Resultantly, the function A(θ) can be given as a sole function of the zenith angle θ.

$$A(\theta) = \frac{n_2}{\sqrt{n_1^2 - n_o^2\sin^2\theta}}\frac{n_o^2\sin\theta\cos\theta}{n_1^2 - n_2\sqrt{n_1^2 - n_o^2\sin^2\theta}} \qquad \text{MathFigure 118}$$

On the other hand, the function B(θ) is given as Eq. 119.

$$B(\theta) = \frac{z_o}{\cos^2\theta}\frac{n_1\sin\delta}{n_1 - n_2\cos\delta} \qquad \text{MathFigure 119}$$

Eq. 119 can also be given as a sole function of the zenith angle θ as shown in Eq. 120.

$$B(\theta) = \frac{z_o}{\cos^2\theta} \frac{n_1 n_o \sin\theta}{n_1^2 - n_2\sqrt{n_1^2 - n_o^2\sin^2\theta}} \quad \text{MathFigure 120}$$

Accordingly, using Eqs. 111, 118 and 120, the function L(θ) given in Eq. 110 can be obtained. Further, by using the function L(θ) and Eqs. 99 to 102 and 117, the profile of the aspherical refractive surface 2505 of the aspherical lens 2500 in accordance with the preferred embodiment 8 can be obtained.

FIG. 26 shows the profile of a lens 2500 and the ray trajectories in accordance with a preferred embodiment 8a of the present invention. The right and the left sides of the lens shown in FIG. 26 are exchanged to each other compared with those of the lens shown in FIG. 25. It is assumed that the lens 2500 is made of BK7 glass and the refractive indices $n_o$ and $n_2$ of the media on the object and the image-sides of the lens are that of the air, that is $n_o = n_2 = 1.0$. Therefore the refractive index $n_1$ of the lens is approximately 1.51508920 at a He—Ne laser wavelength of λ=0.6328□. Further, it is assumed that the entrance pupil diameter (EPD) of the lens is 50.0 mm, and the minimum distance $z_o$ and the lens center thickness L(0) are 60 mm and 10 mm, respectively ($z_o$=60 mm, L(0)=10 mm). Under these conditions, an incident ray parallel to the optical axis is refracted once at a front surface, namely at the aspherical refractive surface (second lens surface) and once at a back surface, namely at the first lens surface (plane surface) in accordance with the Snell's Law of refraction, and then the twice refracted ray diverges with the center of divergence at the second focal point of the lens. Therefore, in the reverse direction, a ray converging toward the second focal point is refracted twice on the lens 2500 and then converted into a collimated beam parallel to the optical axis.

Preferred Embodiment 9

FIG. 27 schematically shows the profile of an aspherical lens 2700 in accordance with a preferred embodiments 9 and 9a to 9g of the present invention. The aspherical lens 2700 converts a converging ray into another converging ray with a smaller convergence angle and a diverging ray into another diverging ray with a larger divergence angle. As shown in FIG. 27, the cross-section of an aspherical refractive surface 2705 in the x-y plane is symmetric about the optical axis 2701 which coincides with the z-axis of the coordinate system. A medium with a refractive index $n_1$ and a medium with a refractive index $n_2$ exist at the left and the right sides of the aspherical refractive surface 2705, respectively. The refractive index $n_1$ is smaller than $n_2$ ($n_1 < n_2$). A first ray 2709 converging from the left to the right is refracted at the point $P_8$ on the aspherical refractive surface 2705 and then propagates to the point O with a smaller convergence angle. In the reverse direction, the second ray 2711 diverging from a point 0 on the optical-axis 2701 is refracted at a point $P_8$ on the aspherical refractive surface 2705, and then diverges with a larger divergence angle.

A medium with a refractive index $n_2$ may fill the space between the aspherical refractive surface 2705 and the infinity to the right side of the aspherical refractive surface. Alternatively, as shown in FIG. 27, a medium with a refractive index $n_2$ may fill only the space between the second lens surface 2707, namely a spherical surface having a radius $r_B$ with respect to a point O, and the aspherical refractive surface (the first lens surface) 2705. The latter case corresponds to a biconcave lens.

Since the second lens surface 2707 is a spherical surface having the center at the origin O, the propagation direction of the second ray 2711 passing through the point O does not change after the second ray 2711 passes through the second lens surface 2707. Accordingly, the design of the aspherical refractive surface 2705 is not affected by the presence or absence of the second lens surface 2707. Also, the lens schematically shown in FIG. 27 can be implemented into a biconcave lens as well as various lenses and other optical components having single aspherical refractive surface 2705.

The profile of the aspherical refractive surface 2705 can be described in a rectangular and a polar coordinate systems having the origin at the point O and the z-axis coinciding with the optical axis 2701. The z-axis runs from the right side to the left side in the figure. The coordinates of the point $P_8$ can be described with the zenith angle θ and the distance r from the origin O to the point $P_8$, namely as (θ, r=r(θ)). The rectangular coordinates (x, z) can be given as functions of the independent variable θ in the polar coordinate systems as $$x(\theta) = r(\theta)\sin\theta$$

and $$z(\theta) = r(\theta)\cos\theta$$

Also, the profile of the aspherical refractive surface 2705 can be defined with an elevation angle φ of a tangent plane T at the point $P_8(\theta, r)$ on the aspherical refractive surface 2705. The elevation angle φ=φ(θ) of the tangent plane T is a function of the zenith angle θ, and satisfies Eq. 121.

$$\tan\phi = \frac{dz}{dx} \quad \text{MathFigure 121}$$

Following a similar derivational procedures for obtaining the profile of the aspherical refractive surface given in the preferred embodiments 1 to 1d, the profile of the aspherical refractive surface 2705 can be given as Eq. 122.

$$r(\theta) = r(\theta_i)\exp\left[\int_{\theta_i}^{\theta} \frac{\sin\theta' + \tan\phi(\theta')\cos\theta'}{\cos\theta' - \tan\phi(\theta')\sin\theta'} d\theta'\right] \quad \text{MathFigure 122}$$

In Eq. 122, θ' is a dummy variable. The lower bound of the indefinite integral is θ=$\theta_i$, and r($\theta_i$) is the corresponding distance from the origin to a point on the aspherical refractive surface 2705 having a zenith angle θ=$\theta_i$. Preferably, the lower bound $\theta_i$ is zero ($\theta_i$=0) and r(0)=$r_0$ is the distance from the origin O to the intersection between the aspherical refractive surface 2705 and the optical axis 2701. Assuming the lens takes the form of a biconcave lens, the center thickness "t" of the lens is $r_o - r_B$ (t=$r_o - r_B$).

The first ray 2709 is refracted at the aspherical refractive surface 2705 according to the Snell's law of refraction. The angle between a normal N perpendicular to the tangent plane T at the point $P_8$ on the aspherical refractive surface 2705 and the first ray 2709 is φ+δ, therefore the angle of incidence is φ+δ. On the other hand, the angle between the normal N and the second ray 2711 is φ+θ, therefore the angle of refraction is φ+θ. The angle of incidence and the angle of refraction satisfies Eq. 123 according to the Snell's law of refraction.

$$n_1 \sin(\delta+\phi) = n_2 \sin(\theta+\phi) \quad \text{MathFigure 123}$$

Rearranging Eq. 123 using the trigonometrical functional relations, the slope tan φ of the tangent plane T is given as Eq. 124.

$$\tan\phi = \frac{-n_1\sin\delta + n_2\sin\theta}{n_1\cos\delta - n_2\cos\theta} \qquad \text{MathFigure 124}$$

Using Eq. 124, the numerator of the integrand in Eq. 122 is given as Eq. 125.

$$\sin\theta + \tan\phi\cos\theta = \frac{-n_1\sin(\delta-\theta)}{n_1\cos\delta - n_2\cos\theta}. \qquad \text{MathFigure 125}$$

On the other hand, the denominator of the integrand is given as Eq. 126.

$$\cos\theta - \tan\phi\sin\theta = \frac{n_1\cos(\delta-\theta) - n_2}{n_1\cos\delta - n_2\cos\theta} \qquad \text{MathFigure 126}$$

Resultantly, using Eqs. 125 and 126, Eq. 122 can be reduced to a simpler form given in Eq. 127.

$$r(\theta) = r(\theta_i)\exp\left[\int_{\theta_i}^{\theta} \frac{-n_1\sin(\delta-\theta')}{n_1\cos(\delta-\theta') - n_2} d\theta'\right] \qquad \text{MathFigure 127}$$

In order to obtain the profile of an aspherical refractive surface described by Eq. 127, the zenith angle δ of the incident ray must be given as a function of the zenith angle θ of the refractive ray as given in Eq. 128.

$$\delta = \delta(\theta) \qquad \text{MathFigure 128}$$

As indicated in Eq. 128, the angle δ is an arbitrary function of the zenith angle θ. This function expresses a projection scheme of the lens. If the projection scheme given in Eq. 128 and $n_1$, $n_2$, $\theta_1$, $\theta_2$, $\theta_i$ and $r(\theta_i)$ are given as well, the profile of the aspherical refractive surface 2705 is determined uniquely.

In accordance with a preferred embodiment 9a, the lens 2700 of the preferred embodiment 9 can be used as a wide-angle converter. FIG. 28 shows the lens 2700 for increasing the divergence angle of a diverging ray. It is assumed that the first medium is the air of which the refractive index $n_1$ is 1.0 ($n_1$=1.0), and the second medium is the BK7 glass having the refractive index $n_2$. Therefore, the refractive index $n_2$ is approximately 1.51508920 at the He—Ne laser wavelength of λ=0.6328□. Further, it is assumed that the lower bound $\theta_i$ of the indefinite integral in Eq. 127 is zero ($\theta_i$=0), the shortest distance $r_o$ from the origin O to the aspherical refractive surface (first lens surface) 2705 is 50.0 mm ($r(\theta_i)$=r(0)= $r_o$=50.0 mm), and the radius $r_B$ of the second lens surface is 30 mm ($r_B$=30 mm).

The profile of the lens 2700 is designed so that the second ray 2711 being refracted at the aspherical refractive surface 2705 becomes the first ray 2709 having a larger divergence angle. As shown in FIG. 29, the second ray 2711 with a divergence angle θ between a minimum $\theta_1$=0° and a maximum $\theta_2$=20° is refracted at the aspherical refractive surface 2705 and becomes the first ray 2709 with a divergence angle between a minimum $\delta_1$=0° and a maximum $\delta_2$=60°. Therefore, a relation given as $$\delta(\theta) = B\theta$$

holds true. Alternatively, the lens 2700 of the preferred embodiment 9 can be used to reduce the convergence angle of a converging ray. This preferred embodiment is an example of the equi-angular projection scheme given in Eq. 129.

$$\delta(\theta) = c_{ea}\theta \qquad \text{MathFigure 129}$$

In Eq. 129, $c_{ea}$ is a proportionality constant, and given as an arbitrary real number. If the proportionality constant $c_{ee}$ is zero ($c_{ea}$=0), that is δ(θ)=0, the profile of the lens 2700 is the same as that of lens shown in the preferred embodiments 3a and 3b. In other words if δ(0)=0, then Eq. 127 is identical to Eq. 40. If the proportionality constant $c_{ea}$ is larger than 1, the divergence angle of the diverging ray is increased. On the other hand, if the proportionality constant $c_{ea}$ is larger than 0 and smaller than 1, the divergence angle is decreased.

FIG. 30 shows the profile of a lens 2700 in accordance with a preferred embodiment of 9b, wherein the second ray 2711 becomes the first ray 2709 with a smaller divergence angle after being refracted at the aspherical refractive surface 2705 (the first lens surface). The divergence angle θ of the second ray 2711 ranges from a minimum $\theta_1$=0° to a maximum $\theta_2$=30°, while the divergence angle δ of the first ray 2709 ranges from a minimum $\delta_1$=0° to a maximum $\delta_2$=10°. In this case also, the projection scheme is given as $$\delta(\theta) = c_{ea}\theta$$

, but the proportionality constant $c_{ea}$ is ⅓ ($c_{ea}$=⅓).

In a case where the proportionality constant $c_{ea}$ is smaller than zero, the second ray 2711 converges again after being refracted at the aspherical refractive surface 2705, but the converging ray does not converge toward one point. Therefore, this case is of little practical value. For such a purpose, it is better to use the lens in the preferred embodiment 2.

The equi-angular projection scheme given in Eq. 129 can be defined more generally. In Eq. 129, both of the minimum zenith angles $\delta_1$ of the first ray 2709 and $\theta_1$ of the second ray 2711 are zero. In a case where the two minimum zenith angles are not zero in general, the equi-angular projection scheme can be given as Eq. 130.

$$\delta(\theta) = \left(\frac{\delta_2 - \delta_1}{\theta_2 - \theta_1}\right)(\theta - \theta_1) + \delta_1 \qquad \text{MathFigure 130}$$

In Eq. 130, $\theta_1$, $\theta_2$, $\delta_1$ and $\delta_2$ can be arbitrary real numbers. The zenith angle θ of the second ray 2711 ranges from $\theta_1$ to $\theta_2$, and the zenith angle δ of the first ray 2709 ranges from $\delta_1$ to $\delta_2$.

FIG. 31 shows a complex lens 3100 and the ray trajectories in accordance with a preferred embodiment 9c. The lens 3100 is designed so that a divergent ray with a zenith angle θ between a minimum $\theta_1$=0° and a maximum angle $\theta_2$=25° is separated after refraction into three different rays with zenith angles δ=0°, 25° and 50°, respectively. The projection scheme is given as Eq. 131.

$$\delta(\theta) = \begin{cases} 0° & 0° \leq \theta \leq 5° \\ 25° & 5° < \theta \leq 15° \\ 50° & 15° < \theta \leq 25° \end{cases} \qquad \text{MathFigure 131}$$

The complex lens 3100 can be adopted to obtain structured lighting effects by placing a typical light source at the focal point of the complex lens.

Currently, an LED (light emitting diode) is in the limelight as a better substitute for a conventional light source such as an incandescent light bulb. However, in general, the radiation pattern of an LED is not always in an optimum condition for lighting. FIG. 32 is a conceptual diagram explaining the relation between irradiance and flux for a given light source. Like the housing of an incandescent light bulb, an LED housing has a rotationally symmetrical shape. Let's assume that an LED is located at the origin of a coordinate system having the z-axis coinciding with the rotational symmetry axis 3201 of the LED. Then, the irradiation is measured at a point 3203 on a hypothetical sphere 3202 having a radius r and with the center at the origin. The irradiation is the measure of an optical power of an incident ray on a surface per unit area, and a typical unit is given as Watt/cm$^2$. If the LED housing has a rotationally symmetric shape, then irradiation pattern will be also rotationally symmetric. Therefore, irradiation I at a point 3203 on the spherical surface 3202 can be given as a sole function of the zenith angle θ as given in Eq. 132.

$$I=I(\theta) \qquad \text{MathFigure 132}$$

Let's imagine a thin strip of circular band on the spherical surface 3202 which covers an area with a zenith angle between θ and θ+dθ. Then the band has a width rdθ and a circumference 2πrsin θ. Thus, the sum of the irradiation on the band is given as rdθ×2πrsin θ×I(θ). Therefore, the radiant power E(θ), which is the sum of all the irradiation on a part of the spherical surface 3202 with the zenith angle between 0 and θ, is given as Eq. 133.

$$E(\theta)=2\pi r^2 \partial_0^\theta I(\theta')\sin \theta' d\theta' \qquad \text{MathFigure 133}$$

FIG. 33 shows an exemplary irradiation pattern of the present invention arbitrarily chosen as Eq. 134.

$$I(\theta)=\cos^{-}\theta \qquad \text{MathFigure 134}$$

In FIG. 33, the part of the graph marked with a bold line corresponds to a region with a zenith angle between θ=0° and θ=45°. If a light source having such a high directivity is used for lighting, then the front side of the light source will be overly bright, and the peripheral region will be progressively darker as the zenith angle increases. Therefore, a lens is required to be used in front of the light source so as to redistribute the light output, and homogenize the irradiance at the regions with a zenith angle less than a predetermined value. In a typical residential environment, if the radius r of the spherical surface 3202 is set to a distance from a light source installed on a ceiling to a floor, then the size of the LED can be ignored compared with the radius r. Thus, the fact that the propagation direction of the ray refracted at the lens is not on a straight line passing through the origin hardly matters. Therefore, this problem can be solved by finding the zenith angle δ of the refracted rays required to force the irradiation within the chosen angular range uniform as a function of the zenith angle θ of the incident rays.

$$\delta=\delta(\theta) \qquad \text{MathFigure 135}$$

When the lens is placed in front of the light source, then the radiant power of a region of the sphere with the zenith angle between 0 and δ is given as Eq. 136.

$$G(\delta)=2\pi r^2 I_o \int_0^\delta \sin \delta' d\delta' \qquad \text{MathFigure 136}$$

In Eq. 136, $I_o$ is the homogenized irradiation after installation of the lens. If there is no loss of energy due to reflection or absorption at the lens, the following equation should hold true according to the law of conservation of energy.

$$G(\delta)=E(\theta) \qquad \text{MathFigure 137}$$

More specifically, if the angular range of the rays from the light source is from 0 to $\theta_2$, and the corresponding angular range of the refracted ray is from 0 to $\delta_2$, then the total radiant power $E_T$ is given as Eq. 138.

$$G(\delta_2)=E_T=E(\theta_2) \qquad \text{MathFigure 138}$$

From Eqs. 136 and 138, the irradiation of the rays after passing through the lens is given as Eq. 139.

$$I_o = \frac{E_T}{2\pi r^2(1 - \cos\delta_2)} \qquad \text{MathFigure 139}$$

On the other hand, the angle of refraction to force the irradiation uniform is given as Eq. 140.

$$\delta(\theta) = \cos^{-1}\left[1 - \frac{1}{I_o}\int_0^\theta I(\theta')\sin\theta' d\theta'\right] \qquad \text{MathFigure 140}$$

With Eqs. 140 and 127, the shape of the lens can be obtained which can be aligned in front of a highly-directional light source to change the propagation direction of the rays in order to maintain the irradiation within a predetermined angular range uniform.

FIG. 34 shows the shape of the lens 3400 calculated using Eqs. 140 and 127 and the ray trajectories in accordance with a preferred embodiment 9d of the present invention. The two maximum zenith angles $\theta_2$ and $\delta_2$ corresponding to the ray before and after the refraction at the lens are set to 45°. On the aspherical refractive surface 3401, the rays with smaller zenith angles are refracted into the rays with larger zenith angles. By redistributing the rays in such a way, a uniform irradiation is accomplished on the region of the sphere within the predetermined angular range.

In the preferred embodiment 9e, a lens is provided which can be aligned in front of a light source having the irradiation pattern shown in FIG. 35. The irradiation pattern shown in FIG. 35 can be represented as Eq. 141.

$$I(\theta)=\sin^{\in}(2.5\theta) \qquad \text{MathFigure 141}$$

For a light source having the irradiation pattern given in Eq. 141, the irradiation is high in a region with the zenith angle between 30° and 40°, but it is low in the front side of the light source. FIG. 36 shows the shape of the lens to be used with a light source having such an irradiation pattern, and the ray trajectories. With the aspherical lens 3600, it is possible to refract the rays having relatively large zenith angles toward the front side of the lens where the irradiation is relatively low.

If the LED housing is rotationally symmetric in shape, then naturally, the lens should be also rotationally symmetric in shape. Also, it is not really necessary to have separate lens and LED. Rather, the LED housing can be formed to have the shape of the aspherical refractive surface in order to obtain a uniform irradiation pattern. In these preferred embodiments, cases for obtaining uniform irradiation patterns are considered. However, other cases with different goals can be considered. For example, the rays can be focused more or widely dispersed, or other irradiation patterns can be obtained for special lighting effects. On the other hand, the formula for obtaining the radiant power should be changed for one-dimensional light sources such as the one used in LCD (liquid crystal display) panels.

FIG. 37 is a conceptual diagram for illustrating the relation between the zenith angle δ of the incident ray 3709 and the zenith angle θ of the refractive ray for a given projection scheme in an imaging optical system such as a camera. A camera is composed of a lens 3710 and a body 3712 having an image sensor 3714 therein. The lens 3710 can be regarded as a pinhole in an ideal camera model. The nodal point NP of the camera is the location of the pinhole. It is assumed that all the rays 3711 propagating from the subject to the image sensor pass through the nodal point NP of the camera. The distance from the nodal point NP to the image sensor is approximately equal to the nominal focal length f of the camera. In this preferred embodiment, the rays before and after passing through the nodal point NP are referred to as the incident ray (3709) and as the refracted ray (3711), respectively. If the zenith angle between the refracted ray and the optical axis 3701 is $\theta$, then the distance x from the center of the image sensor 3714, i.e., the intersection between the image sensor 3714 and the optical axis, to a point on the image sensor where the refracted ray is captured, is given as Eq. 142.

$$x = f \tan\theta \qquad \text{MathFigure 142}$$

In a rectilinear projection scheme, it is assumed that the subject exists on a plane 3721 perpendicular to the optical axis 3701 which is set apart from the nodal point NP by a distance d. The incident ray 3709 is originated from a point 3723 on the plane 3721 which is at a distance y from the optical axis, and the zenith angle between the incident ray 3709 and the optical axis is $\delta$. The zenith angle $\delta$ of the incident ray 3709 and the distance y satisfy Eq. 143.

$$y = d \tan\delta \qquad \text{MathFigure 143}$$

In a rectilinear projection scheme, $\tan\delta$ is proportional to $\tan\theta$ as shown in Eq. 144.

$$\tan\theta = c_{rl} \tan\delta \qquad \text{MathFigure 144}$$

In Eq. 144, $c_{rl}$ is a proportionality constant. In imaging optical systems, if the zenith angle $\delta$ of the incident ray ranges from a minimum 0 to a maximum $\delta_2$ and the zenith angle $\theta$ of the refracted ray ranges from a minimum 0 to a maximum $\theta_2$, then according to Eq. 144, a relation given in Eq. 145 should hold true.

$$\tan\theta_2 = c_{rl} \tan\delta_2 \qquad \text{MathFigure 145}$$

From Eq. 145, the proportionality constant $c_{rl}$ is uniquely determined, and thus in optical systems following the rectilinear projection scheme, the zenith angle of the incident ray is given as a function of the zenith angle $\theta$ of the refracted ray as given in Eq. 146.

$$\delta(\theta) = \tan^{-1}\left[\frac{\tan\delta_2}{\tan\theta_2}\tan\theta\right] \qquad \text{MathFigure 146}$$

With an imaging optical system implementing the rectilinear projection scheme, the image of the subject on the plane 3721 is faithfully reproduced on the image sensor 3714. The magnification M of the imaging system can be defined as a ratio of the image size x to the subject size y. From Eqs. 142 and 143, the magnification M is given as Eq. 147.

$$M \equiv \frac{x}{y} = \frac{f \tan\theta}{d \tan\delta} = c_{rl}\left(\frac{f}{d}\right) \qquad \text{MathFigure 147}$$

Since, $c_{rl}$ is a proportionality constant, the magnification M depends only on the object distance d and the focal length f of the lens. Therefore, a subject on the plane 3721 can be reproduced on the image sensor 3714 with each part of the subject having the same scale. This rectilinear projection scheme is what most of the imaging optical lenses are following, or at least trying to implement as faithfully as possible.

In the rectilinear projection scheme, the zenith angle $\delta$ of the incident ray cannot be over 90°. However, for certain applications, it is necessary that the zenith angle of the incident ray be over 90°, and thus projection schemes other than the rectilinear projection scheme are required. Among the numerous projection schemes allowing the incident ray to have a zenith angle $\delta$ larger than 90°, the best known projection scheme is the equidistance projection scheme. In the equidistance projection scheme, it is assumed that a subject exists on a large sphere 3731 with the center located at the camera, and the zenith angle $\delta$ of the incident ray and the tangent of the zenith angle $\theta$ of the refracted ray have a linear relation given in Eq. 148.

$$\tan\theta = c_{ed}\delta \qquad \text{MathFigure 148}$$

In Eq. 148, $c_{ed}$ is another proportionality constant. Considering the ranges of the two zenith angles in a similar manner to the case of the rectilinear projection scheme, the zenith angle of the incident ray is given as a function of the zenith angle of the refracted ray as given in Eq. 149.

$$\delta(\theta) = \left(\frac{\delta_2}{\tan\theta_2}\right)\tan\theta \qquad \text{MathFigure 149}$$

According to the relation shown in Eq. 149, the zenith angle $\theta$ of the refracted ray cannot be over 90°. However, such a limitation does not apply to the zenith angle of the incident ray, and thus a point 3733 on the spherical surface 3731 from which the incident ray 3709 originates can be located even behind the camera. Premium-grade fisheye lens implements the equidistance projection scheme relatively faithfully. The discrepancy between the actual projection scheme and the equidistance projection scheme is one of the major indicator of the quality of fisheye lenses.

Another projection scheme which is similar to the equidistance projection scheme is the stereographic projection scheme and given as Eq. 150.

$$\tan\theta = c_{sg}\tan\frac{\delta}{2} \qquad \text{MathFigure 150}$$

Considering the ranges of the zenith angles of the incident and the refracted rays, the zenith angle of the incident ray is given as a function of the zenith angle of the refracted ray as given in Eq. 151.

$$\delta(\theta) = 2\tan^{-1}\left[\frac{\tan\frac{\delta_2}{2}}{\tan\theta_2}\tan\theta\right] \qquad \text{MathFigure 151}$$

Among the projection schemes allowing a field of view (FOV) over 180° like that of the fisheye lenses, the stereographic projection scheme provides images that appear most natural to the naked human eye. For example, if the whole sky is captured with a camera equipped with a fisheye lens following the stereographic projection scheme, a round object such as the sun appears as a circle irrespective of the location in the captured image. On the other hand, in the image following the equidistance projection scheme, a circle can appear as an ellipse depending on the location in the captured image.

Finally, another projection scheme has been known for a long time, namely the orthographic projection scheme given in Eq. 152.

$$\tan\theta = c_{og} \sin\delta \qquad \text{MathFigure 152}$$

Considering the ranges of the zenith angles of the incident and the refracted rays similar to the case of the rectilinear projection scheme, the zenith angle of the incident ray is given as a function of the zenith angle of the refracted ray as shown in Eq. 153.

$$\delta(\theta) = \sin^{-1}\left[\frac{\sin\delta_2}{\tan\theta_2}\tan\theta\right] \qquad \text{MathFigure 153}$$

FIG. 38 is a graph comparing the various projection schemes mentioned previously. The proportionality constants are chosen so that the two zenith angles coincide with one another when their values are small, namely a relation $$\theta \approx \delta$$

is satisfied for small zenith angle. Specifically, the proportionality constants $c_{rl}$, $c_{ed}$ and $c_{og}$ are all 1.0, and $c_{sg}$ is 2.0 ($c_{rl} = c_{ed} = c_{og} = 1.0$ and $c_{sg} = 2.0$). On the other hand, FIG. 39 is a graph comparing the four different projection schemes, namely the rectili near projection scheme (rl), the equidistance projection scheme (ed), the stereographic projection scheme (sg) and the orthographic projection scheme (og), for the identical ranges of the zenith angle $\theta$ of the refracted ray between 0° and 30° and the zenith angle $\delta$ of the incident ray between 0° and 60°. Among these various projection schemes, the most preferred schemes are the rectilinear projection scheme which is favored when the FOV is below 180° and the equidistance projection scheme which is favored when the FOV is over 180°. FIGS. 40 and 41 show the lenses and the ray trajectories in preferred embodiments 9f and 9g of the present invention following the rectilinear projection scheme and the equidistance projection scheme, respectively.

Preferred Embodiment 10

In the case of the biconcave aspherical lens of the preferred embodiment 9 shown in FIG. 27, the maximum zenith angle of the incident ray cannot be over 90°. However, the maximum zenith angle or the maximum divergence angle needs to be over 90° in order for an optical transmitter/receiver installed on a ceiling to optically communicate with other devices disposed somewhere in the room. If the maximum divergence angle is under 90°, then a dead zone exist in the room where the optical signals cannot be reached.

FIG. 42 shows the profile of a lens 4200 in accordance with a preferred embodiment 10 which can be used when the zenith angle of the incident ray is over 90°. Similar to the preferred embodiment 9, the aspherical refractive surface 4205 can be used to convert a converging ray into another converging ray with a smaller convergence angle or to convert a diverging ray into another diverging ray having a larger divergence angle. The aspherical refractive surface 4205 is symmetric about the optical axis 4201 which coincides with the z-axis of the coordinate. A medium with a refractive index $n_1$ and a medium with a refractive index $n_2$ exist at the left and the right sides of the aspherical refractive surface 4205, respectively. The refractive index $n_1$ is larger than $n_2$.

If it is assumed that a medium with a refractive index $n_1$ fills the space between the aspherical refractive surface 4205 and the infinity to the left of the aspherical surface, then a diverging ray 4211 originating from a point O on the optical axis is refracted at the point $P_9$ on the aspherical refractive surface 4205 and diverges with a larger divergence angle. Reversely, a ray 4209 converging from the left to the right is refracted at the point $P_9$ on the aspherical refractive surface 4205 and then propagates toward the point O with a smaller convergence angle. Needless to say, the current embodiment can be used to reduce the divergence angle or to increase the convergence angle, parallel to the preferred embodiment 9.

The profile of the aspherical refractive surface 4205 can be described in a rectangular and a polar coordinate systems having the z-axis coinciding with the optical axis 4201, and the origin O located within the second medium. The z-axis is directed from the right to the left. The profile of the aspherical refractive surface 4205 is described with the zenith angle $\theta$ of a point $P_9$ on a curve defined as a collection of intersections between the x-z plane and the aspherical refractive surface 4205 and the distance r from the origin O to the point $P_9$. The distance r is a function of the zenith angle $\theta$, namely $r = r(\theta)$. The coordinates (x, z) of the point $P_9$ in the rectangular coordinate system are given as functions of the independent variable $\theta$ in the polar coordinate system as $$x(\theta) = r(\theta)\sin\theta$$

and $$z(\theta) = r(\theta)\cos\theta$$

The profile of the aspherical refractive surface 4205 can also be defined with the zenith angle $\phi$ of a tangent plane T at the point $P_9(\theta, r)$ on the aspherical refractive surface 4205. The zenith angle $\phi$ of the tangent plane T is a function of the zenith angle $\theta$, namely $\phi = \phi(\theta)$, and satisfies Eq. 154.

$$\tan\phi = -\frac{dz}{dx} \qquad \text{MathFigure 154}$$

Following the similar derivational procedure for obtaining the profile of the aspherical refractive surface shown in the preferred embodiments 1 to 1d, the profile of the aspherical refractive surface 4205 is given as Eq. 155.

$$r(\theta) = r(\theta_i)\exp\left[\int_{\theta_i}^{\theta}\frac{\sin\theta' - \tan\phi(\theta')\cos\theta'}{\cos\theta' + \tan\phi(\theta')\sin\theta'}d\theta'\right] \qquad \text{MathFigure 155}$$

In Eq. 155, $\theta'$ is a dummy variable, the lower bound of the indefinite integral is $\theta = \theta_i$, and $r(\theta_i)$ is the corresponding distance from the origin to a point on the aspherical refractive surface 4205 having a zenith angle $\theta = \theta_i$. Preferably, the lower bound $\theta_i$ of the indefinite integral is zero ($\theta_i = 0$) and $r_0 \equiv r(0)$ is the distance from the origin O to an intersection between the aspherical refractive surface 4205 and the optical axis 4201. The incident ray is refracted at the aspherical refractive surface 4205 according to the Snell's law of refraction. The angle between a normal N perpendicular to the tangent plane T at the point $P_9$ on the aspherical refractive surface and the first ray 4209 is $\phi - \delta$, therefore the angle of incidence is $\phi - \delta$. On the other hand, the angle between the normal N and the second ray 4211 is $\phi - \theta$, therefore the angle of refraction is φ−θ. The angle of incidence and the angle of refraction satisfies Eq. 156 according to the Snell's law of refraction.

$$n_1 \sin(\phi - \delta) = n_2 \sin(\phi - \theta) \quad \text{MathFigure 156}$$

Using trigonometrical functional relations, the slope tan φ of the tangent plane T is given as Eq. 157.

$$\tan\phi = \frac{n_1 \sin\delta - n_2 \sin\theta}{n_1 \cos\delta - n_2 \cos\theta} \quad \text{MathFigure 157}$$

Using Eq. 157, the numerator of the integrand in Eq. 155 is given as Eq. 158.

$$\sin\theta - \tan\phi\cos\theta = \frac{-n_1 \sin(\delta - \theta)}{n_1 \cos\delta - n_2 \cos\theta} \quad \text{MathFigure 158}$$

On the other hand, the denominator of the integrand is given as Eq. 159.

$$\cos\theta + \tan\phi\sin\theta = \frac{n_1 \cos(\delta - \theta) - n_2}{n_1 \cos\delta - n_2 \cos\theta} \quad \text{MathFigure 159}$$

Therefore, using Eqs. 158 and 159, Eq. 155 is given in a simpler form shown in Eq. 160.

$$r(\theta) = r(\theta_i) \exp\left[\int_{\theta_i}^{\theta} \frac{-n_1 \sin(\delta - \theta')}{n_1 \cos(\delta - \theta') - n_2} d\theta'\right] \quad \text{MathFigure 160}$$

The Eq. 160 is exactly the same as Eq. 127. The profile of lens can be given as in FIG. 27 or FIG. 42 depending on which of the two is larger between the refractive indices $n_1$ and $n_2$. The above-mentioned $n_1$, $n_2$, $\theta_1$, $\theta_2$, $\theta_i$, $r(\theta_i)$ and $\delta(\theta)$ are the design parameters used in designing the aspherical refractive surface 4205 in accordance with a preferred embodiment 10. The function $\delta(\theta)$, which determines the projection scheme of the aspherical refractive surface 4205, can have the same forms and varieties identical to the case in the preferred embodiment 9.

FIG. 43 shows another perspective for expressing the profile of the aspherical refractive surface 4205 given in FIG. 42. The shape of the aspherical refractive surface 4305 in FIG. 43, which is identical to that of the aspherical refractive surface 4205 in FIG. 42, can be expressed in a polar coordinate system with the z-axis coinciding with the optical axis 4301 and having the origin O in the second medium with the refractive index $n_2$. The z-axis is directed from the right to the left. The coordinates of a point $P_A$ on the aspherical refractive surface 4305 can be described with the zenith angle θ of the point $P_A$ and the distance r from the origin O to the point $P_A$ as (θ, r=r(θ)). If a hypothetical sphere (not shown) is drawn of which the center is at the origin O and the point $P_A$ is on the spherical surface, then a plane C tangent to the sphere at the point $P_A$, namely at (θ, r), subtends an angle φ=φ(θ) with the plane T tangent to the aspherical refractive surface at the same point $P_A$. The angle φ satisfies Eq. 161.

$$\tan\phi = -\frac{dr}{r d\theta} \quad \text{MathFigure 161}$$

The following Eq. 162 can be obtained from Eq. 161 using the technique of the separation of variables.

$$\frac{dr}{r} = -\tan\phi(\theta) d\theta \quad \text{MathFigure 162}$$

The following Eq. 163 is obtained by formally integrating the Eq. 162.

$$r(\theta) = r(\theta_i) \exp[-\int_{\theta_i}^{\theta} \tan\phi(\theta') d\theta'] \quad \text{MathFigure 163}$$

In Eq. 163, θ' is a dummy variable. The lower bound of the indefinite integral is θ=$\theta_i$, and r($\theta_i$) is the corresponding distance from the origin to a point on the aspherical refractive surface 4305 with a zenith angle θ=$\theta_i$. Preferably, the lower bound $\theta_i$ is zero ($\theta_i$=0) and $r_o$=r(0) is the distance from the origin O to the intersection between 0 the aspherical refractive surface 4305 and the optical axis 4301. The incident ray 4309 is refracted at the aspherical refractive surface 4305 according to the Snell's law of refraction. The angle α of the first ray 4309 is measured from a straight line passing through the origin O and the point $P_A$. Therefore, the angle of incidence is given as φ−α. On the other hand, the angle between the normal N and the second ray 4311 is φ, therefore the angle of refraction is φ. The angle of incidence and the angle of refraction satisfy the Eq. 164 according to the Snell's law of refraction.

$$n_1 \sin(\phi - \alpha) = n_2 \sin\phi \quad \text{MathFigure 164}$$

Using trigonometrical functional relations, the slope tamp of the tangent plane T is given as Eq. 165.

$$\tan\phi = \frac{n_1 \sin\alpha}{n_1 \cos\alpha - n_2} \quad \text{MathFigure 165}$$

Using Eq. 165, Eq. 163 is given in a simpler form as shown in Eq. 166.

$$r(\theta) = r(\theta_i) \exp\left[\int_{\theta_i}^{\theta} \frac{-n_1 \sin\alpha}{n_1 \cos\alpha - n_2} d\theta'\right] \quad \text{MathFigure 166}$$

Comparing FIGS. 42 and 43, it can be noticed that the angle α is equal to δ−θ (i.e., α=δ−θ). Therefore, Eq. 166 is exactly the same equation as the Eq. 160.

FIG. 44 shows the profile of an aspherical refractive surface 4205 in accordance with a preferred embodiment 10a. It is assumed that the first medium is the BK7 glass, the medium at the right-side of the aspherical refractive surface 4205 is the air having the refractive index 1 ($n_2$=1.0), and the longest distance $r_o$ from the origin O to the refractive surface is 50.0 mm. FIG. 44 shows an aspherical refractive surface 4205 following the equidistance projection scheme which is designed so that an incident diverging ray is refracted at the aspherical refractive surface 4205 and becomes a diverging ray with a larger divergence angle. The divergence angle θ before the refraction ranges from a minimum $\theta_1$=0° to a maximum $\theta_2$=45°, and the divergence angle δ after the refraction ranges from a minimum $\delta_1$=0° to a maximum $\delta_2$=90°. Reversely, the aspherical refractive surface 4205 can be used to reduce the convergence angle of a converging ray. FIG. 45 shows the profile of the aspherical refractive surface 4205 and the ray trajectories.

Preferred Embodiment 11

The aspherical refractive surface in the preferred embodiment 10 can be used to change the FOVs of a converging or a diverging rays. However, lenses having a single refractive surface is limited in its usage. Therefore in accordance with a preferred embodiment 11, a lens 4600 can be configured with a first lens surface 4607 and a second lens surface 4605, where both refractive surfaces are aspherical in shape. If the first lens surface 4607 is a simple spherical surface, the projection scheme can not be embodied as has been originally conceived, because after the second ray 4611 has been refracted at the second lens surface 4605, the first ray 4610 is not any more a diverging ray with the center of divergence at the origin O on the optical axis 4601. Therefore, even if the first lens surface 4607 is configured as a spherical surface having the center at the point O, the first ray 4610 is refracted while passing through the first lens surface 4607. In order not to be refracted at the first lens surface 4607, the first ray 4610 should be perpendicular to the first lens surface 4607 at the point $Q_4$ through which the first ray 4610 passes.

As shown in FIG. 46, the first lens surface 4607 in accordance with a preferred embodiment 11 of the present invention has a symmetric profile about an optical axis 4601 which coincides with the z-axis of the coordinate. One medium with a refractive index $n_1$ and another medium with a refractive index $n_0$ exist at the right and the left sides of the first lens surface 4607, respectively. As a matter of fact, the refractive index of the medium at the left-side of the first lens surface 4607 does not matter. The second ray 4611 diverging from a point O on the optical axis 4601 is refracted at a point $P_B$ at the second lens surface 4605 and becomes the first ray 4610 diverging with a larger divergence angle. The first ray is perpendicular to the first lens surface 4607 at the point $Q_4$.

The profile of the first lens surface 4607 can be described in a rectangular and a polar coordinate systems with the z-axis coinciding with the optical axis 4601 and having the origin located at a point O. The z-axis is directed from the right to the left. The profile of the second lens surface 4605 is the same as those of the aspherical refractive surfaces 4205 and 4305 of the preferred embodiment 10, and described by Eq. 160. The first ray 4609 refracted at the point $P_B$ on the second lens surface 4605 has a zenith angle $\delta=\delta(\theta)$, and the distance from the point $P_B$ to a point $Q_4$ on the first lens surface 4607 is $L=L(\theta)$. The rectangular coordinates of the point $Q_4$ is given as $Q_4=Q_4(X, Z)$, where X is the perpendicular distance measured from the optical axis and Z is the height measured along the optical axis. From the geometrical relations shown in FIG. 46, the following relations given in Eqs. 167 and 168 can be obtained.

$$X(\theta)=r(\theta)\sin\theta+L(\theta)\sin\delta(\theta) \quad \text{MathFigure 167}$$

$$Z(\theta)=r(\theta)\cos\theta+L(\theta)\cos\delta(\theta) \quad \text{MathFigure 168}$$

Near the point $Q_4$, increment dX in the X-direction and the increment dZ in the Z-direction satisfy a relation shown in Eq. 169.

$$\tan\delta = -\frac{dZ}{dX} \quad \text{MathFigure 169}$$

The following Eq. 170 can be obtained by differentiating Eq. 167 with respect to θ.

$$dX=dr\sin\theta+r\cos\theta d\theta+dL\sin\delta+L\cos\delta d\delta \quad \text{MathFigure 170}$$

On the other hand, the following Eq. 171 can be obtained by differentiating Eq. 168 with respect to θ.

$$dZ=dr\cos\theta-r\sin\theta d\theta+dL\cos\delta-L\sin\delta d\delta \quad \text{MathFigure 171}$$

Using Eqs. 170 and 171, Eq. 169 can be alternatively given as Eq. 172.

$$dL(\cos\delta+\tan\delta\sin\delta)=-(\cos\theta+\tan\delta\sin\theta)dr+r(\sin\theta-\tan\delta\cos\theta)d\theta \quad \text{MathFigure 172}$$

The following Eq. 173 can be obtained from the trigonometrical functional relations.

$$\cos\delta + \tan\delta\sin\delta = \frac{1}{\cos\delta} \quad \text{MathFigure 173}$$

Considering the Eq. 173, the following Eq. 174 can be obtained by multiplying both sides of Eq. 172 by cos δ and dividing by dθ.

$$\frac{dL}{d\theta} = -\cos(\delta-\theta)\frac{dr}{d\theta} - r\sin(\delta-\theta) \quad \text{MathFigure 174}$$

The following Eq. 175 is obtained by formally integrating the Eq. 174.

$$L(\theta) = L(\theta_i) - \int_{\theta_i}^{\theta} \left[\cos(\delta-\theta')\frac{dr}{d\theta'} + r\sin(\delta-\theta')\right]d\theta' \quad \text{MathFigure 175}$$

In Eq. 175, θ' is a dummy variable. The lower bound of the indefinite integral is $\theta=\theta_i$, and $L(\theta_i)$ is the corresponding distance from a point on the second lens surface 4605 having a zenith angle $\theta=\theta_i$ to a corresponding point on the first lens surface 4607. Preferably, the lower bound $\theta_i$ is zero ($\theta_i=0$), $L_o=L(\theta)$ is the distance from the first lens surface 4607 to the second lens surface 4605 measured along the optical axis. The profile of the second lens surface 4605 is given as Eq. 176.

$$r(\theta) = r(\theta_i)\exp\left[\int_{\theta_i}^{\theta} \frac{-n_1\sin(\delta-\theta')}{n_1\cos(\delta-\theta')-n_2}d\theta'\right] \quad \text{MathFigure 176}$$

Therefore, the following Eq. 177 can be obtained by differentiating Eq. 176 with respect to θ.

$$\frac{dr}{d\theta} = -\frac{n_1\sin(\delta-\theta)}{n_1\cos(\delta-\theta)-n_2}r(\theta) \quad \text{MathFigure 177}$$

Using Eqs. 175 and 177, the following Eq. 178 can be obtained.

$$L(\theta) = L(\theta_i) + \int_{\theta_i}^{\theta} \left[ \frac{n_2 r(\theta')\sin(\delta - \theta')}{n_1 \cos(\delta - \theta') - n_2} \right] d\theta' \qquad \text{MathFigure 178}$$

FIG. 47 shows the profile of a lens 4600 in accordance with a preferred embodiment 11a. The profile of the second lens surface 4605 shown in FIG. 47 is identical to that of the aspherical refractive surface 4205 shown in FIG. 44 in accordance with a preferred embodiment 10, and the distance $L_o$ from the first lens surface 4607 to the second lens surface 4605 is set as 10 mm ($L_o$=10 mm). On the other hand, FIG. 48 shows the profile of the lens 4600 and the ray trajectories. From the figure, it is clear that all the first rays are perpendicular to the first lens surface 4607.

Preferred Embodiment 12

The first lens surface 4607 of the lens 4600 in accordance with the preferred embodiment 11 does not have any refractive power and has the shape of an aspherical refractive surface which does not change the path of the rays refracted at the second lens surface 4605. However, a more desirable lens can be obtained if the first and the second lens surfaces 4607 and 4605 can share the necessary refractive power. FIG. 49 shows a lens 4900 in accordance with a preferred embodiment 12 where both of the first and the second lens surfaces 4907 and 4905 are aspherical surfaces with refractive powers.

The first and the second lens surfaces 4907 and 4905 are symmetric about an optical axis 4901 which coincides with the z-axis of the coordinate system. A medium with a refractive index $n_0$ and a medium with a refractive index $n_1$ exist at the left and the right-sides of the first lens surface 4907, respectively. The third ray 4911 diverging from a point 0 on the optical axis 4901 becomes the second ray 4910 diverging with a larger divergence angle after being refracted at a point $P_C$ on the second aspherical refractive surface 4905. The second ray 4910 is refracted again at a point $Q_5$ on the first lens surface 4907 and becomes the first ray 4909 diverging with a still larger divergence angle.

The profile of the first lens surface 4907 can be described in a rectangular and a polar coordinate systems with the z-axis coinciding with the optical axis 4901 and having the origin at the point O. The z-axis is directed from the right to the left. The profile of the second lens surface 4905 is the same as those of the aspherical refractive surfaces 4205 and 4305 of the preferred embodiment 10, and described by Eq. 160. The second ray 4610 refracted at a point $P_C$ on the second lens surface 4905 has a zenith angle $\delta = \delta(\theta)$, and the distance L from the point $P_C$ on the second lens surface 4905 to the point $Q_5$ on the first lens surface 4907 is $L=L(\theta)$. The rectangular coordinates of the point $Q_5$ are given as $Q_5=Q_5(X, Z)$, where X is a perpendicular distance from the optical axis and Z is a height measured along the optical axis. From the geometrical relations shown in FIG. 49, the following Eqs. 179 and 180 can be obtained.

$$X(\theta) = r(\theta)\sin\theta + L(\theta)\sin\delta(\theta) \qquad \text{MathFigure 179}$$

$$Z(\theta) = r(\theta)\cos\theta + L(\theta)\cos\delta(\theta) \qquad \text{MathFigure 180}$$

Near the point $Q_5$, increment dX in the X-direction and increment dZ in the Z-direction satisfy a relation given in Eq. 181.

$$\tan\psi = -\frac{dZ}{dX} \qquad \text{MathFigure 181}$$

The following Eq. 182 can be obtained by differentiating Eq. 179 with respect to θ.

$$dX = dr\sin\theta + r\cos\theta d\theta + dL\sin\delta + L\cos\delta d\delta \qquad \text{MathFigure 182}$$

On the other hand, the following Eq. 183 can be obtained by differentiating Eq. 180 with respect to θ.

$$dZ = dr\cos\theta - r\sin\theta d\theta + dL\cos\delta - L\sin\delta d\delta \qquad \text{MathFigure 183}$$

Using Eqs. 182 and 183, Eq. 181 can be reduced to a simpler form given in Eq. 184.

$$\frac{dL}{d\theta} + A(\theta)L(\theta) = B(\theta) \qquad \text{MathFigure 184}$$

In Eq. 184, $A(\theta)$ and $B(\theta)$ are functions defined as Eqs. 185 and 186.

$$A(\theta) \equiv -\left(\frac{\sin\delta - \tan\psi\cos\delta}{\cos\delta + \tan\psi\sin\delta}\right)\frac{d\delta}{d\theta} \qquad \text{MathFigure 185}$$

$$B(\theta) \equiv \left(\frac{\sin\theta - \tan\psi\cos\theta}{\cos\delta + \tan\psi\sin\delta}\right)r - \left(\frac{\cos\theta + \tan\psi\sin\theta}{\cos\delta + \tan\psi\sin\delta}\right)\frac{dr}{d\theta} \qquad \text{MathFigure 186}$$

By multiplying a hypothetical function $F(\theta)d\theta$ to both sides of Eq. 184, a relation can be obtained as shown in Eq. 187.

$$F(\theta)dL + F(\theta)A(\theta)L(\theta)d\theta = F(\theta)B(\theta)d\theta \qquad \text{MathFigure 187}$$

The condition for the left side of Eq. 187 to be an exact differential is given as Eq. 188.

$$\frac{dF}{d\theta} = A(\theta)F(\theta) \qquad \text{MathFigure 188}$$

Therefore, the hypothetical function $F(\theta)$ is given as a function of $A(\theta)$ as shown in Eq. 189.

$$F(\theta) = \exp[\int_{\theta_i}^{\theta} A(\theta')d\theta'] \qquad \text{MathFigure 189}$$

Using Eqs. 189 in Eq. 184, the function $L(\theta)$ is given as Eq. 190.

$$L(\theta) = \frac{1}{F(\theta)}\left\{ L(\theta_i) + \int_{\theta_i}^{\theta} F(\theta')B(\theta')d\theta' \right\} \qquad \text{MathFigure 190}$$

The profile of the second aspherical refractive surface 4905 in accordance with the preferred embodiment 12 is given as Eq. 191.

$$r(\theta) = r(\theta_i)\exp\left[ \int_{\theta_i}^{\theta} \frac{-n_1\sin(\delta - \theta')}{n_1\cos(\delta - \theta') - n_2} d\theta' \right] \qquad \text{MathFigure 191}$$

The following Eq. 192 can be obtained by differentiating Eq. 191 with respect to θ.

$$\frac{dr}{d\theta} = -\frac{n_1\sin(\delta-\theta)}{n_1\cos(\delta-\theta)-n_2}r(\theta) \qquad \text{MathFigure 192}$$

Therefore, the function B(θ) is given as Eq. 193.

$$B(\theta) \equiv \left\{ \begin{array}{c} (\sin\theta - \tan\psi\cos\theta) + \\ \dfrac{n_1\sin(\delta-\theta)}{n_1\cos(\delta-\theta)-n_2} \\ (\cos\theta + \tan\psi\sin\theta) \end{array} \right\} \frac{r}{\cos\delta + \tan\psi\sin\delta} \qquad \text{MathFigure 193}$$

By applying the Snell's law of refraction at the first lens surface 4907, the following Eq. 194 can be obtained.

$$n_o\sin(\beta-\Psi) = n_1\sin(\delta-\Psi) \qquad \text{MathFigure 194}$$

By rearranging Eq. 194, the following Eq. 195 can be obtained.

$$\tan\psi = \frac{n_1\sin\delta - n_o\sin\beta}{n_1\cos\delta - n_o\cos\beta} \qquad \text{MathFigure 195}$$

Similarly, by applying the Snell's law of refraction at the second lens surface 4905, the following Eq. 196 can be obtained.

$$n_1\sin(\phi-\delta) = n_2\sin(\phi-\theta) \qquad \text{MathFigure 196}$$

From Eq. 196, the following relation can be obtained.

$$\tan\phi = \frac{n_1\sin\delta - n_2\sin\theta}{n_1\cos\delta - n_2\cos\theta} \qquad \text{MathFigure 197}$$

By using Eq. 196, the following Eqs. 198 and 199 can be obtained.

$$\sin\delta - \tan\psi\cos\delta = \frac{n_o\sin(\beta-\delta)}{n_1\cos\delta - n_o\cos\beta} \qquad \text{MathFigure 198}$$

$$\cos\delta + \tan\psi\sin\delta = \frac{n_1 - n_o\cos(\beta-\delta)}{n_1\cos\delta - n_o\cos\beta} \qquad \text{MathFigure 199}$$

Therefore, the function A(θ) is given as Eq. 200.

$$A(\theta) = -\frac{n_o\sin(\beta-\delta)}{n_1 - n_o\cos(\beta-\delta)}\frac{d\delta}{d\theta} \qquad \text{MathFigure 200}$$

Similarly, by using Eq. 195, the following Eqs. 201 and 202 can be obtained.

$$\sin\theta - \tan\psi\cos\theta = \frac{-n_1\sin(\delta-\theta) + n_o\sin(\beta-\theta)}{n_1\cos\delta - n_o\cos\beta} \qquad \text{MathFigure 201}$$

$$\cos\theta + \tan\psi\sin\theta = \frac{n_1\cos(\delta-\theta) - n_o\cos(\beta-\theta)}{n_1\cos\delta - n_o\cos\beta} \qquad \text{MathFigure 202}$$

Resultantly, the following equation is obtained.

$$(\sin\theta - \tan\psi\cos\theta) + \frac{n_1\sin(\delta-\theta)}{n_1\cos(\delta-\theta)-n_2}(\cos\theta + \tan\psi\sin\theta) = \\ \frac{n_o n_1\sin(\beta-\delta) + }{\{n_1\cos(\delta-\theta)-n_2\}(n_1\cos\delta - n_o\cos\beta)} \qquad \text{MathFigure 203}$$

With Eq. 203, the function B(θ) is given as Eq. 204.

$$B(\theta) = -\frac{n_o n_1\sin(\beta-\delta) + n_1 n_2\sin(\delta-\theta) + n_2 n_o\sin(\theta-\beta)}{\{n_1\cos(\delta-\theta)-n_2\}\{n_o\cos(\beta-\delta)-n_1\}}r(\theta) \qquad \text{MathFigure 204}$$

Therefore, by using Eqs. 200, 189 and 204, the function L(θ) given in Eq. 190 can be obtained. With the function L(θ) and Eqs. 179 and 180, the profile of the first lens surface 4907 in accordance with the preferred embodiment 12 of the present invention can be obtained.

A projection scheme is also important when the lens of the preferred embodiment 12 is to be used in an optical imaging system. The projection scheme is determined according to the relation between the zenith angle β of a first ray 4909 and the zenith angle θ of a third ray 4911. If it is assumed that all the minimum zenith angles of the first through the third rays are zero, then the major projection schemes are given as Eqs. 205 through 209.

First, in the equi-angular projection scheme, the relation between the zenith angles β and θ is given as Eq. 205.

$$\beta(\theta) = \frac{\beta_2}{\theta_2}\theta \qquad \text{MathFigure 205}$$

In the rectilinear projection scheme, the relation between the zenith angles β and θ is given as Eq. 206:

$$\beta(\theta) = \tan^{-1}\left[\frac{\tan\beta_2}{\tan\theta_2}\tan\theta\right] \qquad \text{MathFigure 206}$$

In the equidistance projection scheme, the relation between the zenith angles β and θ is given as Eq. 207.

$$\beta(\theta) = \left(\frac{\beta_2}{\tan\theta_2}\right)\tan\theta \qquad \text{MathFigure 207}$$

In the stereographic projection, the relation between the zenith angles β and θ is given as Eq. 208.

$$\beta(\theta) = 2\tan^{-1}\left[\frac{\tan\dfrac{\beta_2}{2}}{\tan\theta_2}\tan\theta\right] \qquad \text{MathFigure 208}$$

In the orthographic projection, the relation between the zenith angles β and θ is given as Eq. 209.

$$\beta(\theta) = \sin^{-1}\left[\frac{\sin\beta_2}{\tan\theta_2}\tan\theta\right]$$ MathFigure 209

On the other hand, the zenith angle δ of the second ray 4910 can be given as an arbitrary function of θ as shown in Eq. 210.

$$\delta=\delta(\theta)$$ MathFigure 210

However, the lens profile will be far from desirable if an arbitrary function is used. In order for the two refractive surfaces to have comparable refractive powers, δ(θ) can take a median value between θ and β(θ) as shown in Eq. 211.

$$\delta(\theta) = \frac{\theta + \beta(\theta)}{2}$$ MathFigure 211

An alternative method is to distribute the refractive power unequally between the first and the second refractive surfaces 4907 and 4905 as shown in Eq. 212.

$$\delta(\theta)=\theta+c\{\beta(\theta)-\theta\}$$ MathFigure 212

In Eq. 212, c is an arbitrary real number between 0 and 1.

FIG. 50 shows the profile of a lens 4900 and the ray trajectories in accordance with the preferred embodiment 12a of the present invention. It is assumed that the lens is made of BK7 glass having a refractive index $n_1$ and the media at the object and the image-sides of the lens are the air, that is $n_o=n_2=1.0$. Therefore, the refractive index $n_1$ of the lens is approximately 1.51508920 at the He—Ne laser wavelength of λ=0.6328□. Further, it is assumed that the back focal length of the lens is 50.0 mm, the maximum angle $\beta_2$ of the first ray is 90° ($\beta_2=90°$), and the maximum angle $\theta_2$ of the third ray is 30° ($\theta_2=30°$). The lens 4900 implements the equidistance projection scheme, and the function δ(θ) is given as Eq. 211.

It can be noticed that the profile of the first aspherical refractive surface of the lens shown in FIG. 50 is not suitable for injection-compression molding, a technique widely used to produce aspherical lenses. FIG. 51 shows the profile of a lens 5100 and the ray trajectories in accordance with the preferred embodiment 12b of the present invention, wherein the lens 5100 has the same FOV and the same projection scheme (i.e., the equidistance projection scheme) as the lens shown in FIG. 50, but the first lens surface (i.e., the second aspherical refractive surface) has more refractive power than the second lens surface. In fact, the profile of the lens 5100 in FIG. 51 is described by Eq. 212, and the proportionality constant c is 0.3. On the other hand, FIG. 52 shows a lens 5200 implementing the rectilinear projection scheme and the associated ray trajectories in accordance with the preferred embodiment 12c of the present invention. The projection scheme is also determined by Eq. 212, and the proportionality constant c is 0.3.

The above mentioned preferred embodiments of the present invention are described on the assumption that the rays are visible rays. However, profile of the lens which satisfies the Snell's law of refraction can be designed for a ray with an arbitrary wavelength as long as a proper refractive index corresponding to the design wavelength is used. In other words, the profiles of the lenses and the optical components of the present invention can be described with the above-mentioned identical equations regardless of the wavelengths such as the millimeter wave, the microwave as well as the visible, the near infrared, the far infrared and the soft x-rays. Accordingly, the present invention is not limited to the rays within the visible range.

INDUSTRIAL APPLICABILITY

With the present invention, the precise profile of an aspherical refractive surface can be obtained rapidly. Further, various effects can be obtained from the lenses and the optical components having the aspherical refractive surfaces of the present invention.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing descriptions. All changes, which come within the equivalent meaning and range of the claims, are to be embraced within their scope.

The invention claimed is:

1. An optical component comprising:
   at least a first aspherical refractive surface, wherein
   the first aspherical refractive surface constitute a part of a boundary between a first medium having a refractive index $n_1$ and a second medium having a refractive index $n_2$,
   a first curve is defined as a collection of intersections between the x-z plane of a rectangular coordinate system and the first aspherical refractive surface, wherein
   the origin of the rectangular coordinate system is located within the second medium, and the z-axis of the rectangular coordinate system passes through the origin and a point on the first aspherical refractive surface,
   the said first curve is symmetric about the z-axis,
   a distance from the origin to a first point on the first curve with a zenith angle θ is r(θ),
   rectangular coordinates (x, z) and polar coordinates (θ, r) of the first point in the x-z plane satisfy relations given in Eqs. 1 and 2, $$x(\theta)=r(\theta)\sin\theta \quad\quad\quad\quad\quad\quad\quad\quad\quad\quad (\text{Eq. 1})$$

$$z(\theta)=r(\theta)\cos\theta \quad\quad\quad\quad\quad\quad\quad\quad\quad\quad (\text{Eq. 2})$$

the distance r(θ) is given as Eq. 3, $$r(\theta) = r(\theta_i)\exp\left[\int_{\theta_i}^{\theta} \frac{-n_1\sin(\delta-\theta')}{n_1\cos(\delta-\theta')-n_2}d\theta'\right] \quad (\text{Eq. 3})$$

said $\theta_i$ is a zenith angle of a second point on the first curve,
   said $r(\theta_i)$ is a corresponding distance from the origin to the second point,
   said δ is an arbitrary function of the zenith angle θ of the first point (δ=δ(θ)), and
   the zenith angle θ ranges from a minimum $\theta_1$ not smaller than zero to a maximum $\theta_2$ smaller than π/2.

2. The optical component of claim 1, wherein the refractive index $n_1$ of the first medium is larger than the refractive index $n_2$ of the second medium ($n_1>n_2$), said δ is zero (δ=θ),
   the optical component further comprises a second lens surface,
   a second curve is defined as a collection of intersections between the x-z plane and the second lens surface, and the second curve is a line segment perpendicular to the z-axis, the z-coordinate $Z_F$ of the second curve is not smaller than the maximum z-coordinate of the first points on the first curve ($Z_F \geq \max(z(\theta))$), and the space between the first aspherical refractive surface and the second lens surface is filled with the first medium having the refractive index $n_1$.

3. The optical component of claim 2, wherein the first aspherical refractive surface and the second lens surface are rotationally symmetric about the z-axis.

4. The optical component of claim 2, wherein the first aspherical refractive surface and the second lens surface have translational symmetry along the y-axis of the rectangular coordinate system.

5. The optical component of claim 2, wherein the first aspherical refractive surface and the second lens surface are rotationally symmetric about the x-axis of the rectangular coordinate system.

6. The optical component of claim 1, wherein the refractive index $n_1$ of the first medium is smaller than the refractive index $n_2$ of the second medium ($n_1 < n_2$), said $\delta$ is zero ($\delta = 0$), the optical component further comprises a second lens surface, a second curve defined as a collection of intersections between the x-z plane and the second lens surface is a circular arc around the origin with a radius $r_B$, the radius $r_B$ of the circular arc is not larger than the shortest distance $r(\theta)$ ($r_E \leq \min(r(\theta))$), and the space between the first aspherical refractive surface and the second lens surface is filled with the second medium having the refractive index $n_2$.

7. The optical component of claim 6, wherein the first aspherical refractive surface and the second lens surface are rotationally symmetric about the z-axis.

8. The optical component of claim 6, wherein the first aspherical refractive surface and the second lens surface have translational symmetry along the y-axis of the rectangular coordinate system.

9. The optical component of claim 6, wherein the first aspherical refractive surface and the second lens surface are rotationally symmetric about the x-axis of the rectangular coordinate system.

10. The optical component of claim 1, wherein said $\theta_1$ is zero and said $\delta(\theta)$ has a relation given in Eq. 4, $$\delta(\theta) = \tan^{-1}\left[\frac{\tan\delta_2}{\tan\theta_2}\tan\theta\right] \quad \text{(Eq. 4)}$$

wherein $\delta_2$ is a value of $\delta$ corresponding to the said $\theta_2$ ($\delta_2 = \delta(\theta_2)$), and said $\delta_2$ is smaller than $\pi/2$.

11. The optical component of claim 1, wherein said $\theta_1$ is zero, said $\delta(\theta)$ has a relation given in Eq. 5, $$\delta(\theta) = \left(\frac{\delta_2}{\tan\theta_2}\right)\tan\theta \quad \text{(Eq. 5)}$$

and $\delta_2$ is a value of $\delta$ corresponding to the said $\theta_2$ ($\delta_2 = \delta(\theta_2)$).

12. The optical component of claim 1, wherein said $\theta_1$ is zero, said $\delta(\theta)$ has a relation given in Eq. 6, $$\delta(\theta) = 2\tan^{-1}\left[\frac{\tan\frac{\delta_2}{2}}{\tan\theta_2}\tan\theta\right] \quad \text{*(Eq. 6)}$$

and $\delta_2$ is a value of $\delta$ corresponding to the said $\theta_2$ ($\delta = \delta(\theta_2)$).

13. The optical component of claim 1, wherein said $\theta_1$ is zero, said $\delta(\theta)$ has a relation given in Eq. 7, $$\delta(\theta) = \sin^{-1}\left[\frac{\sin\delta_2}{\tan\theta_2}\tan\theta\right] \quad \text{(Eq. 7)}$$

and $\delta_2$ is a value of $\delta$ corresponding to the said $\theta_2$ ($\delta = \delta(\theta_2)$).

14. The optical component of claim 1, wherein the refractive index $n_1$ of the first medium is smaller than the refractive index $n_2$ of the second medium ($n_1 < n_2$), the optical component further comprises a second lens surface, a second curve defined as a collection of intersections between the x-z plane and the second lens surface is a circular arc around the origin with a radius $r_B$, the radius $r_B$ of the circular arc is not larger than the shortest distance to the first points on the first curve ($r_B \leq \min(r(\theta))$) and the space between the first aspherical refractive surface and the second lens surface is filled with the second medium with the refractive index $n_2$.

15. The optical component of claim 14, wherein the first aspherical refractive surface and the second lens surface are rotationally symmetric about the z-axis.

16. The optical component of claim 14, wherein the first aspherical refractive surface and the second lens surface have translational symmetry along the y-axis of the rectangular coordinate system.

17. The optical component of claim 14, wherein the first aspherical refractive surface and the second lens surface are rotationally symmetric about the x-axis of the rectangular coordinate system.

18. An optical component comprising:

at least a first aspherical refractive surface, wherein the first aspherical refractive surface constitute a part of a boundary between a first medium having a refractive index $n_1$ and a second medium having a refractive index $n_2$, a first curve is defined as a collection of intersections between the x-z plane of a rectangular coordinate system and the first aspherical refractive surface, wherein the origin of the rectangular coordinate system is located within the second medium, and the z-axis of the rectangular coordinate system passes through the origin and a point on the first aspherical refractive surface, the said first curve is symmetric about the z-axis, a distance from the origin to a first point on the first curve with a zenith angle $\theta$ is $r(\theta)$, rectangular coordinates (x, z) and polar coordinates ($\theta$, r) of the first point in the x-z plane satisfy relations given in Eqs. 8 and 9, $$x(\theta) = r(\theta)\sin\theta \quad \text{(Eq. 8)}$$

$$z(\theta) = r(\theta)\cos\theta \quad \text{(Eq. 9)}$$

the distance r(θ) is given as the following Eq. 10, $$r(\theta) = r(\theta_i)\exp\left[\int_{\theta_i}^{\theta} \frac{n_2\sin\theta'}{n_2\cos\theta' - n_2} d\theta'\right] \quad \text{(Eq. 10)}$$

wherein $\theta_i$ is the zenith angle of a second point on the first curve, $r(\theta_i)$ is the corresponding distance from the origin to the second point, and the zenith angle $\theta$ ranges from a minimum $\theta_1$ not smaller than zero to a maximum $\eta_2$ smaller than $\lambda/2$.

19. The optical component of claim 18, wherein the refractive index $n_1$ of the first medium is larger than the refractive index $n_2$ of the second medium ($n_1 > n_2$),
the optical component further comprises a second lens surface,
a second curve defined as a collection of intersections between the x-z plane and the second lens surface is a circular arc around the origin with a radius $r_F$,
the radius $r_F$ of the circular arc is not smaller than the longest distance to the first points on the first curve ($r_F \geq \max(r(\theta))$), and
the space between the first aspherical refractive surface and the second lens surface is filled with the first medium having the refractive index $n_1$.

20. The optical component of claim 19, wherein the first aspherical refractive surface and the second lens surface are rotationally symmetric about the z-axis.

21. The optical component of claim 19, wherein the first aspherical refractive surface and the second lens surface have translational symmetry along the y-axis of the rectangular coordinate system.

22. The optical component of claim 19, wherein the first aspherical refractive surface and the second lens surface are rotationally symmetric about the x-axis of the rectangular coordinate system.

23. The optical component of claim 18, wherein the refractive index $n_1$ of the first medium is smaller than the refractive index $n_2$ of the second medium ($n_1 < n_2$), the optical component further comprises a second lens surface,
a second curve defined as a collection of intersections between the x-z plane and the second lens surface is a straight line segment perpendicular to the z-axis,
the z-coordinate $z_B$ of the second curve is not larger than the minimum z-coordinate of the first points on the first curve ($z_B \leq \min(z(\theta))$), and
the space between the first aspherical refractive surface and the second lens surface is filled with the second medium having the refractive index $n_2$.

24. The optical component of claim 23, wherein the first aspherical refractive surface and the second lens surface are rotationally symmetric about the z-axis.

25. The optical component of claim 23, wherein the first aspherical refractive surface and the second lens surface have translational symmetry along the y-axis of the rectangular coordinate system.

26. The optical component of claim 23, wherein the first aspherical refractive surface and the second lens surface are rotationally symmetric about the x-axis of the rectangular coordinate system.

27. An optical component comprising:
a first lens surface;
a second lens surface;
a third lens surface; and
a fourth lens surface, wherein the fourth lens surface constitute a part of a boundary between a fourth medium having a refractive index $n_4$ and a fifth medium having a refractive index $n_5$, the refractive index $n_4$ of the fourth medium is larger than the refractive index $n_5$ of the fifth medium ($n_4 > n_5$),
a fourth curve is defined as a collection of intersections between the x-z plane of a rectangular coordinate system and the fourth lens surface, wherein
an origin of the rectangular coordinate system is located within the fifth medium,
and the z-axis of the rectangular coordinate system passes through the origin and a point on the fourth lens surface,
the said fourth curve is symmetric about the z-axis,
a distance from the origin to a first point on the fourth curve with a zenith angle $\theta$ is $r(\theta)$,
rectangular coordinates (x, z) and polar coordinates (θ, r) of the first point in the x-z plane satisfy relations given in the following Eqs. 11 and 12, $$x(\theta) = r(\theta)\sin\theta \quad \text{(Eq. 11)}$$

$$z(\theta) = r(\theta)\cos\theta \quad \text{(Eq. 12)}$$

the distance r(θ) is given as Eq. 13 shown below, $$r(\theta) = r(\theta_i)\exp\left[\int_{\theta_i}^{\theta} \frac{-n_5\sin\theta'}{n_4 - n_5\cos\theta'} d\theta'\right] \quad \text{(Eq. 13)}$$

wherein $\theta_i$ is the zenith angle of a second point on the first curve,
$r(\theta_i)$ is a corresponding distance from the origin to the second point,
the zenith angle $\theta$ ranges from a minimum $\theta_1$ not smaller than zero to a maximum $\theta_2$ smaller than $\pi/2$,
the first lens surface constitute a part of a boundary between a first medium having a refractive index $n_1$ and a second medium having a refractive index $n_2$, the refractive index $n_1$ of the first medium is smaller than the refractive index $n_2$ of the second medium ($n_1 < n_2$),
a first curve defined as a collection of intersections between the x-z plane and the first lens surface is symmetric about the z-axis,
a distance from the origin to a third point on the first curve having the zenith angle $\theta$ is $R(\theta)$,
rectangular coordinates (X, Z) and polar coordinates (θ, R) of the third point in the x-z plane satisfy the following relations given in Eqs. 14 and 15, $$X(\theta) = R(\theta)\sin\theta \quad \text{(Eq. 14)}$$

$$Z(\theta) = R(\theta)\cos\theta \quad \text{(Eq. 15)}$$

the distance R(θ) is given as Eq. 16 shown below, $$R(\theta) = R(\theta_i)\exp\left[\int_{\theta_i}^{\theta} \frac{-n_1\sin\theta'}{n_2 - n_1\cos\theta'} d\theta'\right] \quad \text{(Eq. 16)}$$

said $R(\theta_i)$ is a distance from the origin to a fourth point on the first curve having the zenith angle $\theta_i$,
a second curve defined as a collection of intersections between the x-z plane and the second lens surface is a circular arc around the origin with a radius $R_B$,
a third curve defined as a collection of intersections between the x-z plane and the third lens surface is a circular arc around the origin with a radius $r_F$, the radius $R_B$ of the second curve is not larger than the shortest distance to the third points on the first curve ($R_B \leq \min(R(\theta))$), the radius $r_F$ of the third curve is not smaller than the longest distance to the first points on the fourth curve ($r_F \geq \max(r(\theta))$), the radius $R_B$ of the second curve is not smaller than the radius $r_F$ of the third curve ($R_B \geq r_F$), the space between the first lens surface and the second lens surface is filled with the second medium having the refractive index $n_2$, the space between the second lens surface and the third lens surface is filled with a third medium having a refractive index $n_3$, and the space between the third lens surface and the fourth lens surface is filled with a fourth medium having the refractive index $n_4$.

28. The optical component of claim 27, wherein the refractive indices $n_2$, $n_3$ and $n_4$ of the second, the third and the fourth medium are all the same ($n_2 = n_3 = n_4$).

29. The optical component of claim 27, wherein the first lens surface, the second lens surface, the third lens surface and the fourth lens surface are rotationally symmetric about the z-axis.

30. The optical component of claim 27, wherein the first lens surface, the second lens surface, the third lens surface and the fourth lens surface have translational symmetry along the y-axis of the rectangular coordinate system.

31. The optical component of claim 27, wherein the first aspherical refractive surface, the second lens surface, the third lens surface and the fourth lens surface are rotationally symmetric about the x-axis of the rectangular coordinate system.

32. An optical component comprising:

a first lens surface; and a second lens surface, wherein the first lens surface constitutes a part of a boundary between a first medium having a refractive index $n_0$ and a second medium having a refractive index $n_1$, the second lens surface constitutes a part of a boundary between the second medium and a third medium having a refractive index $n_2$, a first curve is defined as a collection of intersections between the x-z plane of a rectangular coordinate system and the first lens surface, wherein an origin of the rectangular coordinate system is located within the third medium, and the z-axis of the rectangular coordinate system passes through the origin and a point on the first lens surface, the said first curve is symmetric about the z-axis, a second curve is defined as a collection of intersections between the x-z plane and the second lens surface, and the second curve is a straight line segment perpendicular to the z-axis, a distance from the origin to the second curve is $f_B$, rectangular coordinates $(x, z)$ and polar coordinates $(\theta, r)$ of a first point on the second curve in the x-z plane with a zenith angle $\theta$ is given as Eqs. 17 and 18, $$x(\theta) = f_B \tan \theta \qquad \text{(Eq. 17)}$$

$$z(\theta) = f_B \qquad \text{(Eq. 18)}$$

the zenith angle $\theta$ ranges from a minimum $\theta_1$ not smaller than zero to a maximum $\theta_2$ smaller than $\pi/2$, rectangular coordinates $(X, Z)$ of a second point on the first curve corresponding to the first point on the second curve satisfy relations given in Eqs. 19 and 20, $$X(\theta) = f_B \tan \theta + L(\theta) \sin \delta(\theta) \qquad \text{(Eq. 19)}$$

$$Z(\theta) = f_B + L(\theta) \cos \delta(\theta) \qquad \text{(Eq. 20)}$$

said $L(\theta)$ is the distance from the first point to the second point, and said $L(\theta)$ is given as Eq. 21, $$L(\theta) = \frac{1}{F(\theta)} \left\{ L(\theta_i) + \int_{\theta_i}^{\theta} F(\theta') B(\theta') d\theta' \right\} \qquad \text{(Eq. 21)}$$

said $L(\theta_i)$ is the distance from a third point on the second curve with $\theta = \theta_i$ to the corresponding fourth point on the first curve, said $F(\theta)$ is given as Eq. 22, $$F(\theta) = \exp[\int_{\theta_i}^{\theta} A(\theta') d\theta'] \qquad \text{(Eq. 22)}$$

said $A(\theta)$ is given as Eq. 23, $$A(\theta) = \frac{n_o}{\sqrt{n_1^2 - n_2^2 \sin^2 \theta}} \frac{n_2^2 \sin\theta \cos\theta}{n_1^2 - n_o \sqrt{n_1^2 - n_2^2 \sin^2 \theta}} \qquad \text{(Eq. 23)}$$

said $B(\theta)$ is given as Eq. 24, and $$B(\theta) = -\frac{f_B}{\cos^2 \theta} \frac{n_1 n_2 \sin \theta}{n_1^2 - n_o \sqrt{n_1^2 - n_2^2 \sin^2 \theta}} \qquad \text{(Eq. 24)}$$

and said $\delta(\theta)$ is given as Eq. 25.

$$\delta(\theta) = \tan^{-1} \left[ \frac{n_2 \sin \theta}{\sqrt{n_1^2 - n_2^2 \sin^2 \theta}} \right] \qquad \text{(Eq. 25)}$$

33. The optical component of claim 32, wherein the first lens surface and the second lens surface are rotationally symmetric about the z-axis.

34. The optical component of claim 32, wherein the first lens surface and the second lens surface have translational symmetry along the y-axis of the rectangular coordinate system.

35. The optical component of claim 32, wherein the first lens surface and the second lens surface are rotationally symmetric about the x-axis of the rectangular coordinate system.

36. An optical component comprising:

a first lens surface; and a second lens surface, wherein the first lens surface constitutes a part of a boundary between a first medium having a refractive index $n_0$ and a second medium having a refractive index $n_1$, the second lens surface constitutes a part of a boundary between the second medium and a third medium having a refractive index $n_2$, a first curve is defined as a collection of intersections between the x-z plane of a rectangular coordinate system and the first lens surface, wherein the origin of the rectangular coordinate system is located within the third medium, and the z-axis of the rectangular coordinate system passes through the origin and a point on the first lens surface, the said first curve is a straight line segment perpendicular to the z-axis, a second curve is defined as a collection of intersections between the x-z plane and the second lens surface, and the second curve is symmetric about the z-axis, the distance from the origin to the first curve is $z_o$, rectangular coordinates (x, z) and polar coordinates (θ, r) of a first point on the first curve in the x-z plane with a zenith angle θ satisfy relations given in Eqs. 26 and 27, $$x(\theta) = z_o \tan\theta \quad (Eq. 26)$$

$$z(\theta) = z(\theta) \equiv z_o \quad (Eq. 27)$$

the zenith angle θ ranges from the minimum $\theta_1$ not smaller than zero to the maximum $\theta_2$ smaller than π/2, rectangular coordinates (X, Z) of a second point on the second curve corresponding to the first point on the first curve satisfy relations given in Eqs. 28 and 29, $$X(\theta) = z_o \tan\theta - L(\theta)\sin\delta(\theta) \quad (Eq. 28)$$

$$Z(\theta) = z_o - L(\theta)\cos\delta(\theta) \quad (Eq. 29)$$

said L(θ) is the distance from the first point to the second point, and said L(θ) is given as Eq. 30, $$L(\theta) = \frac{1}{F(\theta)}\left\{L(\theta_i) + \int_{\theta_i}^{\theta} F(\theta')B(\theta')d\theta'\right\} \quad (Eq. 30)$$

said $L(\theta_i)$ is the distance from a third point on the first curve with $\theta = \theta_i$ to the corresponding fourth point on the second curve, said F(θ) is given as Eq. 31, $$F(\theta) = \exp[\int_{\theta_i}^{\theta} A(\theta')d\theta'] \quad (Eq. 31)$$

said A(θ) is given as Eq. 32, $$A(\theta) = \frac{n_2}{\sqrt{n_1^2 - n_o^2\sin^2\theta}} \frac{n_o^2\sin\theta\cos\theta}{n_1^2 - n_2\sqrt{n_1^2 - n_o^2\sin^2\theta}} \quad (Eq. 32)$$

said B(θ) is given as Eq. 33, $$B(\theta) = \frac{z_o}{\cos^2\theta} \frac{n_1 n_o \sin\theta}{n_1^2 - n_2\sqrt{n_1^2 - n_o^2\sin^2\theta}} \quad (Eq. 33)$$

and said δ(θ) is given as Eq. 34.

$$\delta(\theta) = \tan^{-1}\left[\frac{n_o\sin\theta}{\sqrt{n_1^2 - n_o^2\sin^2\theta}}\right] \quad (Eq. 34)$$

37. The optical component of claim 36, wherein the first lens surface and the second lens surface are rotationally symmetric about the z-axis.

38. The optical component of claim 36, wherein the first lens surface and the second lens surface have translational symmetry along the y-axis of the rectangular coordinate system.

39. The optical component of claim 36, wherein the first lens surface and the second lens surface are rotationally symmetric about the x-axis of the rectangular coordinate system.

40. An optical component comprising:
a first aspherical refractive surface; and
a second aspherical refractive surface, wherein
the first aspherical refractive surface constitutes a part of a boundary between a first medium having a refractive index $n_0$ and a second medium having a refractive index $n_1$,
the second aspherical refractive surface constitutes a part of a boundary between the second medium and a third medium having a refractive index $n_2$,
a second curve is defined as a collection of intersections between the x-z plane of a rectangular coordinate system and the second aspherical refractive surface, wherein
the origin of the rectangular coordinate system is located within the third medium, and the z-axis of the rectangular coordinate system passes through the origin and a point on the second aspherical refractive surface,
the said first curve is symmetric about the z-axis,
a distance from the origin to the first point on the second curve with a zenith angle θ is r(θ),
rectangular coordinates (x, z) and polar coordinates (θ, r) of the first point in the x-z plane satisfy relations shown in the following Eqs. 35 and 36, $$x(\theta) = r(\theta)\sin\theta \quad (Eq. 35)$$

$$z(\theta) = r(\theta)\cos\theta \quad (Eq. 36)$$

the distance r(θ) is given as Eq. 37 below, $$r(\theta) = r(\theta_i)\exp\left[\int_{\theta_i}^{\theta} \frac{-n_1\sin(\delta - \theta')}{n_1\cos(\delta - \theta')}d\theta'\right] \quad (Eq. 37)$$

said $\theta_i$ is a zenith angle of a second point on the first curve,
said $r(\theta_i)$ is a distance from the origin to the second point,
said δ is an arbitrary function of the zenith angle θ of the first point (δ=δ(θ)),
the zenith angle θ ranges from a minimum $\theta_1$ not smaller than zero to a maximum $\theta_2$ smaller than π/2,
*a first curve is defined as collection of intersections between the x-z plane and the first aspherical refractive surface, and the first curve is symmetric about the z-axis,
rectangular coordinates (X, Z) of a third point on the first curve corresponding to the first point on the second curve satisfy relations shown in the following Eqs. 38 to 40, $$X(\theta) = r(\theta)\sin\theta + L(\theta)\sin\delta(\theta) \quad (Eq. 38)$$

$$Z(\theta) = r(\theta)\cos\theta + L(\theta)\cos\delta(\theta) \quad (Eq. 39)$$

$$L(\theta) = L(\theta_i) + \int_{\theta_i}^{\theta}\left[\frac{n_2 r(\theta')\sin(\delta - \theta')}{n_1\cos(\delta - \theta') - n_2}\right]d\theta' \quad (Eq. 40)$$

said L(θ) is a distance from the first point to the third point,
said $L(\theta_i)$ is a distance from the second point to a fourth point on the first curve corresponding to the second point.

41. The optical component of claim 40, wherein the first aspherical refractive surface and the second aspherical refractive surface are rotationally symmetric about the z-axis.

42. The optical component of claim 40, wherein the first aspherical refractive surface and the second aspherical refractive surface have translational symmetry along the y-axis of the rectangular coordinate system.

43. The optical component of claim 40, wherein the first aspherical refractive surface and the second aspherical refractive surface are rotationally symmetric about the x-axis of the rectangular coordinate system.

44. The optical component of claim 40, wherein said $\theta_1$ is zero, said $\delta(\theta)$ has a relation shown in Eq. 41, $$\delta(\theta) = \tan^{-1}\left[\frac{\tan\delta_2}{\tan\theta_2}\tan\theta\right] \quad \text{(Eq. 41)}$$

said $\delta_2$ is a value of $\delta$ corresponding to the said $\theta_2$ ($\delta_2 = \delta(\theta_2)$), and
said $\delta_2$ is smaller than $\pi/2$.

45. The optical component of claim 40, wherein said $\theta_1$ is zero, said $\delta(\theta)$ has a relation shown in Eq. 42, $$\delta(\theta) = \left(\frac{\delta}{\tan\theta_2}\right)\tan\theta \quad \text{(Eq. 42)}$$

and said $\delta_2$ is a value of $\delta$ corresponding to the said $\theta_2$ ($\delta_2 = \delta(\theta_2)$).

46. The optical component of claim 40, wherein said $\theta_1$ is zero and said $\delta(\theta)$ has a relation shown in Eq. 43, $$\delta(\theta) = 2\tan^{-1}\left[\frac{\tan\frac{\delta_2}{2}}{\tan\theta_2}\tan\theta\right] \quad \text{(Eq. 43)}$$

and said $\delta_2$ is a value of $\delta$ corresponding to the said $\theta_2$ ($\delta_2 = \delta(\theta_2)$).

47. The optical component of claim 40, wherein said $\theta_1$ is zero, said $\delta(\theta)$ has a relation shown in Eq. 44, $$\delta(\theta) = \sin^{-1}\left[\frac{\sin\delta_2}{\tan\theta_2}\tan\theta\right] \quad \text{(Eq. 44)}$$

and said $\delta_2$ is a value of $\delta$ corresponding to the said $\delta_2$ ($\delta_2 = \delta(\theta_2)$).

48. An optical component comprising:
a first aspherical refractive surface; and
a second aspherical refractive surface, wherein
the first aspherical refractive surface constitutes a part of a boundary between a first medium having a refractive index $n_0$ and a second medium having a refractive index $n_1$,
the second aspherical refractive surface constitutes a part of a boundary between the second medium and a third medium having a refractive index $n_2$,
a second curve is defined as a collection of intersections between the x-z plane of a rectangular coordinate system and the second aspherical refractive surface, wherein
the origin of the rectangular coordinate system is located within the third medium, and a z-axis of the rectangular coordinate system passes through the origin and a point on the second aspherical refractive surface,
the said second curve is symmetric about the z-axis,
a distance from the origin to a first point on the second curve with a zenith angle $\theta$ is $r(\theta)$,
rectangular coordinates (x, z) and polar coordinates ($\theta$, r) of the first point in the x-z plane satisfy relations shown in the following Eqs. 45 and 46, $$x(\theta) = r(\theta)\sin\theta \quad \text{(Eq. 45)}$$

$$z(\theta) = r(\theta)\cos\theta \quad \text{(Eq. 46)}$$

the distance $r(\theta)$ is given as Eq. 47 below, $$r(\theta) = r(\theta_i)\exp\left[\int_{\theta_i}^{\theta}\frac{-n_1\sin(\delta - \theta')}{n_1\cos(\delta - \theta') - n_2}d\theta'\right] \quad \text{(Eq. 47)}$$

said $\theta_i$ is a zenith angle of a second point on the first curve,
said $r(\theta_i)$ is a distance from the origin to the second point,
the zenith angle $\theta$ ranges from a minimum $\theta_1$ not smaller than zero to a maximum $\theta_2$ smaller than $\pi/2$,
a first curve is defined as a collection of intersections between the x-z plane and the first aspherical refractive surface, and the first curve is symmetric about the z-axis,
rectangular coordinates (X, Z) of a third point on the first curve corresponding to the first point on the second curve satisfy relations shown in the following Eqs. 48 to 50, $$X(\theta) = r(\theta)\sin\theta + L(\theta)\sin\delta(\theta) \quad \text{(Eq. 48)}$$

$$Z(\theta) = r(\theta)\cos\theta + L(\theta)\cos\delta(\theta) \quad \text{(Eq. 49)}$$

$$L(\theta) = \frac{1}{F(\theta)}\left\{L(\theta_i) + \int_{\theta_i}^{\theta}F(\theta')B(\theta')d\theta'\right\} \quad \text{(Eq. 50)}$$

said $L(\theta)$ is a distance from the first point to the third point,
said $L(\theta_i)$ is a distance from the second point to a fourth point on the first curve corresponding to the second point,
said $F(\theta)$ is given as Eq. 51, $$F(\theta) = \exp[\partial_{\theta_i}^{\theta}A(\theta')d\theta'] \quad \text{(Eq. 51)}$$

said $A(\theta)$ is given as Eq. 52, $$A(\theta) = -\frac{n_o\sin(\beta - \delta)}{n_1 - n_o\cos(\beta - \delta)}\frac{d\delta}{d\theta} \quad \text{*(Eq. 52)}$$

said $B(\theta)$ is given as Eq. 53, $$B(\theta) = -\frac{n_o n_1 \sin(\beta - \delta) + n_1 n_2 \sin(\delta - \theta) + n_2 n_o \sin(\theta - \beta)}{\{n_1\cos(\delta - \theta) - n_2\}\{n_o\cos(\beta - \delta) - n_1\}}r(\theta) \quad \text{(Eq. 53)}$$

said $\beta$ is an arbitrary function of the zenith angle $\theta$ ($\beta = \beta(\theta)$), and
said $\delta(\theta)$ takes an arbitrary value between $\theta$ and $\beta(\theta)$.

49. The optical component of claim 48, wherein the first aspherical refractive surface and the second aspherical refractive surface are rotationally symmetric about the z-axis.

50. The optical component of claim 48, wherein the first aspherical refractive surface and the second aspherical refractive surface have translational symmetry along the y-axis of the rectangular coordinate system.

51. The optical component of claim 48, wherein the first aspherical refractive surface and the second aspherical refractive surface are rotationally symmetric about a x-axis of the rectangular coordinate system.

52. The optical component of claim 48, wherein said $\eta_1$ is zero, said $\beta(\theta)$ has a relation shown in Eq. 54, $$\beta(\theta) = \tan^{-1}\left[\frac{\tan\beta_2}{\tan\theta_2}\tan\theta\right] \quad \text{(Eq. 54)}$$

said $\beta_2$ is a value of $\beta$ corresponding to the said $\theta_2$ ($\beta_2=\beta(\theta_2)$), and
said $\beta_1$ is smaller than $\pi/2$.

53. The optical component of claim 48, wherein said $\theta_1$ is zero, said $\beta(\theta)$ has a relation shown in Eq. 55, $$\beta(\theta) = \left(\frac{\beta_2}{\tan\theta_2}\right)\tan\theta \quad \text{(Eq. 55)}$$

and said $\beta_2$ is a value of $\beta$ corresponding to the said $\beta_2$ ($\beta_1=\beta(\theta_2)$).

54. The optical component of claim 48, wherein said $\theta_1$ is zero, and the $\beta(\theta)$ has a relation given as Eq. 56, $$\beta(\theta) = 2\tan^{-1}\left[\frac{\tan\frac{\beta_2}{2}}{\tan\theta_2}\tan\theta\right] \quad \text{(Eq. 56)}$$

and said $\beta_2$ is a value of $\beta$ corresponding to the said $\theta_2$ ($\beta_2=\beta(\theta_2)$).

55. The optical component of claim 48, wherein said $\theta_1$ is zero, said $\beta(\theta)$ has a relation shown in Eq. 57, $$\beta(\theta) = \sin^{-1}\left[\frac{\sin\beta_2}{\tan\theta_2}\tan\theta\right] \quad \text{(Eq. 57)}$$

and said $\beta_2$ is a value of $\beta$ corresponding to the said $\theta_2$ ($\beta_2=\beta(\theta_2)$).

56. The optical component of claim 48, wherein said $\delta(\theta)$ is given as Eq. 58.

$$\delta(\theta) = \frac{\theta + \beta(\theta)}{2} \quad \text{(Eq. 58)}$$

57. The optical component of claim 48, wherein said $\delta(\theta)$ is given as Eq. 59, $$\delta(\theta)=\theta+c\{\beta(\theta)-\theta\} \quad \text{(Eq. 59)}$$

and said c is a real number larger than 0 and smaller than 1.

\* \* \* \* \*

UNITED STATES PATENT AND TRADEMARK OFFICE
CERTIFICATE OF CORRECTION

PATENT NO. : 7,830,617 B2
APPLICATION NO. : 11/993371
DATED : November 9, 2010
INVENTOR(S) : Kweon It is certified that error appears in the above-identified patent and that said Letters Patent is hereby corrected as shown below:

Column 58, Line 61, Claim 2:

Delete "$\delta$ is zero ($\delta=\theta$)" and
Insert -- $\delta$ is zero ($\delta=0$) --.

Column 59, Line 23, Claim 6:

Delete "$\delta$ is zero ($\delta=\theta$)" and
Insert -- $\delta$ is zero ($\delta=0$) --.

Column 60, Line 18, Claim 13:

Delete "$\theta_2$ ($\delta = \delta(\theta_2)$)" and insert -- $\theta_2$ ($\delta_2 = \delta(\theta_2)$) --.

Column 61, Lines 12-13, Claim 18:

Delete "maximum $\eta_2$ smaller than $\pi/2$" and
Insert -- maximum $\theta_2$ smaller than $\pi/2$ --.

Column 68, Line 37, Claim 48:
Delete

" $F(\theta) = \exp\left[\partial^\theta \theta_i A(\theta) d\theta \right]$ " and Insert $$F(\theta) = \exp\left[\int_{\theta_i}^{\theta} A(\theta') d\theta' \right]$$

-- --.

Signed and Sealed this
Third Day of May, 2011

David J. Kappos
*Director of the United States Patent and Trademark Office*

CERTIFICATE OF CORRECTION (continued)
U.S. Pat. No. 7,830,617 B2

Column 69, Line 1, Claim 52:
Delete "said $\eta_1$ is zero" and

Insert -- said $\theta_1$ is zero --.

Column 69, Line 20, Claim 53:
Delete "$\theta_2$ ($\beta_1 = \beta(\theta_2)$)" and Insert -- $\theta_2$ ($\beta_2 = \beta(\theta_2)$) --.